(12) United States Patent
Watanabe

(10) Patent No.: US 9,563,701 B2
(45) Date of Patent: Feb. 7, 2017

(54) SOUND DATA PROCESSING DEVICE AND METHOD

(71) Applicant: Yamaha Corporation, Hamamatsu-shi, Shizuoka-ken (JP)

(72) Inventor: Daichi Watanabe, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 172 days.

(21) Appl. No.: 13/708,723

(22) Filed: Dec. 7, 2012

(65) Prior Publication Data

US 2013/0151556 A1      Jun. 13, 2013

(30) Foreign Application Priority Data

Dec. 9, 2011   (JP) .................................. 2011-270633
Jul. 31, 2012  (JP) .................................. 2012-169821

(51) Int. Cl.
   *G10H 1/42*       (2006.01)
   *G10H 7/02*       (2006.01)
   (Continued)

(52) U.S. Cl.
   CPC ...... *G06F 17/30755* (2013.01); *G10H 1/0025* (2013.01); *G10H 1/42* (2013.01);
   (Continued)

(58) Field of Classification Search
   CPC .................... G06F 17/30743; G06F 17/30569; G06F 17/30017; G06F 17/30787; G10H 2240/141; G10H 2240/131; G10H 2210/361; G10H 2210/341
   (Continued)

(56) References Cited

U.S. PATENT DOCUMENTS

| 5,393,927 A | 2/1995 | Aoki |
| 6,188,010 B1 | 2/2001 | Iwamura |

(Continued)

FOREIGN PATENT DOCUMENTS

| JP | H-08-36385 A | 2/1996 |
| JP | 02-550825 B2 | 11/1996 |

(Continued)

OTHER PUBLICATIONS

Notification of Reasons for Refusal dated Aug. 25, 2016, for JP Application No. 2012-268640, with English translation, six pages.

(Continued)

*Primary Examiner* — Robert Beausoliel, Jr.
*Assistant Examiner* — Pedro J Santos
(74) *Attorney, Agent, or Firm* — Morrison & Foerster LLP

(57) ABSTRACT

For each performance part, a database stores therein a plurality of part performance data. The part performance data for each part includes a sound generation pattern and tone data corresponding thereto. A query pattern indicative of a sound generation pattern to be made an object of search is input by a user. A search is made through the database for part performance data including a sound generation pattern matching the query pattern. In response to a user's operation, one part performance data is identified from among searched-out results, and the sound generation pattern of the identified part performance data is instructed as a new query pattern. Then, a further search is made through the database for part performance data including a sound generation pattern matching the new query pattern. The searched-out pattern can be edited by the user and a further search can be made based on the edited pattern.

25 Claims, 25 Drawing Sheets

(51) Int. Cl.
*G06F 17/30* (2006.01)
*G10H 1/00* (2006.01)

(52) U.S. Cl.
CPC ......... *G10H 7/02* (2013.01); *G10H 2210/341* (2013.01); *G10H 2220/106* (2013.01); *G10H 2240/131* (2013.01); *G10H 2250/641* (2013.01)

(58) Field of Classification Search
USPC ........ 707/758, 728, 705, 916; 704/276, 3, 7; 84/600, 616, 654
See application file for complete search history.

(56) References Cited

U.S. PATENT DOCUMENTS

| | | |
|---|---|---|
| 6,528,715 B1 | 3/2003 | Gargi |
| 7,392,101 B2 | 6/2008 | Fujita et al. |
| 2002/0002898 A1* | 1/2002 | Schmitz et al. ................ 84/645 |
| 2002/0152233 A1* | 10/2002 | Cheong et al. ............ 707/500.1 |
| 2005/0038819 A1* | 2/2005 | Hicken et al. ............. 707/104.1 |
| 2006/0065105 A1 | 3/2006 | Iketani et al. |
| 2007/0106405 A1* | 5/2007 | Cook et al. ..................... 700/94 |
| 2007/0124293 A1* | 5/2007 | Lakowske et al. ............... 707/3 |
| 2007/0162497 A1* | 7/2007 | Pauws ........................ 707/104.1 |
| 2008/0156177 A1 | 7/2008 | Iketani et al. |
| 2009/0019995 A1 | 1/2009 | Miyajima |
| 2010/0198760 A1* | 8/2010 | Maddage et al. ............... 706/12 |
| 2011/0125738 A1* | 5/2011 | Murarka et al. .............. 707/728 |

FOREIGN PATENT DOCUMENTS

| | | |
|---|---|---|
| JP | H-11-120198 A | 4/1999 |
| JP | 03-480433 B2 | 12/2003 |
| JP | 2006-106818 A | 4/2006 |
| JP | 2008-164932 A | 7/2008 |
| JP | 2008-234453 A | 10/2008 |

OTHER PUBLICATIONS

Extended European Search Report dated Jul. 15, 2016, for EP Application No. 12196037.1, seven pages.

Notification of the First Office Action dated Nov. 3, 2016, for CN Application No. 201210528900.4, with English translation, 15 pages.

\* cited by examiner

| PART ID | PART NAME | NOTE NO. | CHANNEL INFO. |
|---|---|---|---|
| 01 | BASS | <=45 | — |
| 02 | CHORD | 46<=&&<=74 | — |
| 03 | PHRASE | 75=< | — |
| 04 | BASS DRUM | — | 12a |
| 05 | SNARE DRUM | — | 12b |
| 06 | HIGH-HAT | — | 12c |
| 07 | CYMBAL | — | 12d |
| ... | ... | ... | ... |

| MUSICAL INSTRUMNT TYPE ID | MUSICAL INSTRUMNT TYPE |
|---|---|
| 001 | WOODEN BASS |
| 002 | ELECTRIC BASS |
| 003 | SLAP BASS |
| 004 | PIANO |
| 005 | ORGAN |
| 006 | TENOR SAX |
| ... | ... |

| RHYTHM CATEGORY ID | RHYTHM CATEGORY |
|---|---|
| 01 | EIGHTH |
| 02 | SIXTEENTH |
| 03 | EIGHTH TRIPLET |
| ... | ... |

| AUTO. ACCOM. ID | PART ID | MUSICAL INSTRU. TYPE ID | RHYTHM CATEGORY ID | RHYTHM PATTERN ID | RHYTHM PATTERN DATA | ATTACK INTENSITY PATTERN DATA | TONE DATA | KEY | GENRE | BPM | CHORD |
|---|---|---|---|---|---|---|---|---|---|---|---|
| 001 | 03 | 006 | 01 | 030060101 | Bebop TenorSax01 Rhythm.txt | Bebop TenorSax01 Attack.txt | Bebop TenorSax01. wav | A | Swing& Jazz | 145 | — |

| AUTO. ACCOM. ID | PART ID | MUSICAL INSTRU. TYPE ID | RHYTHM CATEGORY ID | RHYTHM PATTERN ID | RHYTHM PATTERN DATA | ATTACK INTENSITY PATTERN DATA | TONE DATA | KEY | GENRE | BPM | CHORD |
|---|---|---|---|---|---|---|---|---|---|---|---|
| 001 | 02 | 004 | 01 | 020040101 | BebopPiano01 Rhythm.txt | BebopPiano01 Attack.txt | BebopPiano 01.wav | A | Swing& Jazz | 145 | Maj7 |

| AUTO. ACCOM. ID | PART ID | MUSICAL INSTRU. TYPE ID | RHYTHM CATEGORY ID | RHYTHM PATTERN ID | RHYTHM PATTERN DATA | ATTACK INTENSITY PATTERN DATA | TONE DATA | KEY | GENRE | BPM | CHORD |
|---|---|---|---|---|---|---|---|---|---|---|---|
| 001 | 01 | 001 | 01 | 0100101101 | BebopBass01 Rhythm.txt | BebopBass01 Attack.txt | Bebop Base01.wav | A | Swing& Jazz | 120 | — |
| 002 | 01 | 001 | 01 | 010010102 | BebopBass02 Rhythm.txt | BebopBass02 Attack.txt | Bebop Base02.wav | A | Swing& Jazz | 120 | — |
| 003 | 01 | 001 | 01 | 010010103 | BebopBass03 Rhythm.txt | BebopBass03 Attack.txt | Bebop Base03.wav | A | Swing& Jazz | 120 | — |
| 004 | 01 | 001 | 01 | 010010104 | BebopBass04 Rhythm.txt | BebopBass04 Attack.txt | Bebop Base04.wav | A | Swing& Jazz | 120 | — |
| 005 | 01 | 002 | 02 | 010020201 | FreeJazzBass01 Rhythm.txt | FreeJazzBass01 Attack.txt | FreeJazz Base01.wav | E | Swing& Jazz | 140 | — |
| 006 | 01 | 002 | 02 | 010020202 | FreeJazzBass02 Rhythm.txt | FreeJazzBass02 Attack.txt | FreeJazz Base02.wav | E | Swing& Jazz | 140 | — |
| 007 | 01 | 002 | 02 | 010020203 | FreeJazzBass03 Rhythm.txt | FreeJazzBass03 Attack.txt | FreeJazz Base03.wav | E | Swing& Jazz | 140 | — |
| ... | ... | ... | ... | ... | ... | ... | ... | ... | ... | ... | ... |

FIG. 5A

| AUTO. ACCOM. ID | PART ID | MUSICAL INSTRU. TYPE ID | RHYTHM CATEGORY ID | RHYTHM PATTERN ID | RHYTHM PATTERN DATA | ATTACK INTENSITY PATTERN DATA | TONE DATA | KEY | GENRE | BPM | CHORD |
|---|---|---|---|---|---|---|---|---|---|---|---|
| 001 | 99 | 999 | 01 | 999990101 | Bebop01 Rhythm.txt | Bebop01 Attack.txt | Bebop01.wav | A | Swing& Jazz | 120 | — |
| 001 | 01 | 001 | 01 | 010010101 | BebopBass01 Rhythm.txt | BebopBass01 Attack.txt | BebopBass 01.wav | A | Swing& Jazz | 120 | — |
| 001 | 02 | 004 | 01 | 020040101 | BebopPiano01 Rhythm.txt | BebopPiano01 Attack.txt | BebopPiano 01.wav | A | Swing& Jazz | 120 | 7 |
| 001 | 03 | 006 | 01 | 030060101 | BebopTenorSax01 Rhythm.txt | BebopTenorSax01 Attack.txt | BebopTenorSax 01.wav | A | Swing& Jazz | 120 | — |
| 001 | 04 | 020 | 01 | 040200101 | BebopBassDrum01 Rhythm.txt | BebopBassDrum01 Attack.txt | BebopBassDrum 01.wav | — | Swing& Jazz | 120 | — |
| 001 | 05 | 033 | 01 | 050330101 | BebopSnareDrum01 Rhythm.txt | BebopSnareDrum01 Attack.txt | BebopSnareDrum 01.wav | — | Swing& Jazz | 120 | — |
| 001 | 06 | 050 | 01 | 060500101 | BebopHi-hat01 Rhythm.txt | BebopHi-hat01 Attack.txt | BebopHi-hat 01.wav | — | Swing& Jazz | 120 | — |
| 001 | 07 | 061 | 01 | 070610101 | BebopCymbal01 Rhythm.txt | BebopCymbal01 Attack.txt | BebopCymbal 01.wav | — | Swing& Jazz | 120 | — |
| ... | ... | ... | ... | ... | ... | ... | ... | ... | ... | ... | ... |

F I G. 5 B

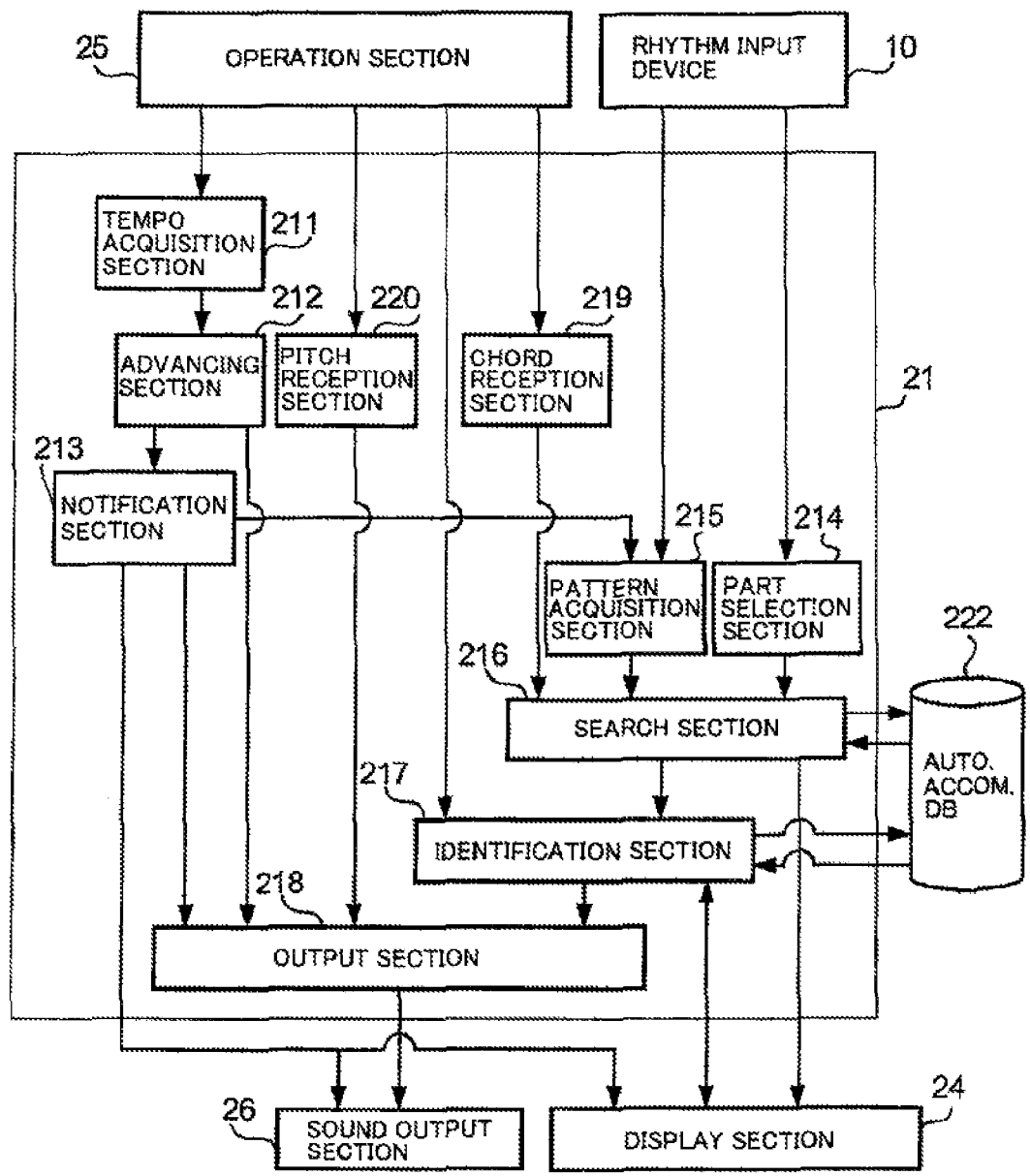
F I G. 6

| KEY NO. | KEY |
|---|---|
| 1 | C |
| 2 | D♭ |
| 3 | D |
| 4 | E♭ |
| 5 | E |
| 6 | F |
| 7 | G♭ |
| 8 | G |
| 9 | A♭ |
| 10 | A |
| 11 | B♭ |
| 12 | B |
F I G. 1 3
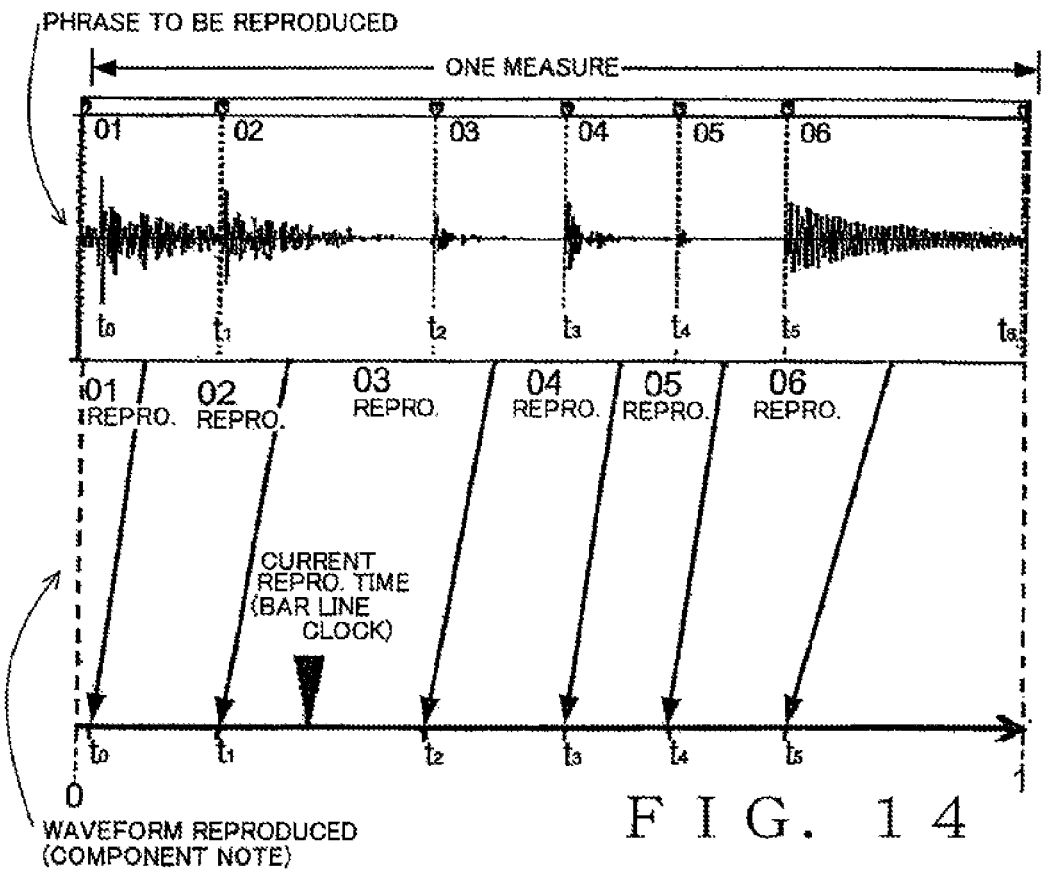
F I G. 1 4

| STYLE ID | STYLE NAME | SECTION | KEY | GENRE | BPM | TIME | BASS RHYTHM PATTERN ID | CHORD RHYTHM PATTERN ID | PHRASE RHYTHM PATTERN ID | BASS DRUM RHYTHM PATTERN ID | SNARE DRUM RHYTHM PATTERN ID | HIGH-HAT RHYTHM PATTERN | CYMBAL RHYTHM PATTERN |
|---|---|---|---|---|---|---|---|---|---|---|---|---|---|
| 0001 | Bebop01 | Intro-I | A | Swing&Jazz | 120 | 4 | 010010101 | 020040101 | 030060101 | 040200101 | 050330101 | 060500101 | 070610101 |
| 0002 | Bebop01 | Intro-II | A | Swing&Jazz | 120 | 4 | 010010102 | 020040102 | 030060102 | 040200102 | 050330102 | 060500102 | 070610102 |
| 0003 | Bebop01 | Intro-III | A | Swing&Jazz | 120 | 4 | 010010103 | 020040103 | 030060103 | 040200103 | 050330103 | 060500103 | 070610103 |
| 0004 | Bebop01 | Main-A | A | Swing&Jazz | 120 | 4 | 010010104 | 020040104 | 030060104 | 040200104 | 050330104 | 060500104 | 070610104 |
| 0005 | Bebop01 | Main-B | A | Swing&Jazz | 120 | 4 | 010010105 | 020040105 | 030060105 | 040200105 | 050330105 | 060500105 | 070610105 |
| 0006 | Bebop01 | Main-C | A | Swing&Jazz | 120 | 4 | 010010106 | 020040106 | 030060106 | 040200106 | 050330106 | 060500106 | 070610106 |
| 0007 | Bebop01 | Main-D | A | Swing&Jazz | 120 | 4 | 010010107 | 020040107 | 030060107 | 040200107 | 050330107 | 060500107 | 070610107 |
| 0008 | Bebop01 | End01 | A | Swing&Jazz | 120 | 4 | 010010108 | 020040108 | 030060108 | 040200108 | 050330108 | 060500108 | 070610108 |
| 0009 | Bebop01 | End02 | A | Swing&Jazz | 120 | 4 | 010010109 | 020040109 | 030060109 | 040200109 | 050330109 | 060500109 | 070610109 |
| 0010 | Bebop01 | End03 | A | Swing&Jazz | 120 | 4 | 010010110 | 020040110 | 030060110 | 040200110 | 050330110 | 060500110 | 070610110 |
| 0011 | Bebop01 | Fillin-AA | A | Swing&Jazz | 120 | 4 | 010010111 | 020040111 | 030060111 | 040200111 | 050330111 | 060500111 | 070610111 |
| 0002 | Bebop01 | Fillin-AB | A | Swing&Jazz | 120 | 4 | 010010112 | 020040112 | 030060112 | 040200112 | 050330112 | 060500112 | 070610112 |
| 0003 | Bebop01 | Fillin-BB | A | Swing&Jazz | 120 | 4 | 010010113 | 020040113 | 030060113 | 040200113 | 050330113 | 060500113 | 070610113 |
| 0004 | Bebop01 | Fillin-CC | A | Swing&Jazz | 120 | 4 | 010010114 | 020040114 | 030060114 | 040200114 | 050330114 | 060500114 | 070610114 |
| ... | ... | ... | ... | ... | ... | ... | ... | ... | ... | ... | ... | ... | ... |

FIG. 16A (a)

| STYLE ID | St | Sni | Tssi | Tsei | Se |
|---|---|---|---|---|---|
| 0001 | Bebop01 | Intro-I | Tss01 | TSe01 | Se01 |
| 0002 | Bebop01 | Main-A | Tss02 | TSe02 | Se02 |
| 0003 | Bebop01 | Fillin-AA | Tss03 | TSe03 | Se03 |
| 0004 | Bebop01 | End01 | Tss04 | TSe04 | Se04 |

(b)

| STYLE ID | Key | Cni | Cri | Cti | Tcsi | Tcei | Ce |
|---|---|---|---|---|---|---|---|
| 0001 | A | Amaj | A | maj | Tcs1 | Tce1 | C1 |
| 0001 | A | D7 | D | 7 | Tcs2 | Tce2 | C2 |
| 0001 | A | E | E | — | Tcs3 | Tce3 | C3 |
| 0001 | A | Amaj | A | maj | Tcs4 | Tce4 | C4 |

FIG. 16B

| | INPUT BPM | 100 | TEMPO FILTER | OFF |
|---|---|---|---|---|
| | | 301 | 302 | |
| | | | MUSICAL TIME FILTER | OFF |
| | | | 303 | |

| 1ST SEARCH PART | CHORD |
|---|---|
| 2ND SEARCH PART | |

| No. | STYLE NAME | SIMILARITY | KEY | GENRE | BPM | TIME |
|---|---|---|---|---|---|---|
| 1 | Bebop 01 | 0.0312 | A | Swing&Jazz | 120 | 4/4 |
| 2 | Hard Rock 02 | 0.0352 | B | Pop&Rock | 120 | 4/4 |
| 3 | Free Jazz 03 | 0.0356 | D | Swing&Jazz | 124 | 4/4 |
| 4 | Roots Reggae 03 | 0.0356 | A | Reggae | 105 | 4/4 |
| 5 | Blues Rock 04 | 0.0469 | E | Pop&Rock | 148 | 8/8 |
| 6 | Dancehall Reggae 01 | 0.0480 | B | Reggae | 135 | 4/4 |
| 7 | 70's Funk 05 | 0.0921 | D | Soul,R&B | 130 | 8/8 |
| 8 | Deep House 02 | 0.1125 | C | House | 124 | 8/8 |
| 9 | Salsa 03 | 0.1145 | A | Latin | 176 | 4/4 |
| 10 | AfroBeat 04 | 0.3854 | E | Africa | 113 | 4/4 |

FIG. 18A

| | INPUT BPM | 100 | TEMPO FILTER | ON |
|---|---|---|---|---|
| | | 301 | 302 | |
| | | | MUSICAL TIME FILTER | OFF |
| | | | 303 | |

| 1ST SEARCH PART | CHORD |
|---|---|
| 2ND SEARCH PART | |

| No. | STYLE NAME | SIMILARITY | KEY | GENRE | BPM | TIME |
|---|---|---|---|---|---|---|
| 1 | Bebop 01 | 0.0312 | A | Swing&Jazz | 120 | 4/4 |
| 2 | Hard Rock 02 | 0.0352 | B | Pop&Rock | 120 | 4/4 |
| 3 | Free Jazz 03 | 0.0356 | D | Swing&Jazz | 124 | 4/4 |
| 4 | Roots Reggae 03 | 0.0356 | A | Reggae | 105 | 4/4 |
| 5 | Dancehall Reggae 01 | 0.0480 | B | Reggae | 135 | 4/4 |
| 6 | 70's Funk 05 | 0.0921 | D | Soul,R&B | 130 | 8/8 |
| 7 | Deep House 02 | 0.1125 | C | House | 124 | 8/8 |
| 8 | AfroBeat 04 | 0.3854 | E | Africa | 113 | 4/4 |

FIG. 18B

| | INPUT BPM | 100 | TEMPO FILTER | OFF |
|---|---|---|---|---|
| | | 301 | 302 | |
| | | | MUSICAL TIME FILTER | 4/4 |
| | | | 303 | |

| 1ST SEARCH PART | CHORD |
|---|---|
| 2ND SEARCH PART | HIGH-HAT |

| No. | STYLE NAME | SIMILARITY | KEY | GENRE | BPM | TIME |
|---|---|---|---|---|---|---|
| 1 | Bebop 01 | 0.0457 | A | Swing&Jazz | 120 | 4/4 |
| 2 | Hard Rock 02 | 0.0670 | B | Pop&Rock | 120 | 4/4 |
| 3 | Dancehall Reggae 01 | 0.1214 | B | Reggae | 135 | 4/4 |
| 4 | Roots Reggae 03 | 0.1295 | A | Reggae | 105 | 4/4 |
| 5 | AfroBeat 04 | 0.4258 | E | Africa | 113 | 4/4 |

FIG. 18C

| RHYTHM CATEGORY | TARGET ON-SET TIME INTERVAL |
|---|---|
| FOURTH | 11,12,23,24,35,36 |
| EIGHTH | 5,6,29,30,41,42 |
| EIGHTH TRIPLET | 3,4 |
| SIXTEENTH | 2,3,14,15,20,21,27,28,32,33,44,45 |
| 1.5 BEAT | 17,18 |
| 0.75 BEAT | 8,9 |
| Swing | 7,8,15,16,19,20 |

FIG. 21

| | | RHYTHM CATEGORY OF DB | | | | | | |
|---|---|---|---|---|---|---|---|---|
| | | FOURTH | EIGHTH | 1.5 BEAT | SIXTEENTH | 0.75 BEAT | EIGHTH TRIPLET | Swing |
| INPUT RHYTHM CATEGORY | FOURTH | 0 | 0.8 | 0.8 | 0.8 | 0.8 | 0.8 | 0.5 |
| | EIGHTH | 0.8 | 0 | 0.4 | 0.5 | 0.8 | 1 | 1 |
| | 1.5 BEAT | 0.8 | 0.4 | 0 | 0.8 | 0.6 | 1 | 1 |
| | SIXTEENTH | 0.8 | 0.5 | 0.8 | 0 | 0.6 | 1 | 1 |
| | 0.75 BEAT | 0.8 | 0.8 | 0.6 | 0.6 | 0 | 1 | 1 |
| | EIGHTH TRIPLET | 0.8 | 1 | 1 | 1 | 1 | 0 | 0.2 |
| | Swing | 0.5 | 1 | 1 | 1 | 1 | 0.2 | 0 |

FIG. 22

| RHYTHM CATEGORY | TARGET ON-SET TIME | SCORE |
|---|---|---|
| FOURTH | 0,11,12,23,24,35,36,47 | 2 |
| EIGHTH | 5,6,17,18,29,30,41,42 | 2 |
| | 0,11,12,23,24,35,36,47 | 1 |
| EIGHTH TRIPLET | 3,4,7,8,15,16,19,20,27,28,31,32,39,40,43,44 | 2 |
| | 0,11,12,23,24,35,36,47 | 1 |
| SIXTEENTH | 2,3,8,9,14,15,20,21,26,27,32,33,38,39,44,45 | 2 |
| | 0,11,12,23,24,35,36,47,5,6,17,18,29,30,41,42 | 1 |
FIG. 23
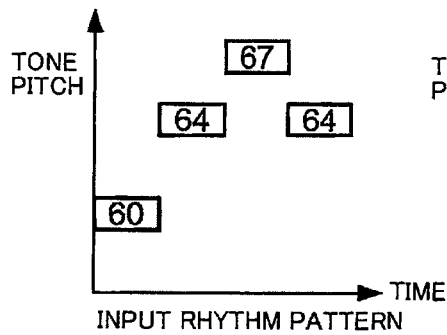
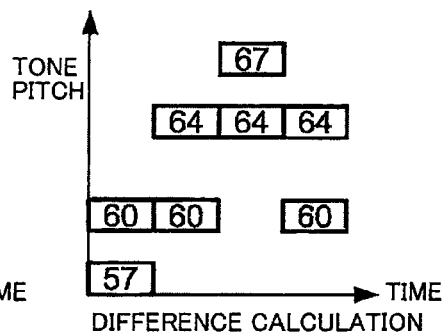
FIG. 24A     FIG. 24B
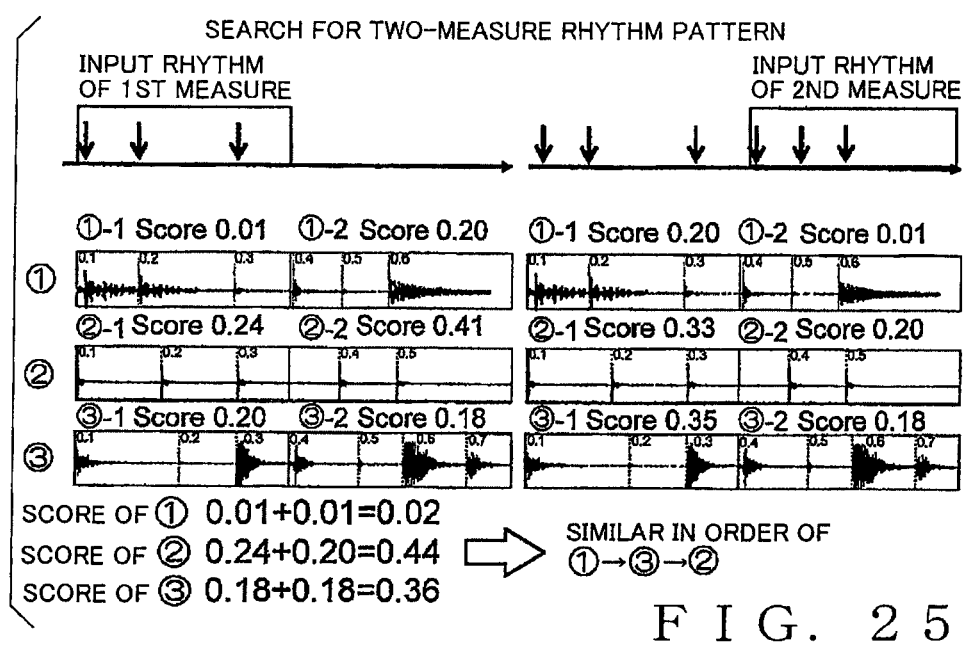
FIG. 25

| PART | GENRE | TEMPLATE | SEARCHED-OUT RESULT |
|---|---|---|---|
| DRUMS | ALL GENRE | INPUT RHYTHM | LastSearchKey |
| BASS | TECHNO | 4_on_the_floor | MC_Philadelphia |
| CHORD | HOUSE | 8BeatHiHat | MA_16BeatBasic |
| PHRASE | R&B | 16BeatHiHat | MA_16Beat_Pop_1 |
| | HIP-HOP | | MB_16BeatBasic1 |
| | CHILL | | MA_16Beat_Pop_2 |
| | FUNK | | MB_WestCoastPop |
| SEARCH | | | |

FIG. 28

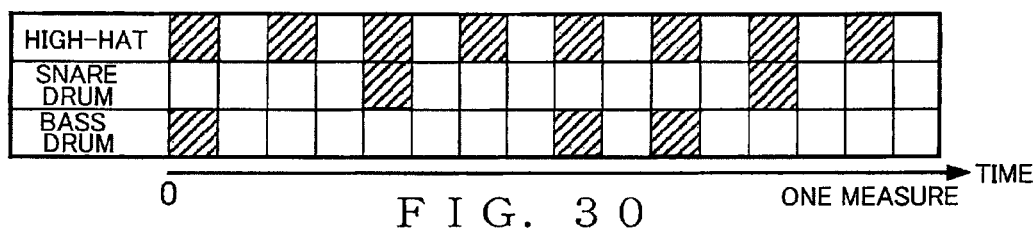
F I G. 3 0
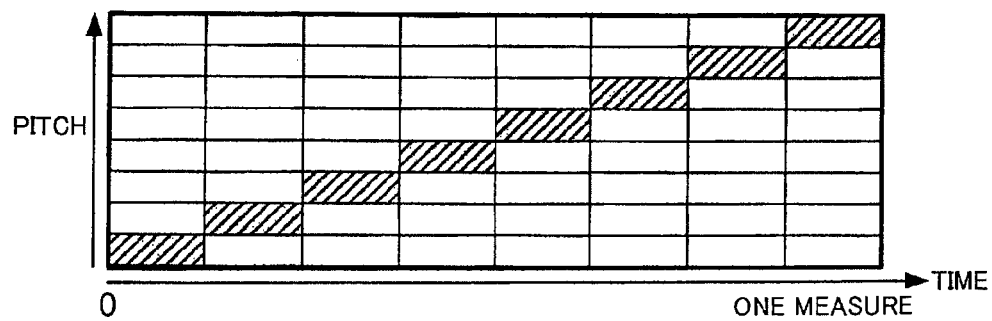
F I G. 3 1

SOUND DATA PROCESSING DEVICE AND METHOD

BACKGROUND

The present invention relates to a sound data processing device and method for processing sound data on the basis of performance operation etc., as well as a program for causing a computer to function as such a sound data processing device.

Heretofore, there has been known a technique for combining a plurality of accompaniment sound waveforms extracted from a plurality of different accompaniment sound sources and reproducing the thus-combined accompaniment sound waveforms. For example, Japanese Patent No. 2550825 (hereinafter referred to as "patent literature 1") discloses a technique which allows a user to execute an automatic accompaniment, based on an ensemble of accompaniment patterns of a plurality of performance parts, by searching for accompaniment patterns (sound generation patterns) of each of the plurality of performance parts by inputting a text, such as a letter string and logical operator and then combining searched-out accompaniment patterns (sound generation patterns) of the individual performance parts. Further, Japanese Patent No. 3480433 (hereinafter referred to as "patent literature 2") discloses a technique which, in a multi-track digital recording/reproduction apparatus, allows a particular number of recording tracks to be freely set and allows reproduction to be performed via a maximum number of usable reproducing tracks in accordance with the setting of the particular number of recording tracks.

However, with the search method disclosed in patent literature 1, where the user searches for accompaniment patterns by inputting a text, the user cannot input a rhythm or melody pattern intuitively and sensorily. If, in searching through accompaniment sound sources, the user is allowed to intuitively input a rhythm or melody pattern to be made an object of search, the search method would be able to provide more operability to the user.

SUMMARY OF THE INVENTION

In view of the foregoing prior art problems, the present invention seeks to not only provide an improved performance data search technique but also facilitate creation of new performance data on the basis of a search.

In order to accomplish the above-mentioned object, the present invention provides an improved sound data processing device for, for each of a plurality of performance parts, searching through a database, storing therein part performance data of a plurality of performance parts, for particular part performance data, the part performance data for each of the performance parts including a sound generation pattern and tone data corresponding to the sound generation pattern, which comprises: a query acquisition section configured to acquire a query pattern indicative of a sound generation pattern to be made an object of search; a search section configured to search through the database for part performance data including a sound generation pattern matching the query pattern; and a search instruction section configured to, in response to a user's operation, identify one part performance data from among searched-out part performance data from the database and instruct the search section to perform a search using, as a new query pattern, the sound generation pattern of the identified performance data.

According to the present invention, the user can readily input a searching query through a sensory operation, by inputting as a query pattern a desired sound generation pattern to be made an object of search, but also the user can obtain desired searched-out results fitting its (his or her) sensation. The present invention is also constructed to allow the user to instruct that a further search (re-search) be performed using, as a new query pattern, the sound generation pattern of the part performance data identified from the searched-out results. Thus, in a case like where a query pattern has not been input accurately by the user, an accurate sound generation pattern can be used as a query pattern for the re-search. As a result, the search input operation can be made much easier for the user to perform.

In an embodiment, the sound data processing device may further comprise an editing section configured to edit the identified part performance data in accordance with a user's operation. In such a case, the search instruction section may instruct the search section to perform a search using, as a new query pattern, the sound generation pattern of the part performance data edited by the editing section. The part performance data edited by the editing section may be registered into the database as new part performance data. In this way, creation of new part performance data can be facilitated.

In an embodiment, the sound data processing device may further comprise a memory configured to store therein data related to one set of performance data being currently processed, the one set of performance data comprising part performance data of a plurality of performance parts. One part performance data identified from among the searched-out results in response to the user's operation is stored into the memory as part performance data of one performance part in the one set of performance data. In this case, the part performance data of all of the performance parts in the one set of performance data stored in the memory are adjusted to synchronize with each other in tempo or time length of one measure. In this way, it is possible to readily create one set of performance data comprising a combination of part performance data of a plurality of performance parts selected on the basis of the search. The thus-created one set of performance data can be registered into the database.

In an embodiment, the database further stores therein information identifying each of a plurality of sets of performance data, each of the sets of performance data comprising part performance data of a plurality of performance parts. Also, the search section searches through the database for part performance data including a sound generation pattern matching the query pattern and lists one or more sets of performance data including the searched-out part performance data, and the search instruction section identifies, in response to a user's operation, one part performance data in any one set of performance data of the one or more sets of performance data listed by the search section. In this case, the sound data processing device may further comprise a memory configured to store therein data related to one set of performance data being currently processed, and any one set of performance data of the one or more sets of performance data listed by the search section may be stored into the memory.

The sound data processing device may further comprise an editing section configured to edit the one set of performance data stored in the memory and selected part performance data in the one set of performance data in accordance with a user's operation, and in this case, stored content of the memory is updated in accordance with editing by the editing section. Thus, it is possible to readily create new one set of performance data by editing one set of performance data selected on the basis of the search. The thus-created one set of performance data can be registered into the database.

According to another aspect of the present invention, there is provided an improved sound data processing device for, for each of a plurality of performance parts, searching through a database, storing therein part performance data of a plurality of performance parts, for particular part performance data and editing the particular part performance data, the part performance data for each of the performance parts including a sound generation pattern and tone data corresponding to the sound generation pattern, which comprises: a query acquisition section configured to acquire a query pattern indicative of a sound generation pattern to be made an object of search; a search section configured to search through the database for part performance data including a sound generation pattern matching the query pattern; and an editing section configured to, in accordance with a user's operation, identify one part performance data from among searched-out part performance data from the database and edit the identified part performance data. With such arrangements, it is possible to create new user-desired part performance data by editing part performance data identified from the searched-out results.

The present invention may be constructed and implemented not only as the apparatus invention discussed above but also as a method invention. Also, the present invention may be arranged and implemented as a software program for execution by a processor, such as a computer or DSP, as well as a non-transitory storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIGS. 5A and 5B are schematic diagrams showing example content of tables contained in an automatic accompaniment database employed in the first embodiment of the present invention;

FIG. 6 is a block diagram showing functional arrangements of the information processing device and other components around the information processing device in the first embodiment of the present invention;

FIG. 13 is a diagram showing an example of a key table in the first embodiment of the present invention;

FIG. 14 is a schematic diagram explanatory of processing performed in a loop reproduction mode in the first embodiment of the present invention;

FIG. 16A is a diagram showing an example of a table related to style data in the first embodiment of the present invention;

FIG. 16B is a diagram showing an example of a table related to style data in the first embodiment of the present invention;

FIGS. 18A to 18C are schematic diagrams showing examples of searched-out results of style data in the second embodiment of the present invention;

FIG. 21 is a diagram showing an example of an ON-set time interval table;

FIG. 22 is a diagram showing an example of a distance reference table:

FIG. 23 is a diagram showing an example of an ON-set time table;

FIGS. 24A and 24B are schematic diagrams explanatory of search processing using a tone pitch pattern;

FIG. 25 is a schematic diagram explanatory of processing for searching for a rhythm pattern of a plurality of measures;

FIG. 28 is a diagram showing an example of a UI screen employed in the third embodiment;

FIG. 30 is a diagram showing an example of an input screen displayed in a sequencer area;

FIG. 31 is a diagram showing another example of the input screen displayed in the sequencer area.

DETAILED DESCRIPTION

Embodiments of the present invention will be described hereinbelow.

1. First Embodiment

Music Data Creation System

A first embodiment of the present invention is a music data creation system that is an example of a music data processing system. In the instant embodiment, automatic accompaniment data are read into an electronic musical instrument, sequencer or the like so as to function similarly to so-called MIDI automatic accompaniment data.

1-1. Construction

Figure 1:
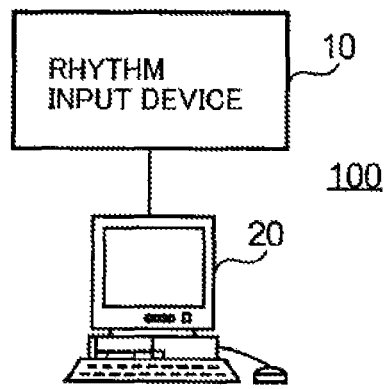
FIG. 1 is a schematic diagram showing a general setup of a system according to a first embodiment of the present invention.

FIG. 1 is a schematic diagram showing a general setup of a music data creation system 100 according to the first embodiment of the present invention. The music data creation system 100 includes a rhythm input device 10 and an information processing device (sound data processing device) 20, and the rhythm input device 10 and the information processing device (sound data processing device) 20 are communicatably interconnected via communication lines. The communication between the rhythm input device 10 and the information processing device 20 may be implemented in a wireless fashion. In the first embodiment, the rhythm input device 10 includes, for example, a keyboard and electronic input pads as input means. In response to a user depressing a key of the keyboard provided in the rhythm input device 10, the rhythm input device 10 inputs, to the information processing device 20, trigger data indicating that a key of the keyboard has been depressed, i.e. that performance operation has been performed by the user and velocity data indicative of intensity of the key depression, i.e. intensity of the user's performance operation. The rhythm input device 10 inputs such trigger data and velocity data to the information processing device 20 with one measure as an input unit. One trigger data, which is generated each time the user depresses a key of the keyboard, is represented by key-on information indicating that the key has been depressed. One velocity data is associated with each such trigger data. A set of trigger data and velocity data generated within each measure represents a rhythm pattern input by the user using the rhythm input device 10 (hereinafter sometimes referred to as "input rhythm pattern"). The user inputs such a rhythm pattern for a performance part corresponding to (assigned to) a respective key range of the keyboard. Further, for a performance part of a percussion instrument, the user inputs a rhythm pattern using any one of the input pads. Namely, the rhythm input device 10 is an example of an input means via which performance operation is input by the user. The rhythm input device 10 is used also as an operation device for the user to input a desired sound generation pattern as a searching query pattern.

The information processing device 20 is, for example, a PC (Personal Computer). The information processing device 20 includes a database that contains a plurality of automatic accompaniment data sets, a plurality of tone data sets (sound waveform data sets) to be used for individual performance parts constituting the automatic accompaniment data sets, and an application using the database. The application includes a selection function for selecting a performance part on the basis of a rhythm pattern input to search for a tone data set (namely, in this case, the input rhythm pattern is a search key), and a reproduction function for reproducing automatic accompaniment data being currently created or already created. Each automatic accompaniment data set comprises a combination of a plurality of different performance parts, such as a bass, chord, melodic phrase comprising a time series of single notes (i.e., single-note-based phrase), bass drum, snare drum, high-hat and cymbals, each having a specific rhythm pattern. More specifically, these data sets comprise automatic accompaniment data tables and various files, such as files of rhythm pattern data (e.g., data of a text format) and tone data (e.g., data of a WAVE format, i.e. sound waveform data), defined in the automatic accompaniment data tables. Each tone data set, which comprises data of a performance part, is a set of sound waveform data indicative of waveforms of performance sounds having a single tone color and a predetermined length (e.g., two, four or eight measures) and is recorded in a file format, such as the WAVE or mp3 (MPEG Audio Layer-3) format. Note that the aforementioned database also has recorded therein tone data sets (sound waveform data sets) each of which is currently unused in any one of automatic accompaniment data sets and can be used to replace a tone data set (sound waveform data set) of any one of a plurality of performance parts constituting existing one set of automatic accompaniment data (automatic accompaniment data set).

More specifically, via the selection function, the information processing device 20 searches through the database for tone data sets (sound waveform data sets) having rhythm patterns identical or similar to a rhythm pattern (query pattern) input by the user via the rhythm input device 10 for a user-designated performance part, and it then displays a list of names etc. of automatic accompaniment data sets having the searched-out results, i.e. searched-out tone data sets. Then, the information processing device 20 audibly outputs tones (or sounds) based on an automatic accompaniment data set selected by the user from the displayed list. At that time, the information processing device 20 repetitively reproduces tones (or sounds) based on the user-selected searched-out automatic accompaniment data set. Namely, automatic accompaniment data sets are searched for on the basis of a rhythm pattern input by the user for any one of a plurality of performance parts and then the user selects one of the searched-out automatic accompaniment data sets, upon which the information processing device 20 reproduces performance sounds based on the user-selected automatic accompaniment data set. If any performance part has already been selected, information processing device 20 executes the reproduction after speeding up or slowing down a tempo as necessary such that that performance part is synchronized with the already-selected performance part in predetermined timing, such as beat timing. Namely, in the music data creation system 100, a plurality of different performance parts are selected by the user and then the user inputs a rhythm pattern for each of the selected performance parts, so that a search is performed for the selected performance part on the basis of the input rhythm pattern. Then, in response to selecting and combining automatic accompaniment data of desired performance parts from among automatic accompaniment data represented by searched-out results, these automatic accompaniment data are reproduced in synchronism. Note that such a search function is turned on or off by the user operating a later-described operation section 25. The aforementioned database may be provided outside the information processing device 20, in which case the database may communicate with the information processing device 20 via a communication network.

Among operation modes in which the information processing device 20 executes an application program are a loop reproduction mode, a performance reproduction mode and a performance loop reproduction mode. The user can switch among these operation modes via the later-described operation section 25 provided in the information processing device 20. When the operation mode is the loop reproduction mode, the information processing device 20 searches through the database, storing therein a plurality of tone data sets having different rhythm patterns, for a tone data set having a rhythm pattern identical or most similar to a rhythm pattern input via the rhythm input device 10 and converts the searched-out tone data set into sounds to audibly output the converted sounds. At that time, the information processing device 20 repetitively reproduces the sounds based on the searched-out tone data set. Further, when the operation mode is the performance reproduction mode, the information processing device 20 can not only output sounds based on a searched-out tone data set, but also output sounds based on performance operation using component sounds or notes of the searched-out tone data set. Furthermore, when the operation mode is the performance loop reproduction mode, the information processing device 20 can not only repetitively output sounds based on a searched-out tone data set, but also repetitively output sounds based on performance operation executed by the user using component sounds or notes of a searched-out phrase. Note that examples of the "searched-out phrase" include a percussion instrument phrase and a chord phrase rather than being limited to a melodic phrase alone; in short, the "searched-out phrase" means any of all types of musical phrases realizable by part performance data obtained as a search result.

Figure 2:
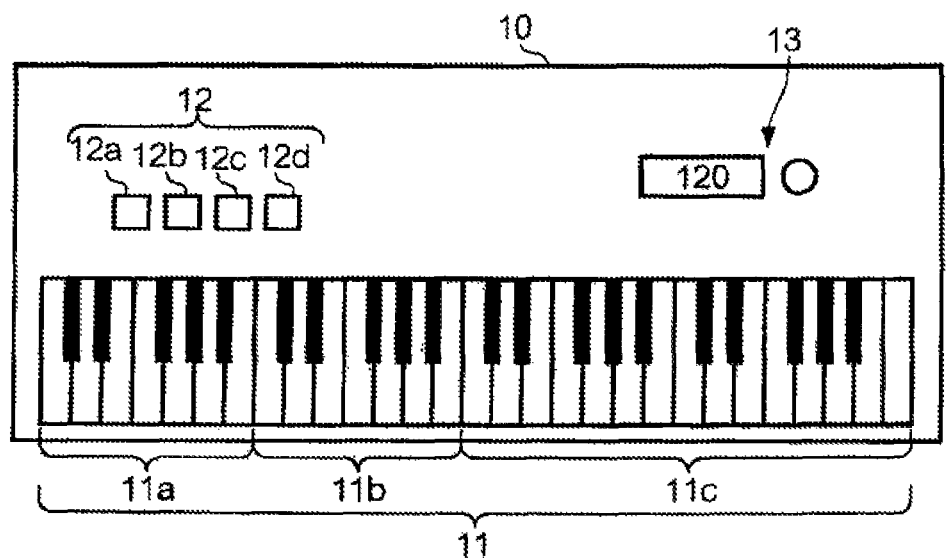
FIG. 2 is a schematic diagram showing a rhythm input device provided in the first embodiment of the present invention.

FIG. 2 is a schematic view of the rhythm input device 10. The rhythm input device 10 includes, as the input means, the keyboard 11 and input pads 12. Using any one of these input means, the user can input, as a searching query pattern, a desired sound generation pattern (typically, a desired rhythm pattern) that is to be made an object of search. On the basis of the input searching query pattern (typically, rhythm pattern), the information processing device 20 searches through a storage device (e.g., later-described automatic accompaniment database 221) having a plurality of sets of performance data stored therein, performance data (tone data set) having a sound generation pattern (e.g., rhythm pattern or melody pattern) matching the input searching query pattern. The different performance parts are associated with predetermined ranges of the keyboard 11 and types of the input pads 12 in the rhythm input device 10. For example, the entire key range of the keyboard 11 is divided, at two split points, into a low-pitch key range, medium-pitch key range and high-pitch key range. The low-pitch key range is for use as a bass inputting range keyboard 11*a* with which the bass part is associated. The medium-pitch key range is for use as a chord inputting range keyboard 11*b* with which the chord part is associated. The high-pitch key range is for use as a phrase inputting range keyboard 11*c* with which the part of a melodic phrase comprising a time series of single notes (single-note-based phrase part) is associated. Further, a bass drum part is associated with the bass drum input pad 12*a*, a snare drum part is associated with the snare drum input pad 12*b*, a high-hat part is associated with the high-hat input pad 12*c*, and a cymbal part is associated with the cymbal input pad 12*d*. By executing performance operation designating any one of the key ranges that is to be depressed on the keyboard 11 or any one of the input pads 12 that is to be depressed, the user can search for a tone data set for the performance part associated with the designated input means (key range or pad). Namely, individual regions where the keyboard 11 and the input pads 12 are located correspond to various performance controls or operators.

For example, once the user inputs a rhythm pattern by depressing the key range corresponding to the bass inputting range keyboard 11*a*, the information processing device 20 identifies a bass tone data set having a rhythm pattern identical to or falling within a predetermined range of similarity to the input rhythm pattern, and then the information processing device 20 displays the thus-identified bass tone data set as a searched-out result. In the following description, the bass inputting range keyboard 11*a*, chord inputting range keyboard 11*b*, phrase inputting range keyboard 11*c*, bass drum input pad 12*a*, snare drum input pad 12*b*, high-hat input pad 12*c* and cymbal input pad 12*d* will sometimes be referred to also as "performance operators" because they are operated by the user when inputting rhythm patterns. Once the user operates any one of the performance operators, the rhythm input device 10 inputs an operation signal, corresponding to the user's operation, to the information processing device 20. For convenience of description, let it be assumed here that the operation signal is information of the MIDI (Musical Instrument Digital Interface) format; thus, such information will hereinafter be referred to as "MIDI information". Such MIDI information includes, in addition to the aforementioned trigger data and velocity data, a note number if the performance operator used is the keyboard, or channel information if the performance operator used is one of the pads. The information processing device 20 identifies, on the basis of the MIDI information received from the rhythm input device 10, the performance part (target performance part) for which the performance operation has been executed by the user.

Further, the rhythm input device 10 includes a BPM input operator 13. "BPM" indicates the number of beats per minute and more specifically a tempo of tones notified to the user on the rhythm input device 10. The BPM input operator 13 comprises, for example, a display surface, such as a liquid display, and a wheel. Once the user rotates the wheel, a BPM value corresponding to a rotation-stopped position of the wheel (i.e., rotational position to which the wheel has been rotated) is displayed on the display surface. The BPM input via the BPM input operator 13 will be referred to as "input BPM". The rhythm input device 10 inputs, to the information processing device 20, MIDI information, including information identifying the input BPM, together with the input rhythm pattern. Then, on the basis of the input BPM included in the MIDI information, the information processing device 20 informs the user of the tempo and performance progression timing, for example, by audibly outputting sounds via the sound output section 26 and/or blinking light on the display section 24 (so-called "metronome function"). Thus, the user can operate the performance operator on the basis of the tempo and performance progression timing felt from these sounds or lights.

Figures 3, 4A, 4B, 4C:
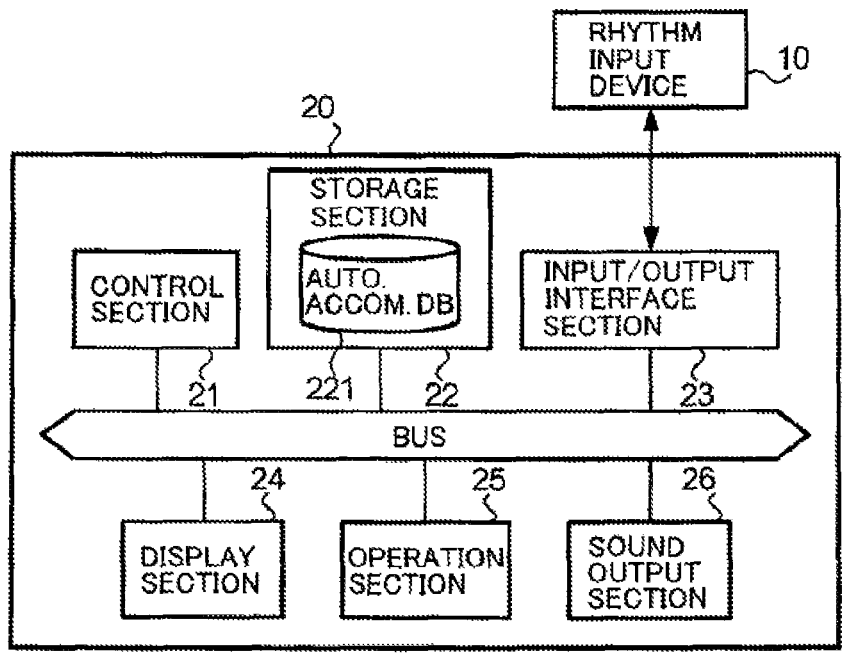
FIG. 3 is a block diagram showing a hardware setup of an information processing device provided in the first embodiment of the present invention.
FIGS. 4A to 4C are schematic diagrams showing example content of tables contained in an automatic accompaniment database in the first embodiment of the present invention.

FIG. 3 is a block diagram showing an example hardware setup of the information processing device 20. The information processing device 20 includes a control section 21, a storage section 22, an input/output interface section 23, a display section 24, the operation section 25 and a sound output section 26, which are interconnected via a bus. The control section 21 is a control device for controlling various components or sections of the information processing device 20, and it includes for example a CPU and memories (e.g., ROM and RAM). Also, a later-described memory for the automatic accompaniment data tables is set in the RAM within the control section 21 for temporarily storing a set of automatic accompaniment data (i.e., automatic accompaniment data set) currently selected or currently being created. The storage section 22 is a storage device that stores various data and programs, and it includes for example an HDD. The input/output interface section 23 is an interface that relays input and output of instructions and data between the information processing device 20 and the rhythm input device 10. The display section 24 is a display device that displays letters, characters or images or a combination of letters, characters and images, and it includes for example an LCD. The operation section 25 is an input device that receives a user's operation and supplies the control section 21 with a signal corresponding to the received operation, and it includes for example a key pad, a keyboard or a touch screen or a combination thereof. The sound output section 26 is a device that outputs sounds as data processing progresses, and it includes for example a speaker and an amplifier. In the illustrated example, the sound output section 26 includes an automatic accompaniment DB (database) 221 as an example of the storage device storing a plurality of performance data sets. For example, each performance data set (e.g., automatic accompaniment data set) comprises performance data of a plurality of performance parts (i.e., part performance data), and the part performance data of each performance part includes a sound generation pattern (e.g., rhythm pattern or melody pattern) and a tone data set (sound waveform data set) corresponding to the sound generation pattern. As an example, the automatic accompaniment DB 221 contains various information (e.g., MIDI information) related to the automatic accompaniment data sets, tone data sets, and various information related to these data sets.

FIGS. 4A to 4C, 5A and 5B are schematic diagrams showing example content of tables contained in the automatic accompaniment DB 221. More specifically, the automatic accompaniment DB 221 contains a part table, a musical instrument type table, a rhythm category table and a rhythm pattern table. FIG. 4A shows an example of the part table. "part ID" in FIG. 4A is an identifier uniquely identifying each of a plurality of performance parts constituting an automatic performance data set, and each part ID is represented, for example, by a 2-digit number. "part name" is a name indicative of a type of a performance part. Different part IDs are defined in the part table in association with the individual performance parts, such as "bass", "chord", "phrase" (melodic phrase), "bass drum", "snare drum", "high-hat" and "cymbals"; the "part name" is not limited to those shown in FIG. 4A and any other part names may be defined in the part table. "note number" is MIDI information indicating which one of key ranges of the keyboard 11 the performance part is allocated to. According to the MIDI information, note number "60" is allocated to "middle C" of the keyboard. With note number "60" used as a basis, note numbers equal to and smaller than a first threshold value of "45" are allocated to the "bass" part, and note numbers equal to and greater than a second threshold value of "75" are allocated to the "phrase" (melodic phrase) part, and note numbers equal to and greater than "46" and equal to and smaller than "74" are allocated to the "chord" part. Note that the above-mentioned first and second threshold values are just illustrative and may be changed as necessary by the user.

Further, "channel information" is MIDI information indicating which one of the input pads a performance part is allocated to. In the illustrated example 4A, channel information "12a" is allocated to the "bass drum" part, channel information "12b" is allocated to the "snare drum" part, channel information "12c" is allocated to the "high-hat" part, and channel information "12d" is allocated to the "cymbal" part.

FIG. 4B shows an example of the musical instrument type table. "musical instrument type ID" is an identifier uniquely identifying a type of a musical instrument, and each "musical instrument type ID" is represented, for example, by a three-digit number. "musical instrument type" is a name indicative of a type of a musical instrument. For example, different musical instrument type IDs are defined in the musical instrument type table in association with individual musical instrument types, such as "wood bass", "electric bass" and "slap bass". For example, musical instrument type "wood bass" is defined in the musical instrument type table in association with musical instrument type ID "001". Similarly, the other musical instrument types are defined in the musical instrument type table in association with their respective musical instrument type IDs. Note that musical instrument types are not limited to those shown in FIG. 4B and any other musical instrument types may be defined in the musical instrument type table.

FIG. 4C shows an example of the rhythm category table. "rhythm category ID" is an identifier uniquely identify a category of a rhythm pattern (herein also referred to as "rhythm category"), and each "rhythm category ID" is represented, for example, by a two-digit number. Here, each rhythm pattern represents a series of times at which individual notes are to be audibly generated within a time period of a predetermined time length. Particularly, in the instant embodiment, each "rhythm pattern" represents a series of times at which individual notes are to be audibly generated within a measure (bar) that is an example of the predetermined time period. "rhythm category" is a name indicative of a rhythm category, and a plurality of unique rhythm category IDs are defined in the rhythm category table in association with individual rhythm categories, such as "eighth", "sixteenth" and "eighth triplet". For example, the "eighth" rhythm category is defined in the rhythm category table in association with rhythm category ID "01". Note that the rhythm category is not limited to those shown in FIG. 4C and any other rhythm categories may be defined in the rhythm category table. For example, there may be employed rougher categorization into beats or genres, or finer categorization achieved by assigning a separate category ID to each rhythm pattern. Alternatively, such rougher categorization and finer categorization may be combined to provide categories of a plurality of hierarchical layers.

FIG. 5A shows an example of the rhythm pattern table. In the rhythm pattern table, there are stored a plurality of rhythm pattern records (part performance data) grouped for per part ID that uniquely identifies a performance part. In FIG. 5A, a plurality of rhythm pattern records of the "bass" part (part ID "01") are shown, as an example of the rhythm pattern table. Each of the rhythm pattern records (part performance data) includes a plurality of items, such as "automatic accompaniment ID", "part ID", "musical instrument type ID)", "rhythm category ID", "rhythm pattern ID", "rhythm pattern data" and "attack intensity pattern data", "tone data", "key", "genre", "BPM" and "chord". Such rhythm pattern tables are stored grouped on a performance-part-by-performance-part basis.

"automatic accompaniment ID" is an identifier uniquely identifying an automatic accompaniment data set, and the same automatic accompaniment ID is allocated to rhythm pattern records (part performance data) of individual performance parts constituting an automatic accompaniment data set. For example, automatic accompaniment data (part performance data) having the same automatic accompaniment ID are set or adjusted in such a manner that the automatic accompaniment data (part performance data) have the same content for an item, such as "genre", "key" or "BPM", as a result of which an uncomfortable feeling can be significantly reduced when the automatic accompaniment data are reproduced in an ensemble for a plurality of performance parts. As noted above, "musical instrument type ID" is an identifier uniquely identifying a type of a musical instrument. Rhythm pattern records having the same part ID are grouped per musical instrument type ID, and the user can select a musical instrument type by use of the operation section 25 before inputting a rhythm (query pattern) by use of the input device 10. The musical instrument type selected by the user is stored into the RAM. "rhythm category ID" is an identifier identifying which one of the rhythm categories each of the rhythm pattern records belongs to. In the illustrated example of FIG. 5A, the rhythm pattern record of which the "rhythm category ID" is "01" belongs to the "eighth" (i.e., eight-note) rhythm category as indicated in the rhythm category table shown in FIG. 4C. "rhythm pattern ID" is an identifier uniquely identifying a rhythm pattern record, and it is, for example, in the form of a nine-digit number. The nine-digit number comprises a combination of two digits of the "part ID", three digits of the "musical instrument type ID", two digits of the "rhythm category ID" and two digits of a suffix number.

"rhythm pattern data" includes a data file having recorded therein sound generation start times of individual component notes of a phrase (musical phrase) constituting one measure; for example, the data file is a text file having the sound generation start times of the individual component notes described therein. The rhythm pattern data is indicative of a rhythm pattern (i.e., sound generation pattern). In a later-described matching operation, the sound generation start times in the rhythm pattern data are associated with trigger data included in an input rhythm pattern (query pattern input for a search purpose and indicating that performance operation has been executed by the user. Here, the sound generation start time of each of the component notes is normalized in advance using the length of one measure as a value "1". Namely, the sound generation start time of each of the component notes described in the rhythm pattern data takes a value in the range from "0" to "1".

The rhythm pattern data may be created by a human operator extracting ghostnotes from a commercially available audio loop material. However, creation of the rhythm pattern data may be effected by any other desired method rather than being limited to the above-mentioned method. For example, rhythm pattern data may be extracted by a computer automatically extracting ghostnotes in advance. For example, in a case where data from which rhythm pattern data are extracted are in the MIDI format, rhythm pattern data may be created by a computer in the following manner. A CPU of the computer extracts generation start times of channel-specific component notes from the MIDI-format data for one measure and removes ghostnotes (such as those having extremely small velocity data) that are difficult to be judged as rhythm inputs. Then, if there have been a plurality of inputs, like chord inputs, within a predetermined time period in the MIDI-format data having the ghostnotes removed therefrom, then the CPU of the computer automatically creates rhythm pattern data by performing a process for organizing or combining such a plurality of inputs into one rhythm input.

Further, for the drum parts, sounds of a plurality of musical instruments, such as the bass drum, snare drum and cymbals, may sometimes exist within one channel. In such a case, the CPU of the computer extracts rhythm pattern data in the following manner. Further, for the drum parts, musical instrument sounds are, in many cases, fixedly allocated in advance to various note numbers. For convenience of description, let it be assumed here that a tone color of the snare drum is allocated to note number "40". On the basis of such assumption, the CPU of the computer extracts, in the channel having recorded therein the drum parts of the accompaniment sound sources, rhythm pattern data of the snare drum by extracting sound generation start times of individual component notes of the note number to which the tone color of the snare drum is allocated.

"attack intensity pattern data" is a data file having recorded therein attack intensity of individual component notes of a phrase (musical phrase) constituting one measure; for example, the attack intensity pattern data is a text file having the sound generation start times of the individual component notes described therein as numerical values. The attack intensity corresponds to velocity data included in an input rhythm pattern and indicative of intensity of user's performance operation. Namely, each attack intensity represents an intensity value of a component note of a phrase. The attack intensity may be described in a text file as velocity data itself of MIDI information.

"tone data" (tone data name) is a name of a data file pertaining to sounds themselves based on a rhythm pattern record, i.e. a name of a sound waveform data file; for example, the "tone data" represents a file of an actual tone data set (sound waveform data set) in a sound file format, such as the WAVE or mp3. "key" represents a key of tones represented by a tone data set.

"genre" represents a musical genre which a rhythm pattern record belongs to. "BPM" represents the number of beats per minute and more particularly a tempo of tones (i.e., sounds) based on a tone data set included in a rhythm pattern record.

In the instant embodiment, tone data sets (sound waveform data sets) corresponding to rhythm patterns (sound generation patterns) are stored in a storage region separate from the storage region of the rhythm patterns, and an actual tone data set (sound waveform data set) is identified by a tone data name (file name) stored in the rhythm pattern table. Alternatively, not only a rhythm pattern (sound generation pattern) but also a tone data set (sound waveform data set) corresponding to the rhythm pattern (sound generation pattern) may be stored as "rhythm pattern data". In such a case, the rhythm pattern data comprises audio data of any one of various sound file formats as described later.

"chord" represents a type of a chord of tones represented by tone data. Such a "chord" is set in a rhythm pattern record of which the performance part is the chord part. In the illustrated example of FIG. 5A, "Maj7" is shown as an example of the "chord" in a rhythm pattern record of which the "part ID" is "02". A rhythm pattern record of which the performance part is the "chord" part has a plurality of types of "chords" for a single rhythm pattern ID, and tone data corresponding to the individual "chords". In the illustrated example of FIG. 5A, a rhythm pattern record of which the rhythm pattern ID is "020040101" has tone data corresponding to a plurality of chords, such as "Maj", "7", "min", "dim" and "Sus4". In this case, rhythm pattern records having a same rhythm pattern ID each have same content except for the "tone data" and "chord". In this case, each of the rhythm pattern records may have a tone data set comprising only root notes of individual chords (each having the same pitch as the "key") and a tone data set comprising individual component notes, excluding the root notes, of the individual chords. In this case, the control section 21 simultaneously reproduces tones represented by the tone data set comprising only root notes of individual chords and the tone data set comprising individual component notes, excluding the root notes, of the individual chords designated by the user. FIG. 5A shows, by way of example, the rhythm pattern record of which the performance part is the "bass" part; actually, however, rhythm pattern records corresponding to a plurality of types of performance parts (in this case, chord, phrase, bass drum, snare drum, high-hat and cymbals) are described in the rhythm pattern table, as partly shown in FIG. 5A.

FIG. 5B shows an example of the automatic accompaniment data table. This automatic accompaniment data table is a table defining, per performance part, under which conditions and which tone data sets are to be used in an automatic accompaniment. The automatic accompaniment data table is constructed in generally the same manner as the rhythm pattern table. An automatic accompaniment data set described in a first row of the automatic accompaniment data table comprises a combination of particular related performance parts and defines information related to an automatic accompaniment in an ensemble performance. In order to be distinguished from the other data, such information related to an automatic accompaniment in an ensemble performance is assigned a part ID of "99", musical instrument type ID of "999" and rhythm pattern ID of "999990101". These values indicate that the automatic accompaniment data set in question comprises data of an ensembled automatic accompaniment. Further, the information related to an automatic accompaniment in an ensemble performance includes one tone data set "Bebop01.wav" synthesized by combination of tone data sets of individual performance parts. In reproduction, the tone data set "Bebop01.wav" is reproduced with all of the performance parts combined together. Note that a file that permits a performance of the plurality of performance parts with a single tone data set as an automatic accompaniment data set is not necessarily required. If there is no such file, no information is defined in a "tone data" section. Further, a rhythm pattern and attack intensity based on tones of the ensembled automatic accompaniment (i.e., Bebop01.wav) are described in "rhythm pattern data" and "attack intensity pattern data" sections, respectively. Further, in FIG. 5B, an automatic accompaniment data set in a second row represented by a part ID "01" and automatic accompaniment data sets in rows following the second row represent contents selected by the user on a part-by-part basis. In this example, particular musical instruments are designated by the user for individual performance parts of part IDs "01" to "07", and then automatic accompaniment data sets in a "BeBop" style are selected by the user. Further, in the illustrated example of FIG. 5B, no "key" is designated for performance parts corresponding to rhythm musical instruments. However, when tone pitch conversion is to be performed, a tone pitch functioning as a basis (i.e., basic pitch) for the tone pitch conversion may be designated so that a designated pitch of tone data is converted in accordance with an interval between the designated pitch and the basic pitch.

FIG. 6 is a block diagram showing functional arrangements of the information processing device 20 and other components around the information processing device 20. The control section 21 reads out individual programs, constituting the application stored in the ROM or storage section 22, into the RAM, and executes the read-out programs to thereby implement respective functions of a tempo acquisition section 211, advancing section 212, notification section 213, part selection section 214, pattern acquisition section 215, search section 216, identification section 217, output section 218, chord reception section 219 and pitch reception section 220. Although the following describe various processing as being performed by the above-mentioned various sections, a main component that performs the processing is, in effect, the control section 21. In the following description, the term "ON-set" means that the input state of the rhythm input device 10 is switched from OFF to ON. For example, the term "ON-set" means that a key has been depressed if a keyboard is the input means of the rhythm input device 10, that a pad has been hit if the pad is the input means of the rhythm input device 10, or that a button has been depressed if the button is the input means of the rhythm input device 10. The term "OFF-set", on the other hand, means that a key has been released from the depressed state if the keyboard is the input means of the rhythm input device 10, that hitting of a pad has been completed if the pad is the input means of the rhythm input device 10, or that a finger has been released from a button if the button is the input means of the rhythm input device 10. Further, in the following description, the term "ON-set time" indicates a time point at which the input state of the rhythm input device 10 has been changed from OFF to ON. In other words, the "ON-set time" indicates a time point at which trigger data has been generated in the rhythm input device 10. The term "OFF-set time", on the other hand, indicates a time point at which the input state of the rhythm input device 10 has been changed from ON to OFF. In other words, the "OFF-set time" indicates a time point at which generated trigger data has disappeared in the rhythm input device 10. Furthermore, in the following description, the term "ON-set information" is information input from the rhythm input device 10 to the information processing device 20 at the ON-set time. The "ON-set information" includes, in addition to the above-mentioned trigger data, a note number of a key of the keyboard, channel information, or the like.

The tempo acquisition section 211 acquires a BPM designated by the user, i.e. a user-designated tempo. Here, the BPM is designated by the user using at least one of the BPM input operator 13 and a later-described BPM designating slider 201. The BPM input operator 13 and the BPM designating slider 201 are constructed to operate in interlocked relation to each other, so that, once the user designates a BPM using one of the BPM input operator 13 and the BPM designating slider 201, the designated BPM is displayed on a display section of the other of the BPM input operator 13 and the BPM designating slider 201. Upon receipt of a tempo notification start instruction given by the user via a not-shown switch, the advancing section 212 advances a current position (performance progression timing) within a measure from the time point when the instruction has been received. The notification section 213 notifies the user of the current position within the measure. More specifically, in the case where each component note is normalized using the length of one measure as "1", the notification section 213 outputs, to the pattern acquisition section 215 once every several dozens of msec (milliseconds), the current position located on the advancing time axis, as a clock signal (hereinafter referred to as "bar line clock signal"). Namely, the bar line clock indicates where in the measure the current time is located, and it takes a value in the range from "0" to "1". The notification section 213 generates bar line clock signals on the basis of a tempo designated by the user.

The part selection section 214 selects a particular performance part on the basis of user's designation from among a plurality of performance parts. More specifically, the part selection section 214 identifies whether performance-part identifying information included in MIDI information input from the rhythm input device 10 is a note number or a channel information. Then, the part selection section 214 determines, on the basis of the identified information and the part table included in the automatic accompaniment database (DB) 221, which of the performance operators has been operated by the user, i.e. which of a plurality of performance parts, constituting an automatic accompaniment data set, has been designated by the user for rhythm pattern input, and then the part selection section 214 selects tone data sets, rhythm pattern table, etc. of the performance part to be subjected to search processing. If the received MIDI information is a note number, the part selection section 214 compares the received note number and the described content of the part table to thereby determine which of the bass inputting range keyboard 11*a*, chord inputting range keyboard 11*b* and phrase inputting range keyboard 11*c* the user's operation corresponds to, and then the part selection section 214 selects tone data sets, rhythm pattern table, etc. of the corresponding performance part. Further, if the received MIDI information is channel information, the part selection section 214 compares the received channel information and the described content of the part table to thereby determine which of the bass drum input pad 12*a*, snare drum input drum 12*b*, high-hat input pad 12*c* and cymbal input pad 12*d* the user's operation corresponds to, and then the part selection section 214 selects tone data sets, rhythm pattern table, etc. of the corresponding performance part. The part selection section 214 outputs, to the search section 216, the part ID corresponding to the selected performance part.

The pattern acquisition section 215 acquires a rhythm pattern (searching query pattern) input for a particular performance part from among the plurality of performance parts. More specifically, the pattern acquisition section 215 stores, on the basis of the bar line clock, individual time points when trigger data has occurred (i.e. individual ON-set times), input from the rhythm input device 10, into the RAM per measure. A series of the ON-set times thus stored in the RAM per measure constitutes an input rhythm pattern (searching query pattern). Because each of the ON-set times stored in the RAM is based on the bar line clock signals, it takes a value in the range from "0" to "1" just like the bar line clock signals. Bar line clock signals input from an external source to the information processing device 20 may be used as the above-mentioned bar line clock signals.

In order for the user to accurately input a rhythm pattern per measure, a time point when a bar line starts has to be fed back to the user from the information processing device 20. For that purpose, it is only necessary that the position of the bar line be visually or audibly indicated to the user by the information processing device 20 generating a sound or light or changing displayed content on a display screen per measure and/or beat, for example, like a metronome. At that time, the sound output section 26 generates a sound or the display section 24 generates a light on the basis of the bar line clock signals output from the notification section 213. Alternatively, the output section 218 may audibly reproduce, in accordance with the bar line clock signals, accompaniment sounds having a click sound, indicative of the position of the bar line, added thereto in advance. In this case, the user inputs a rhythm pattern in accordance with the bar line felt by the user from the accompaniment sound source.

The search section 216 searches through the automatic accompaniment database 221 having stored therein a plurality of tone data sets, each comprising data of tones, and thereby acquires tone data sets as searched-out results on the basis of a result of comparison between a rhythm pattern of tones included in each of tone data sets of a particular performance part and an input rhythm pattern (searching query pattern). Namely, the search section 216 searches through the storage device (automatic accompaniment DB 221) for rhythm patterns matching the searching query pattern. The automatic accompaniment DB 221 has stored therein separate tone data sets for individual performance parts. Then, the search section 216 displays the searched-out results on the display section 24 so that the user can select a desired tone data set from among the tone data sets included in the searched-out results, and then the search section 216 registers the user-selected tone data set as automatic accompaniment data of a performance part in an automatic accompaniment data set. By repeating such operation for each performance part, the user can create an automatic accompaniment data set.

The automatic accompaniment database 221 comprises separate tone data sets and automatic accompaniment data sets corresponding to a plurality of performance parts, and a plurality of tables for managing information of the respective data. Of the acquired searched-out results, the search section 216 identifies tone data sets of a particular performance part whose tone patterns fall within a predetermined rage. The predetermined range is represented by the number of tone patterns when arranged in ascending order of degrees of similarity between the compared two patterns, and such a predetermined range is stored in the storage section 22 and may be made changeable via the operation section 25. Namely, the wider the predetermined rage, the more tone data sets the search section 216 identifies from among the searched-out results; thus, if the predetermined range is narrow, the search section 216 identifies, from among the searched-out results, only tone data sets having a high degree of similarity. For example, if the user wants to obtain searched-out results closer to the input rhythm pattern (searching query pattern), it is only necessary to set the predetermined range to a narrower range so that it becomes easier to obtain desired searched-out results. If, on the other hand, the user wants to obtain more searched-out results with respect to the input rhythm pattern (searching query pattern), it is only necessary to set the predetermined range to a wider range. Further, if, for example, the user wants to obtain searched-out results similar to the input rhythm pattern (searching query pattern) to some degree, not too high or too low, as well as searched-out results having a high degree of similarity to the input rhythm pattern (searching query pattern), an arrangement may be made for allowing the system or the user to set upper and lower limit values of the degree of similarity. The identification section 217 further identifies one or more tone data sets among the tone data sets identified/searched via the search section 216 in response to a user's operation of the operation section 25 for designating desired one or more items such as "key", "genre", "BPM", etc. In an embodiment, the identification section 217 may further identify one or more tone data sets among the tone data sets identified/searched via the search section 216 in response to a user's operation of the operation section 25 for inputting text to designate at least a part of a name of desired tone data.

In reproduction of tone data and automatic accompaniment data sets, the output section 218 reads out tone data identified from a current position within a measure, i.e. a data position based on the bar line clock, then reproduces a tone represented by the read-out tone data at a rate, based on relationship between a performance tempo associated with the tone data and a designated tempo, and then outputs a reproduction signal of the tone to the sound output section 26. The sound output section 26 audibly outputs a sound based on the reproduction signal. Further, the output section 218 controls user's performance operation using component notes of the searched-out and selected tone data set in the performance reproduction mode and performance loop reproduction mode. Further, the chord reception section 219 receives input of a user-designated chord. The pitch reception section 220 receives input of tone pitch information indicative of pitches of user-designated notes.

1-2. Behavior 1-2-1. Search

Figure 7:
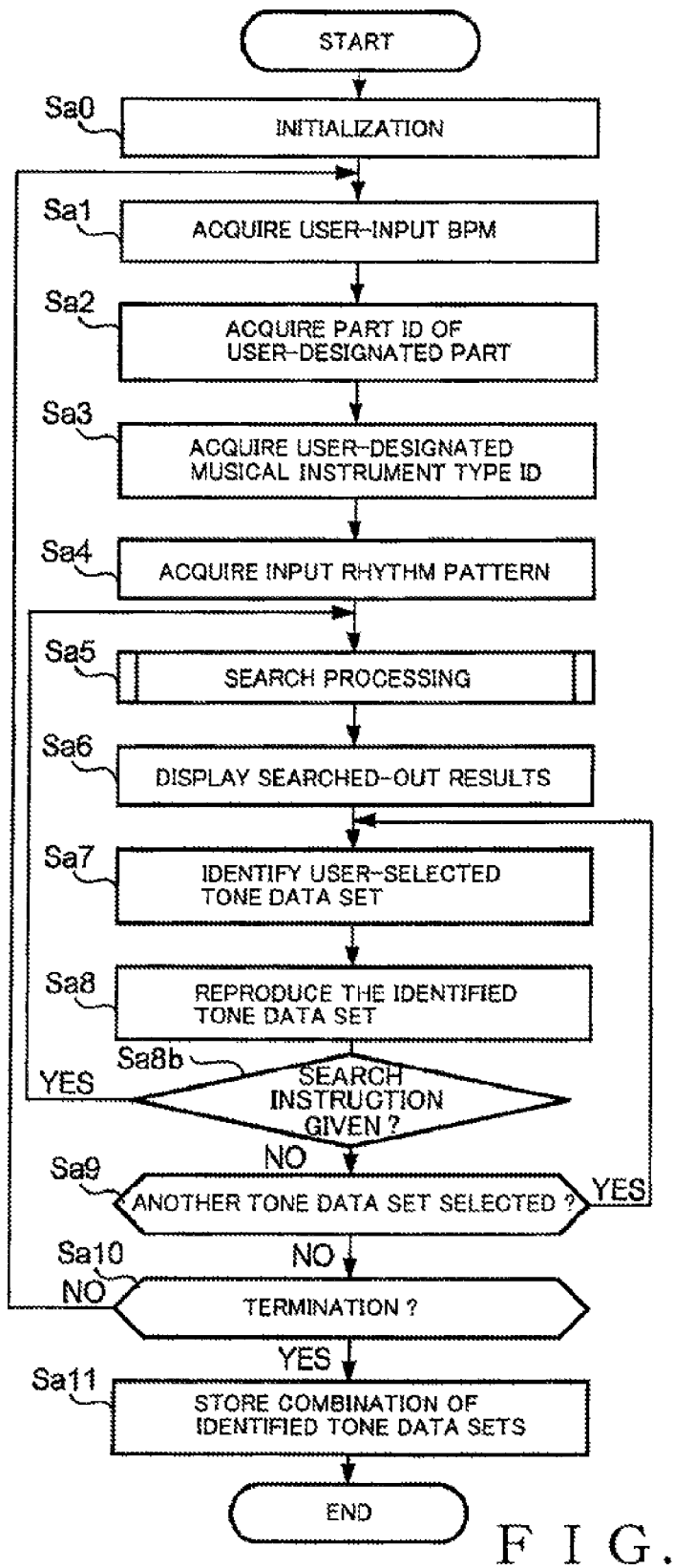
FIG. 7 is a flow chart showing an example operational sequence of processing performed by the information processing device in the first embodiment of the present invention.
Figure 8:
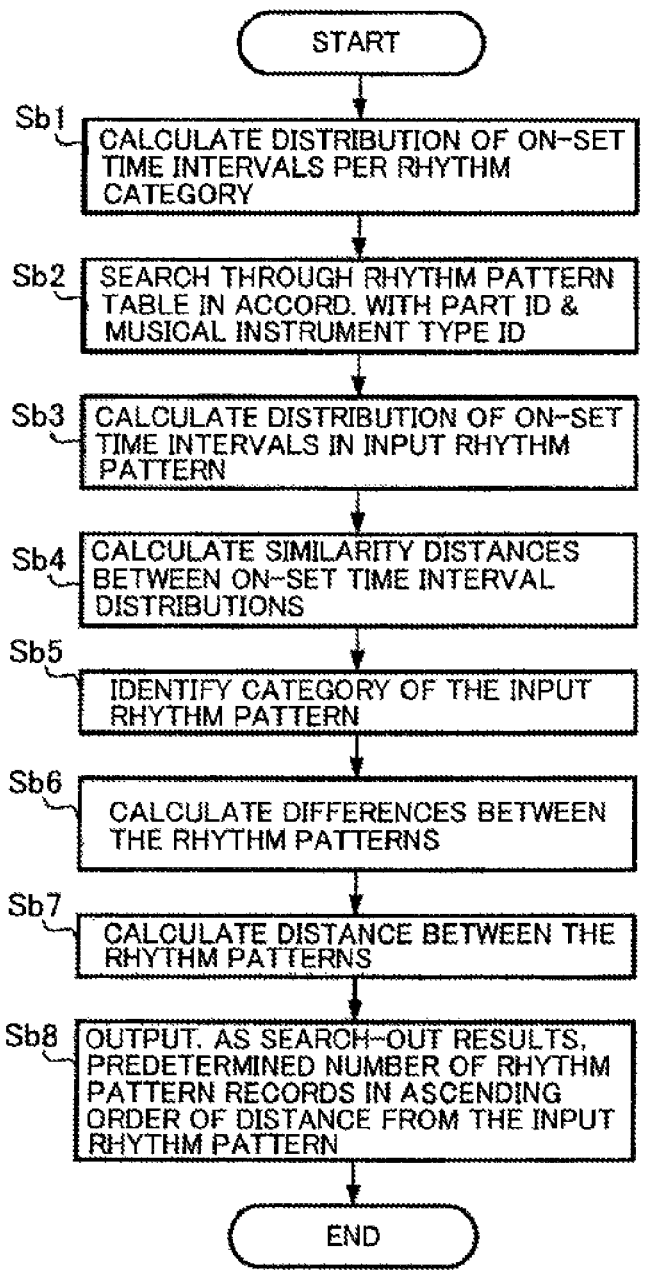
FIG. 8 is a flow chart showing an example operational sequence of search processing performed in the first embodiment of the present invention.

Now, with reference to FIGS. 7 and 8, the following describe an example operational sequence of processing performed by the control section 21 for searching for an automatic accompaniment data set on the basis of an input rhythm pattern while the search function is ON.

FIG. 7 is a flow chart showing an example operational sequence of processing performed by the information processing device 20. Once the user instructs creation of an automatic accompaniment data set via a not-shown operator of the rhythm input device 10, a program of this processing is started. In response to such a user's instruction, the information processing device 20 performs an initialization process at step Sa0 following the start of the program. In the initialization process, the user uses the operation section 25 to designate musical instrument types corresponding to the individual key ranges and musical instrument types corresponding to the input pads, and uses the BMP input operator 13 to input a BPM. Further, the control section 21 reads out the various tables shown in FIGS. 4, 5A and 5B into the RAM. After the initialization process, the user uses the rhythm input device 10 to designate any one of the predetermined key ranges of the keyboard 11 or any one of the input pads 12a to 12d, i.e. designate a performance part, and inputs a rhythm pattern for the designated part. The rhythm input device 10 transmits, to the information processing device 20, MIDI information including information identifying the designated performance part, information identifying the designated musical instrument type, information identifying the input BPM and the input rhythm pattern. Once the control section 21 receives the MIDI information from the rhythm input device 10 via the input/output interface section 23, it performs the processing in accordance with the flow shown in FIG. 7.

First, at step Sa1, the control section 21 acquires the information identifying the input BPM and stores the acquired BPM as a BPM of an automatic accompaniment data set to be recorded into the automatic accompaniment table read out into the RAM. Then, at step Sa2, the control section 21 acquires the part ID of the user-selected performance part on the basis of the information identifying the user-selected performance part, such as the note number or channel information, included in the received MIDI information as well as a part table contained in the automatic accompaniment database 221, and then stores the acquired part ID as a part ID of a performance part to be recorded into the part table and automatic accompaniment table read out into the RAM. For convenience of description, let it be assumed here that, in response to the user inputting a rhythm pattern using the bass inputting range keyboard 11a, the control section 21 has acquired "01" as the part ID as shown in (a) of FIG. 4 and then stored the acquired part ID "01" into the RAM.

Then, once the control section 21 acquires a musical instrument type ID of the user-designated musical instrument type on the basis of the information identifying the user-designated musical instrument type included in the received MIDI information and a musical instrument type table included in the automatic accompaniment database 221, its stores the acquired musical instrument type ID as a musical instrument type ID of a performance part to be recorded into the musical instrument type table and automatic accompaniment table read out in the RAM, at step Sa3. For convenience of description, let it be assumed here that, in response to the user using the operation section 25 to designate "electric bass" as the musical instrument type, the control section 21 has acquired "002" as the musical instrument type ID as shown in (b) of FIG. 4 and has stored "002" as a musical instrument type ID of a performance part to be recorded into the automatic accompaniment table read out in the RAM. Then, once the control section 21 acquires the input rhythm pattern included in the received. MIDI information, it stores the acquired input rhythm pattern into the RAM at step Sa4. After that, for the user-designated performance part and musical instrument type, the control section 21 searches through the automatic accompaniment database 221 for tone data sets identical or similar to the input rhythm pattern, at step Sa5. Details of step Sa5 will be described hereinbelow with reference to FIG. 8.

FIG. 8 is a flow chart of search processing. First, at step Sb1, the control section 21 calculates a distribution of ON-set time intervals per rhythm category, using all rhythm patterns described in the rhythm pattern table. Here, in the rhythm pattern data of each of the rhythm pattern records are contained tone or sound generation start times, i.e. ON-set times, of individual component notes normalized with the length of one measure as "1". The ON-set time intervals are each an interval between a pair of adjoining ON-set times on the time axis and represented by a numerical value in the range from "0" to "1". Further, assuming that one measure is divided into 48 equal time segments, the distribution of the ON-set time intervals can be represented by the numbers of the ON-set time intervals corresponding to the individual time segments. The reason why one measure is divided into 48 equal time segments is that, if each beat is divided into 12 equal time segments assuming a quadruple-time rhythm, then there can be achieved resolution suitable for identification among a plurality of different rhythm categories, such as eighth, eighth triplet and sixteenth. Here, the "resolution" is determined by a note of the shortest length that can be expressed by sequence software, such as a sequencer or the application program employed in the instant embodiment. In the instant embodiment, the resolution is "48" per measure, and thus, one quarter note is dividable into 12 segments.

In the following description about an input rhythm pattern too, the term "ON-set time interval" is used in the same meaning as for the rhythm pattern record. Namely, in the input rhythm pattern, each interval between a pair of adjoining ON-set times on the time axis represents an ON-set time interval. The distribution of ON-set time intervals calculated at step Sb1 above per rhythm category is compared against a distribution of ON-set time intervals in an input rhythm pattern calculated at later-described step Sb3. The reason why the ON-set time interval distribution is calculated per rhythm category at step Sb1 at the beginning of the search processing flow is that, if the rhythm pattern record and rhythm category as objects of the search processing are constant without being changed, the ON-set time interval distribution calculated at step Sb1 is constant and thus, once calculated, it need not be calculated again. Therefore, the ON-set time interval distribution calculation of step Sb1 may be performed upon powering-on of the information processing device 20 or upon start-up of the search processing. Further, the control section 21 may previously obtain data, indicative of the ON-set time interval distribution in the manner of step Sb1 and prestore the obtained data into the ROM or the like so that it can read out the previously-obtained data upon start-up of the search processing.

The following describe, using specific values of the ON-set times, how the distribution of the ON-set time intervals is calculated at step Sb1 above. For convenience of description, let it be assumed here that an eighth(-note) rhythm pattern as indicated in item (a) below is described in rhythm pattern data of a rhythm pattern record.

(a) 0, 0.25, 0.375, 0.5, 0.625, 0.75 and 0.875

On the basis of the input rhythm pattern indicated in item (a) above, the control section 21 calculates ON-set time intervals as indicated in item (b) below.

(b) 0.25, 0.125, 0.125, 0.125, 0.125 and 0.125

Then, the control section 21 calculates a group of values as indicated in item (c) below by multiplying each of the ON-set time intervals, calculated at (b) above, by a value "48", then adding "0.5" to the resultant product and then rounding down digits after the decimal point of the resultant sum (i.e., "quantizing process").

(c) 12, 6, 6, 6, 6 and 6

Here, "quantizing process" means that the control section 21 corrects each of the ON-set time intervals in accordance with the resolution. The reason why the quantizing is performed is as follows. The sound generation times described in the rhythm pattern data in the rhythm pattern table are based on the resolution ("48" in this case). Thus, in the case where the rhythm pattern table is searched using the ON-set time intervals, accuracy of the search would be lowered unless the ON-set time intervals to be used for the search are also based on the resolution. For this reason, the control section 21 performs the quantizing process on each of the ON-set time intervals indicated in item (b) above.

Let's now consider an example case where two eighth rhythm patterns, two sixteenth rhythm patterns and two eighth triplet rhythm patterns are described in rhythm pattern data of individual rhythm pattern records as follows:

Eighth Rhythm Category (A) 0, 0.25, 0.375, 0.5, 0.625, 0.75 and 0.875, and (B) 0, 0.121, 0.252, 0.37, 0.51, 0.625, 0.749 and 0.876;

Sixteenth Rhythm Category (C) 0, 0.125, 0.1875, 0.251, 0.374, 0.4325, 0.5, 0.625, 0.6875, 0.75, 0.876 and 0.9325, and (D) 0, 0.0625, 0.125, 0.1875, 0.251, 0.3125, 0.375, 0.4325, 0.5, 0.5625, 0.625, 0.6875, 0.75, 0.8125, 0.875 and 0.9325; and Eighth Triplet Rhythm Category (E) 0, 0.8333, 0.1666, 0.25, 0.3333, 0.4166, 0.5, 0.5833, 0.6666, 0.75, 0.8333 and 0.91666, and (F) 0, 0.1666, 0.25, 0.333, 0.4166, 0.5, 0.6666, 0.75, 0.8333 and 0.91666.

Figure 9A:
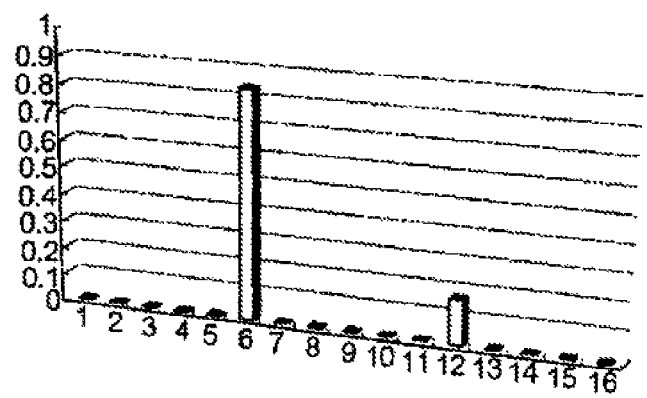
FIGS. 9A to 9C are diagrams showing distribution tables of ON-set time intervals in the first embodiment of the present invention.
Figure 9B:
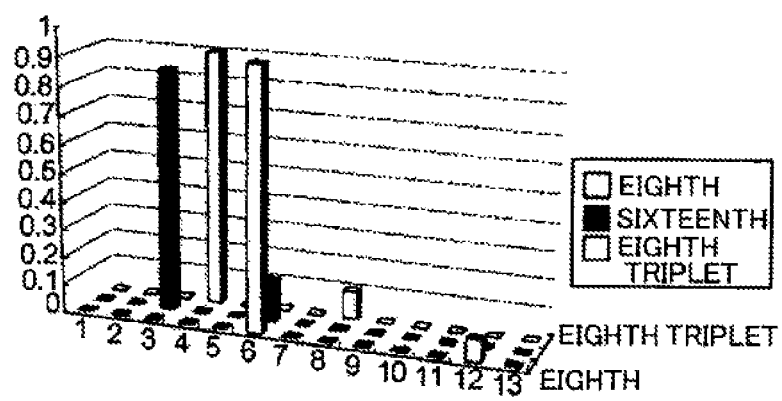

The control section 21 calculates a distribution of ON-set time intervals per rhythm category, using the aforementioned calculation scheme for items (A) to (F) above. FIG. 9B shows a distribution table showing an example distribution of ON-set time intervals calculated by the control section 21 per rhythm category.

Following step Sb1, the control section 21 searches through the rhythm pattern table using the part ID and musical instrument type ID stored in the RAM, at step Sb2. However, designation of the musical instrument type is not necessarily essential; if no musical instrument type has been designated, the control section 21 searches through the rhythm pattern table only in accordance with the part ID. In subsequent processes, the control section 21 uses, as a target or object of processing, a rhythm pattern record searched out at step Sb2.

As stated above, the input rhythm pattern includes ON-set times normalized with the length of one measure as the value "1". At step Sb3 following step Sb2, the control section 21 calculates a distribution of ON-set time intervals in the input rhythm pattern, using the same calculation scheme as at step Sb1. Here, for convenience of description, let it be assumed that the input rhythm pattern is like the one indicated in item (a) above and a group of numerical values is calculated as indicated in item (c) by the quantizing process being performed on individual ON-set time intervals calculated at indicated at item (b). FIG. 9A shows a distribution table showing an example distribution of ON-set time intervals calculated by the control section 21 for the input rhythm pattern.

Figure 9C:
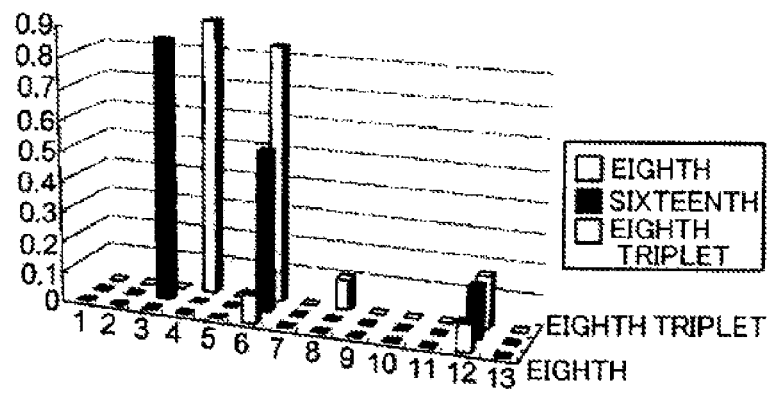

The following further describe distributions of ON-set time intervals, with reference to distribution tables shown in FIGS. 9A to 9C. FIG. 9A is a distribution table of the ON-set time intervals in the input rhythm pattern. In FIG. 9A, the horizontal axis represents time intervals in the case where one measure is divided into 48 time segments, while the vertical axis represents ratios in the numbers of quantized ON-set time intervals ("number ratios"). Further, in FIG. 9A, the group of numerical values indicated at item (c) above, which is based on the input rhythm pattern, is allocated to the distribution table. The number ratios are normalized by the control section 21 such that a sum of the number ratios becomes "1" (one). From FIG. 9A, it can be seen that a peak of the distribution is in time interval "6" that is the greatest in number in the group of numerical values of item (c) that are quantized ON-set time intervals.

At step Sb4 following step Sb3, the control section 21 calculates distances indicative of similarities (hereinafter referred to also as "similarity distances") between the distribution of ON-set time intervals based on the rhythm patterns of the individual rhythm categories described in the rhythm pattern table (see FIG. 9B) and the distribution of ON-set time intervals based on the input rhythm pattern by use of the distribution table of FIG. 9A. FIG. 9C shows a distribution table indicative of differences between the distribution of ON-set time intervals based on the rhythm patterns of the individual rhythm categories described in the rhythm pattern table (FIG. 9B) and the distribution of ON-set time intervals based on the input rhythm pattern (FIG. 9A). The similarity distance calculation at step Sb4 may be performed in the following manner. First, the control section 21 calculates, for each same time interval in both the distribution table of ON-set time intervals based on the rhythm patterns of the individual rhythm categories described in the rhythm pattern table and the distribution table of ON-set time intervals based on the input rhythm pattern, absolute values of differences in the number ratio between the two tables. Then, the control section 21 calculates, for each of the rhythm categories, a square root of a sum obtained by adding up the absolute values calculated for the individual time intervals. The value of the thus-calculated square root indicates the above-mentioned similarity distance. A smaller value of the similarity distance represents a higher degree of similarity, while a greater value of the similarity distance represents a lower degree of similarity. In the illustrated example of FIG. 9C, the eighth rhythm category presents the smallest difference in the number ratio based on the distribution tables of FIGS. 9A and 9B, which means that, of the eighth, sixteenth and eighth triplet rhythm categories represented in the distribution tables, the eighth rhythm category has the smallest similarity distance to the input rhythm pattern.

At step Sb5 following step Sb4, the control section 21 determines that, of the rhythm categories described in the rhythm pattern table, one presenting the smallest similarity distance is the rhythm category the input rhythm pattern falls in or belongs to. More specifically, at this step, the control section 21 identifies that the input rhythm pattern falls in or belongs to the eighth rhythm category. Namely, through the operations of steps Sb2 to Sb5 above, the control section 21 identifies a particular rhythm category which the input rhythm pattern is highly likely to fall in or belong to. Namely, the search section determines, for each of the rhythm classification identifiers, an absolute value of a difference between an input time interval histogram indicating a frequency distribution of sound generation time intervals represented by a rhythm pattern input by the user (see FIG. 9A) and a rhythm classification histogram indicating, for each of the rhythm classification identifiers (rhythm categories in the instant embodiment), a frequency distribution of sound generation time intervals in rhythm patterns stored in the storage section, and then the search section searches for a tone data set associated with a particular rhythm pattern that is among rhythm patterns associated with the rhythm classification identifier presenting the smallest absolute value and that satisfies a condition of presenting a high degree of similarity to the input rhythm pattern.

Then, at step Sb6, the control section 21 calculates levels of differences between all of the rhythm patterns described in the rhythm pattern table and the input rhythm pattern, in order to identify, from among the rhythm patterns described in the rhythm pattern table, a rhythm pattern that presents a high degree of similarity to the input rhythm pattern. Here, the "levels of differences" indicate how much the individual ON-set time intervals in the input rhythm pattern and the individual ON-set time intervals in the individual rhythm patterns described in the rhythm pattern table are distant from each other. Namely, smaller levels of the differences between the input rhythm pattern and any one of the rhythm patterns described in the rhythm pattern table indicate a higher degree of similarity between the input rhythm pattern and the one rhythm pattern described in the rhythm pattern table.

Namely, while the control section 21 identifies a rhythm category highly likely to match the input rhythm pattern in the operations up to step S5, it handles, as objects of calculation, the rhythm pattern records belonging to all of the rhythm categories in the operation of step S6. The reason for this is as follows. Among the rhythm pattern data included in the rhythm pattern records, there may be rhythm pattern data for which it is hard to clearly determine which one of the rhythm categories the rhythm pattern data belongs to, such as rhythm pattern data where substantially the same numbers of eighth ON-set time intervals and sixteenth ON-set time intervals exist in one and the same measure. In such a case, the possibility of a user's intended rhythm pattern being detected accurately would be advantageously enhanced by the control section 21 handling, as objects of calculation, the phrase records belonging to all of the rhythm categories at step Sb6 as noted above.

Figure 10:
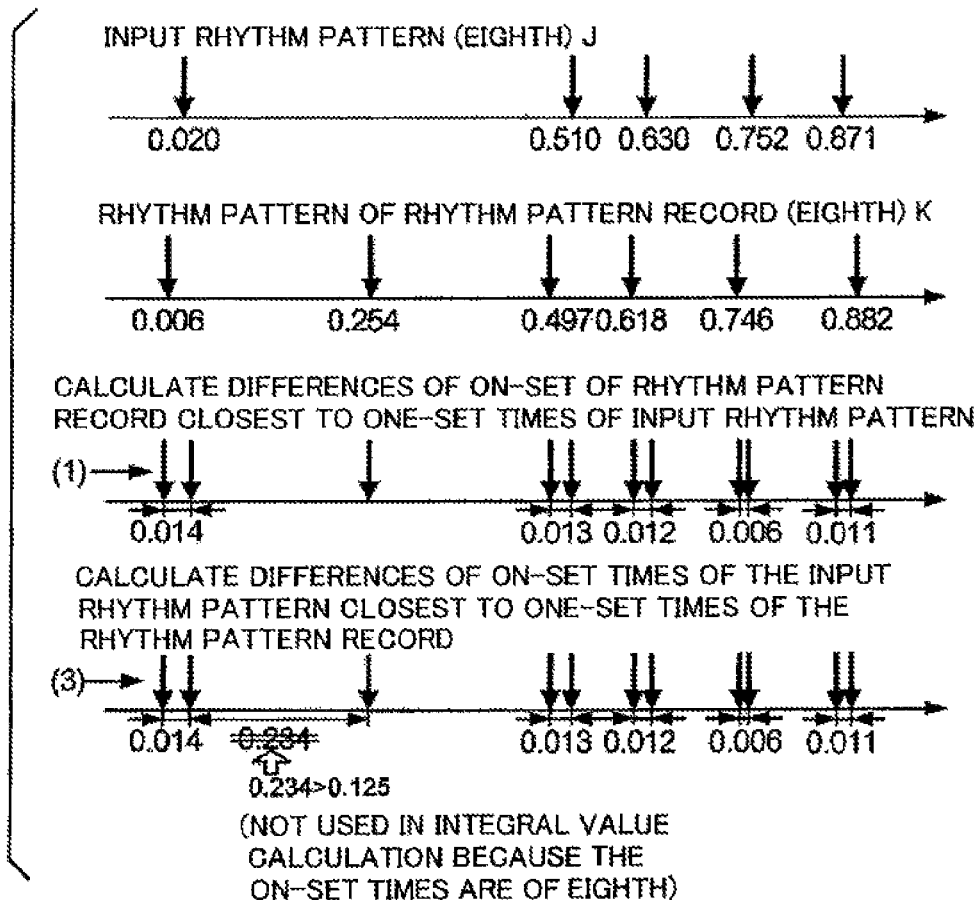
FIG. 10 is a schematic diagram explanatory of calculation of a difference between rhythm patterns in the first embodiment of the present invention.

The following describe in greater detail the operation of step Sb6, with reference to FIG. 10. FIG. 10 is a schematic diagram explanatory of calculation of a difference between rhythm patterns. As shown in FIG. 10, the input rhythm pattern is depicted by "J", and the rhythm pattern described in the rhythm pattern record is depicted by "K". A level of a difference between the input rhythm pattern J and the rhythm pattern K is calculated in the following manner.

(1) The control section 21 calculates absolute values of time differences between the ON-set times of the input rhythm pattern J and the ON-set times of the rhythm pattern K that are closest to corresponding ones of the ON-set times of the input rhythm pattern J ((1) of FIG. 10); in other words, the absolute values of time differences are calculated on the basis of the individual ON-set times of the input rhythm pattern J, or using the ON-set times of the input rhythm pattern J as calculation bases.

(2) Then, the control section 21 calculates an integrated value of the absolute values calculated at (1) above.

(3) Then, the control section 21 calculates absolute values of time differences between the individual ON-set times of the rhythm pattern K and the ON-set times of the input rhythm pattern J that are closest to corresponding ones of the ON-set times of the rhythm pattern K ((3) of FIG. 10); in other words, the absolute values of time differences are calculated on the basis of the individual ON-set times of the rhythm pattern K, or using the ON-set times of the rhythm pattern K as calculation bases.

(4) The control section 21 calculates an integrated value of the absolute values calculated at (3) above.

(5) Then, the control section 21 calculates, as a difference between the input rhythm pattern J and the rhythm pattern K, an average value between the integrated value calculated at (2) above and integrated value calculated at (4) above.

In the instant embodiment, where a sufficient number of rhythm patterns are not prepared, the control section 21 performs, as shown in (3) of FIG. 10, an operation for refraining from using (i.e., for not using) the absolute value of each ON-set time interval difference greater than a reference time interval (in the illustrated example, "0.125" because the rhythm category here is "eighth") in the calculation of the integrated value. However, such an operation for refraining from using the absolute value of each ON-set time interval difference greater than the reference time interval may be dispensed with. The control section 21 performs the aforementioned calculations (1) to (5) for rhythm patterns in all of the rhythm pattern records included in the rhythm pattern table.

Next, at step Sb7, the control section 21 multiplies the similarity distance, calculated for each of the rhythm categories at step Sb4 above, by the difference calculated at step Sb6, to thereby calculate a distance, from the input rhythm pattern, for all of rhythm pattern records included in the rhythm pattern table and having the part ID stored in the RAM. The following is a mathematical expression explanatory of the operation of step Sb7, where "J" indicates the input rhythm pattern and "K" indicates a rhythm pattern in a given rhythm pattern record.

Distance between Rhythm Pattern $J$ and Rhythm Pattern $K$=(Similarity Distance between Rhythm Pattern $J$ and Rhythm Category Rhythm Pattern $K$ belongs to)×(Difference between Rhythm Patterns $J$ and $K$)

Note that a smaller distance between the rhythm patterns J and K means that the rhythm pattern K has a higher degree of similarity to the input rhythm pattern J. Namely, the distance between the rhythm patterns J and K represents a degree of similarity between the rhythm patterns J and K. In the following description, a small distance between the rhythm patterns will sometimes be referred to as "high degree of similarity between the rhythm patterns" or something like that. Note, however, that, in the aforementioned calculation of the distance, the following operations are performed such that a searched-out result is output from within the category which the input rhythm pattern has been determined to falls in or belong to at step Sb5 above. Namely, the control section 21 determines whether the rhythm category identified at step Sb5 above and the rhythm category which the rhythm pattern K belongs to are identical to each other, and, if not identical, it adds a predetermined constant (e.g., 0.5) to the distance calculated by the above-mentioned mathematical expression. By such addition of the predetermined constant (e.g., 0.5), the rhythm pattern distance would become greater or rather exaggerated for each rhythm pattern record belonging to a rhythm category that is not identical to the rhythm category identified at step Sb5, and thus, searched-out results can be more readily output from within the rhythm category which the input rhythm pattern has been determined to belong to at step Sb5.

At step Sb8 of FIG. 8, on the basis of the rhythm pattern table of the selected performance part and the input rhythm pattern, the control section 21 acquires, as searched-out results, a predetermined number of tone data sets in ascending order of the similarity distance from among tone data sets having rhythm pattern data small in distance from the input rhythm pattern, and the control section 21 stores the predetermined number of tone data sets into the RAM and then brings the processing of FIG. 8 to an end. The "predetermined number" may be stored in advance as a parameter in the storage section 22 and may be made changeable by the user using the operation section 25. Here, the control section 21 has a filtering function for outputting, as searched-out results, only tone data sets having a BPM close to the user-input BPM, and the user can turn on or off the filtering function as desired via the operation section 25. When the filtering function is ON, the control section 21, at step Sb8, excludes, from the searched-out results, tone data sets having a BPM whose difference from the input BPM does not fall within a predetermined range. More specifically, at step Sb8, the control section 21 for example acquires, as the searched-out results, only tone data sets having a BPM in the range of $(\frac{1}{2}^{1/2})$ times to $2^{1/2}$ times of the input BPM, excluding the other tone data sets from the searched-out results. Note that the coefficients "$(\frac{1}{2}^{1/2})$ times" and "$2^{1/2}$ times" are just illustrative and may be of other values.

The reason why the control section 21 has such a filtering function is as follows. The control section 21 in the instant embodiment can reproduce tones of any of the tone data sets, acquired as the searched-out results, with the user-input BPM or user-designated BPM. If a BMP greatly different from an original BPM of the tone data set is input by the user, then tones of the tone data set would undesirably give an uncomfortable feeling to the user when audibly output by the sound output section 26. For example, let's assume a case where the user inputs a rhythm pattern at a tempo of BPM "240" and where an original BPM represented by a tone data set, included among tone data sets acquired as a result of searching for tone data sets having the aforementioned rhythm pattern, is "60". In this case, tones based on the tone data set included among the searched-out results are audibly output by the sound output section 26 with a BPM four times as many as the original BPM, namely, the tones based on the tone data set are reproduced in a fast-forward fashion with a BPM four times the original BPM, as a result of which an uncomfortable feeling would be given to the user. Further, if the tone data set is an audio file of the WAVE or mp3 format, reproduced sound quality would deteriorate as the difference between the original BPM and the user-designated BPM increases. To avoid such an inconvenience, the control section 21 in the instant embodiment has the filtering function.

Referring now back to FIG. 7, upon completion of the search processing of step Sa5, the control section 21 displays the tone data sets, stored in the RAM at step Sb8, on the display section 24 (step Sa6).

Figure 11:
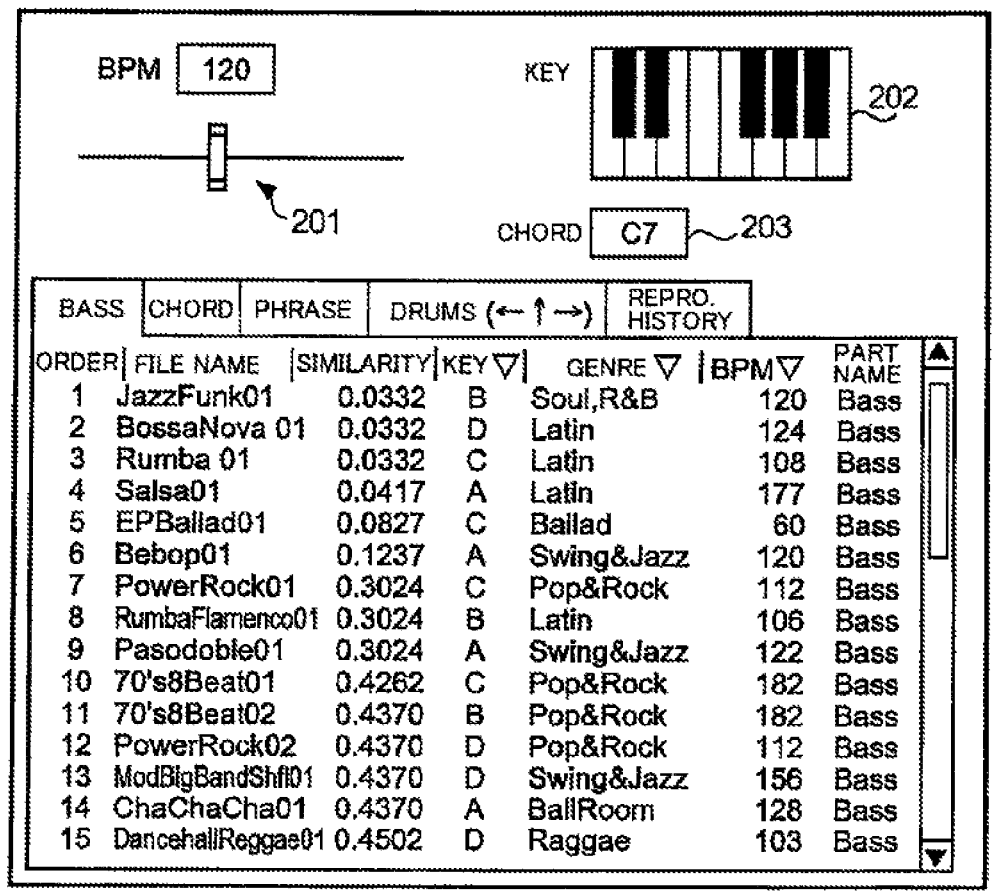
FIG. 11 is a schematic diagram showing an example of searched-out results of automatic accompaniment data in the first embodiment of the present invention.

FIG. 11 is a schematic diagram showing an example of the searched-out results of tone data sets. More specifically, FIG. 11 shows a case where tone data sets, acquired as searched-out results by the control section 21 on the basis of a rhythm pattern input by the user via the bass inputting range keyboard 11a, are displayed on the display section 24. In an upper area of the display section 24 are displayed the BPM designating slider 201, a key (musical key) designating keyboard 202 and a chord designating box 203. The BPM designating slider 201 comprises, for example, a groove portion of a predetermined length, a knob movably provided in the groove portion, and a BPM display portion. As the user changes a position of the knob by use of the operation section 25, the control section 21 displays, on the BPM display portion, a BPM corresponding to the changed (changed-to) position of the knob. In the illustrated example of FIG. 11, the BPM displayed on the display portion becomes greater (quicker BPM) as the knob is moved in a direction from the left end toward the right end of the groove portion, but becomes smaller (slower BPM) as the knob is moved from in a direction the right end toward the left end of the groove portion. The control section 21 reproduces, with the BPM designated via the BPM designating slider 201 (hereinafter referred to as "designated BPM"), tones represented by a tone data set selected by the user from among the searched-out results. Namely, the control section 21 synchronizes a BPM of tone data, included in the tone data set selected by the user from among the searched-out results, to the designated BPM. Alternatively, if the information processing device 20 is connected with an external device in synchronized relation with the latter, the information processing device 20 may receive a BPM designated in the external device and use the received BPM as the designated BPM. Further, in such a case, the BPM designated via the BPM designating slider 201 may be transmitted to the external device.

The key designating keyboard 202 is an image simulating a keyboard having a predetermined pitch range (one octave in this case) allocated thereto, and corresponding tone pitches are allocated to individual keys of the key designating keyboard 202. In response to the user designating a key via the operation section 25, the control section 21 acquires the tone pitch allocated to the designated key and stores the acquired tone pitch into the RAM. Then, the control section reproduces, with the key designated via the key designating keyboard 202, tones, represented by the tone data included in the tone data set selected by the user from among the searched-out results. Namely, the control section 21 synchronizes the key of the tone data included in the tone data set selected by the user from among the searched-out results, to the designated key (e.g., transposes music so that the keys match). Alternatively, if the information processing device 20 is connected with an external device in synchronized relation with the latter, the information processing device 20 may receives a key designated in the external device and use the received key as the designated key. Further, in such a case, the key designated via the key designating slider 202 may be transmitted to the external device.

The chord designating box 203 is an input box for receiving input of a chord designated by the user. Once the user designates and inputs a chord type, such as "Maj7", using the operation section 25, the control section 21 stores the input chord type into the RAM as a designated chord. The control section 21 acquires, as a searched-out result, a tone data set having the chord type designated via the chord designating box 203 from among the searched-out results. The chord designating box 203 may display a pull-down list of chord names. Alternatively, if the information processing device 20 is connected with an external device in synchronized relation with the latter, the information processing device 20 may receive a chord designated in the external device and use the received chord as the designated chord. Further, in such a case, the chord designated via the chord designating box 203 may be transmitted to the external device. As another form of chord input, buttons may be displayed on the display section in corresponding relation to various chord types so that any one of the displayed chord types may be designated by the user clicking on a corresponding one of the displayed buttons.

A list of tone data sets searched-out as above is displayed on a lower region of the display section 24. The user can display a listing of searched-out tone data sets per performance part by designating, in the aforementioned list of searched-out results, any one of tabs indicative of different performance parts (hereinafter referred to as "part tabs"). If the part tab of the drums has been designated by the user, the user can further depress, on the operation section (keyboard in this case) 25, any one of keys having upward, rightward and leftward arrows allocated thereto, in response to which the control section 21 displays searched-out results of one of the performance parts constituting the drums, such as the bass drum, snare drum, high-hat and cymbals, that corresponds to the user-depressed part tab. Among the part tabs is one labeled "reproduction history" with which, of the searched-out results, tone data sets having heretofore been selected by the user and then audibly reproduced are displayed. In addition to the aforementioned tabs, a tab labeled "automatic accompaniment data" may be provided for displaying a list of automatic accompaniment data sets each comprising a registered combination of waveform data of individual performance parts desired by the user, so that the user can subsequently search for any one of the registered automatic accompaniment data sets.

In the searched-out results, item "order" represents ascending ranking order, among the searched-out tone data sets, of similarity to an input rhythm pattern. Item "file name" represents a file name of each individual one of the searched-out tone data sets. Item "similarity" represents, for each of the searched-out tone data sets, a distance, from the input rhythm pattern, of a rhythm pattern of the tone data set. Namely, a smaller value of the "similarity" represents a smaller distance from the input rhythm pattern and hence a higher degree of similarity to the input rhythm pattern. In displaying the searched-out results, the control section 21 displays the respective names of the tone data sets and related information in the ascending order of the similarity. Item "key" represents, for each of the searched-out tone data sets, a basic pitch to be used for pitch-converting the tone data; note that the "key" for a tone data set of a performance part corresponding to a rhythm musical instrument is displayed as "undesignated". Item "genre" represents, for each of the searched-out tone data sets, a genre which the tone data set belongs to. Item "BPM" represents, for each of the searched-out tone data sets, a BPM of the tone data set and more specifically an original BPM of tones represented by the tone data set. "part name" represents, for each of the searched-out tone data sets, a name of a performance part identified by the part ID included in the tone data set. Here, the user can display the searched-out results after filtering the results using at least one of the items "key", "genre" and "BPM".

Referring again back to FIG. 7, once the user selects one of the tone data sets displayed as the searched-out results and performs double-click on the selected tone data set using, for example, the mouse, the control section 21 identifies the user-selected tone data set as data of one of the performance parts of an automatic accompaniment data set being currently created, and then records the identified data set into a row, corresponding to the performance part, of the automatic accompaniment data table (memory) of the RAM (step Sa7). At that time, the control section 21 displays, on the display screen of the searched-out results, the background of the selected and double-clicked tone data set in a different color from the background of the other or non-selected tone data sets.

Then, the control section 21 reads out, from data positions based on the bar line clock, tone data of the individual performance parts identified and registered in the automatic accompaniment data table (memory) at step Sa7, and then audibly reproduces the tone data after performing a time-stretch process, and pitch conversion as necessary, on tones represented by the tone data in such a manner that the tone data are reproduced at a rate based on relationship between BPMs associated with the individual tone data and the user-designated BPM, i.e. that the BPMs of the identified tone data are synchronized to the user-designated BPM (step Sa8). The aforementioned input BPM is used as the user-designated BPM at the first execution of the search. Then, if the user has designated a BPM via the BPM designating slider 201 with regard to the searched-out results, the thus-designated BPM is used. As an alternative, the control section 21 may read out the tone data from the head of the bar line rather than data positions based on the bar line clock.

Figure 12:
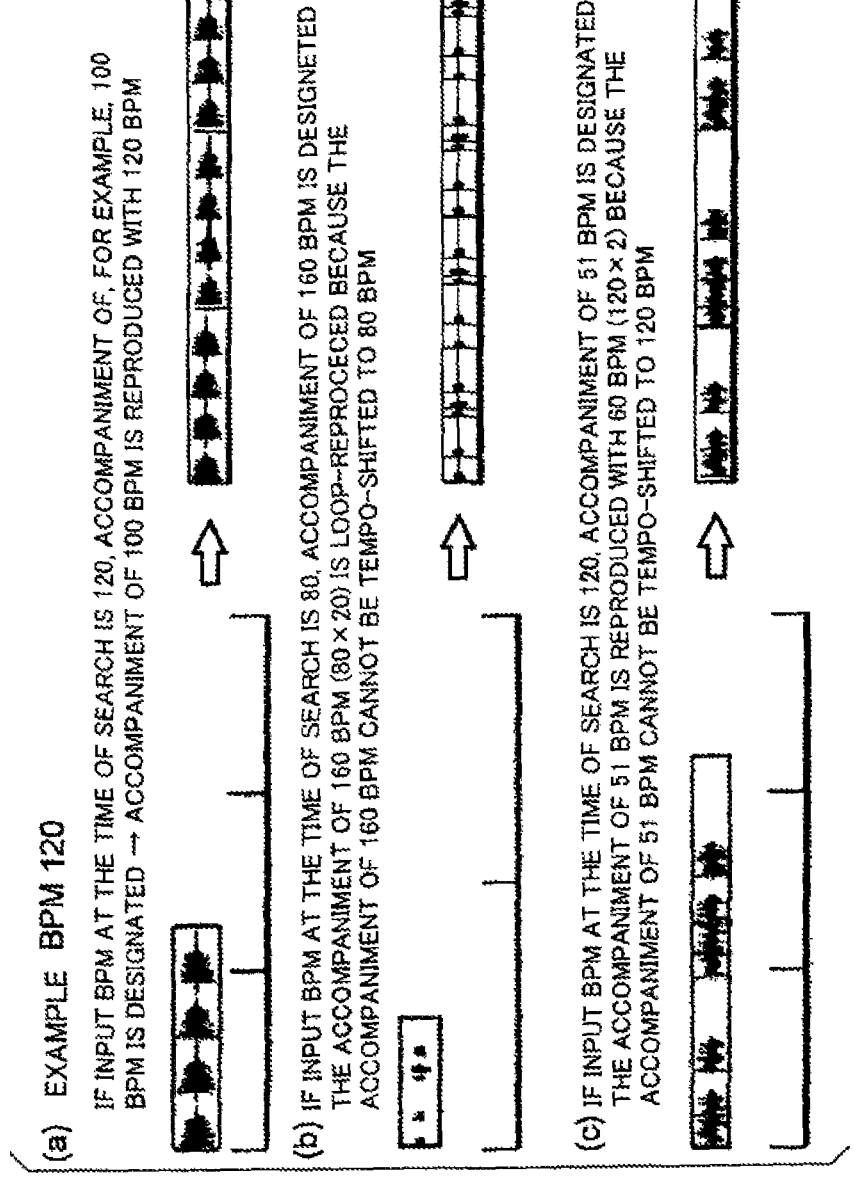
FIG. 12 is a schematic diagram explanatory of BPM synchronization processing in the first embodiment of the present invention.

FIG. 12 is a schematic diagram explanatory of BPM synchronization processing. Although the time-stretch process may be performed in the well-known manner, it may also be performed as follows. If the tone data set is an audio file of the WAVE, mp3 or other format, reproduced sound quality of the tone data set would deteriorate as a difference between the BPM of the tone data set and the user-designated BPM becomes greater. To avoid such an inconvenience, the control section 21 performs the following operations. If "(BPM of the tone data$\times(\frac{1}{2}^{1/2})$)<(user-designated BPM)<(BPM of the tone data$\times 2^{1/2}$)", the control section 21 performs the time-stretch process on the tone data such that the BPM of the tone data equals the user-designated BPM ((a) of FIG. 12). Further, if "(user-designated BPM)<(BPM of the tone data$\times(\frac{1}{2}^{1/2})$)", the control section 21 performs the time-stretch process on the tone data set such that the BPM of the tone data equals two times of the user-designated BPM ((b) of FIG. 12). Furthermore, if (BPM of the tone data$\times 2^{1/2}$)<(user-designated BPM)", the control section 21 performs the time-stretch process on the tone data such that the BPM of the tone data equals half of the user-designated BPM ((c) of FIG. 12). In the aforementioned manner, it is possible to minimize the possibility of reproduced sound quality of the tone data deteriorating due to a great difference between the BPM of the tone data and the user-designated BPM. Note that the coefficients "($\frac{1}{2}^{1/2}$)"

and "$2^{1/2}$" are just illustrative and may be of any other values. In the aforementioned manner, it is possible to maintain, within a predetermined range, variation of a length of a sound extended by the time stretch process, when a difference between an ON-set time and an OFF-set time in the user input rhythm pattern has become great because of a long time of key depression by the user or, conversely, has become small because of a short time of key depression by the user. As a result, it is possible to significantly reduce an uncomfortable feeling which the user would feel from the searched-out results responsive to the input rhythm pattern.

Further, when the user has designated a key via the key designating slider 202, the control section 21 reproduces the tone data set after pitch-converting tones, represented by the tone data set, in accordance with a difference between the key associated with the tone data set and the designated key, i.e. causing the key of the identified tone data set to fit the designated key. For example, if the key associated with the tone data set is "C" and the designated key is "A", there are two available approaches: raising the pitches of the identified tone data set; and lowering the pitch of the identified tone data set. The instant embodiment employs the approach of raising the pitches of the identified tone data set, because pitch shift amounts required in this case are relatively small and less deterioration of sound quality can be expected.

FIG. 13 is a diagram showing a key table that is stored in the storage section 22. In the key table are described names of keys in each of which one octave is represented by a twelve-note scale, and key numbers consecutively assigned to the individual keys. In performing pitch conversion, the control section 21 references the key table and calculates a predetermined value by subtracting a key number corresponding to the designated key from a key number corresponding to the key associated with the identified tone data set. Such a predetermined value will hereinafter be referred to as "key difference". Then, if "−6≤key difference≤6", the control section 21 pitch-converts the identified tone data in such a manner that the frequency of the tone becomes "$2^{(key\ difference/12)}$". Further, if "key difference>7", the control section 21 pitch-converts the identified tone data in such a manner that the frequency of the tone becomes "$2^{(key\ difference-12)}$". Further, if "key difference<−7", the control section 21 pitch-converts the identified tone data in such a manner that the frequency of the tone represented by the tone data becomes "$2^{(key\ difference+12)}$". The control section 21 causes the tone, represented by the pitch-converted tone data, to be audibly output via the sound output section 26. The aforementioned mathematical expressions are illustrative, and they may be predetermined so as to secure good reproduced sound quality.

Further, when the user has designated a chord via the chord designating box 203, the control section 21 reproduces tone data having been pitch-converted in accordance with the designated chord from the tone data set selected from among the searched-out results. Namely, the control section 21 reproduces the chord of the identified tone data after pitch-converting a chord of the identified tone data to the designated chord.

At step Sa8b following step Sa8, a determination is made as to whether a predetermined search key (not shown) has been operated by the user. If a search instruction has been given by the user (i.e., YES determination at step Sa8b), the control section 21 reverts to step Sa5 (search processing). Thus, the search processing of step Sa5 is performed again with a sound generation pattern of the identified tone data set (part performance data) used as a new query pattern. In this manner, a new search (re-search) is performed, on the basis of the searched-out results responsive to the query pattern input by the user via the rhythm input device 10, using, as a new query pattern, a sound generation pattern of an existing tone data set (part performance data) included in the searched-out results. Thus, in a case like where a query pattern has not been input accurately by the user, an accurate sound generation pattern can be used as a query pattern for the re-search. As a result, the search input operation can be made much easier for the user to perform.

Once the user selects and double-clicks on another tone data set from among the searched-out results (YES determination at step Sa9) in the case of a NO determination at step Sa8b, the control section 21 reverts to step Sa7. In this case, the control section 21 identifies the newly selected tone data set as one of the performance parts of the automatic accompaniment data set being currently created (step Sa7), and then it performs the operation of step Sa8. Note that tone data sets can be registered until they reach a predetermined number of performance parts as components of an automatic accompaniment data set. Namely, each of the performance parts has an upper limit number of registrable tone data sets, for example, up to four channels for the drum parts, one channel for the bass part, up to three channels for the chord part, etc. For example, if the user attempts to designate five drum parts, a newly-designated tone data set will be registered in place of a drum tone data set having so far being reproduced.

Once the user instructs termination of the search processing (YES determination is made at step Sa10) without selecting another tone data set from among the searched-out results (NO determination at step Sa9) following step Sa8, the control section 21 combines the automatic accompaniment data table and files designated by the table into a single data file and stores this data file into the storage section 22 (step Sa11) and then brings the processing flow to an end. The user can use the operation section 25 to read out, as desired, an automatic accompaniment data set stored in the storage section 22. If, on the other hand, the user has not instructed termination of the search processing (NO determination at step Sa10), the control section 21 reverts to step Sa1. Then, the user selects a different performance part and inputs a rhythm pattern via the rhythm input device 10, in response to which subsequent processes as described above are performed. Thus, a tone data set of the different performance part in the automatic accompaniment data set is registered. In the above-mentioned manner, an automatic accompaniment data set is created in response to the user continuing to perform operation until registration of a predetermined number of performance parts necessary for creating the automatic accompaniment data set is completed. Further, tones represented by the tone data set of the newly-selected performance part are audibly output in overlapped relation to tones represented by the tone data sets of currently-reproduced performance parts. At that time, because the control section 21 reads out tone data from data positions based on the bar line clock, tones of tone data sets of a plurality of performance parts are output in a mutually-synchronized fashion.

As the form of advancement of the individual performance parts, the following three variations are conceivable. As regards synchronization control of performance progression (or advancement) timing, an automatic accompaniment data set searched out in accordance with predetermined settings and designated by the user can be reproduced at timing quantized using any one of standards like "per measure", "per two beat", "per beat", "per eighth" and "no designation". Namely, according to the above-mentioned first form of advancement, synchronization is effected at the head of a measure. In this case, once the bar line clock signal reaches the head of a measure after the user designates an accompaniment of individual performance parts, tone data are reproduced from corresponding measure positions. Further, according to the above-mentioned second form of advancement, synchronization is effected at the heat of a beat. In this case, once the bar line clock signal reaches the head of a beat after the user designates an accompaniment of individual performance parts, tone data are reproduced from corresponding beat positions. Further, according to the third form of advancement, no synchronization is effected. In this case, immediately after the user designates an accompaniment of individual performance parts, tone data are reproduced from corresponding advancement positions. Settings of such variations of the form of advancement are prestored in the storage section 22 so that the user can read out any desired one of the prestored settings via the operation section 25.

1-2-2. Reproduction

The following describe processing performed by the control section 21 in individual ones of the loop reproduction mode, performance reproduction mode and performance loop reproduction mode. As set forth above, by inputting an input rhythm pattern, the user allows sounds to be audibly output on the basis of a searched-out rhythm pattern record (in each of the loop reproduction mode and performance loop reproduction mode). Further, as set forth above, the user can execute performance operation via the rhythm input device 10, using component notes of a searched-out rhythm pattern record, to allow sounds of a phrase (musical phrase), corresponding to the performance operation, to be audibly output (in each of the performance reproduction mode and performance loop reproduction mode). The following description explain differences among the loop reproduction mode, performance reproduction mode and performance loop reproduction mode.

FIG. 14 is a diagram explanatory of the processing performed by the control section 21 in the loop reproduction mode. The loop reproduction mode is a mode in which the control section 21 repetitively outputs, as objects of reproduction, sounds based on the searched-out rhythm pattern record of one measure in accordance with a BPM (Beats Per Minute) indicated by the bar line clock and in time with an accompaniment. Once the bar line clock passes the sound generation start time of any one of the component notes within the one measure of the searched-out rhythm pattern record, the control section 21 sets the one component note as an object of reproduction. Here, once the bar line clock reaches the value "1", i.e. once one measure passes, the bar line clock again takes the value "0", after which the bar line clock repeats taking values from "0" to "1". Thus, with a repetition period of the bar line clock, sounds based on the searched-out rhythm pattern record are repetitively output as objects of reproduction. In the illustrated example of FIG. 14, each time the bar line clock passes the sound generation start time of any one of the component notes of the searched-out rhythm pattern record, the control section 21 sets the one component note as an object of reproduction as indicated by an arrow. Namely, the loop reproduction mode is a mode which is designated primarily when the user wants to ascertain what types of a sound volume, color and rhythm pattern the searched-out rhythm pattern record is composed of.

Figure 15:
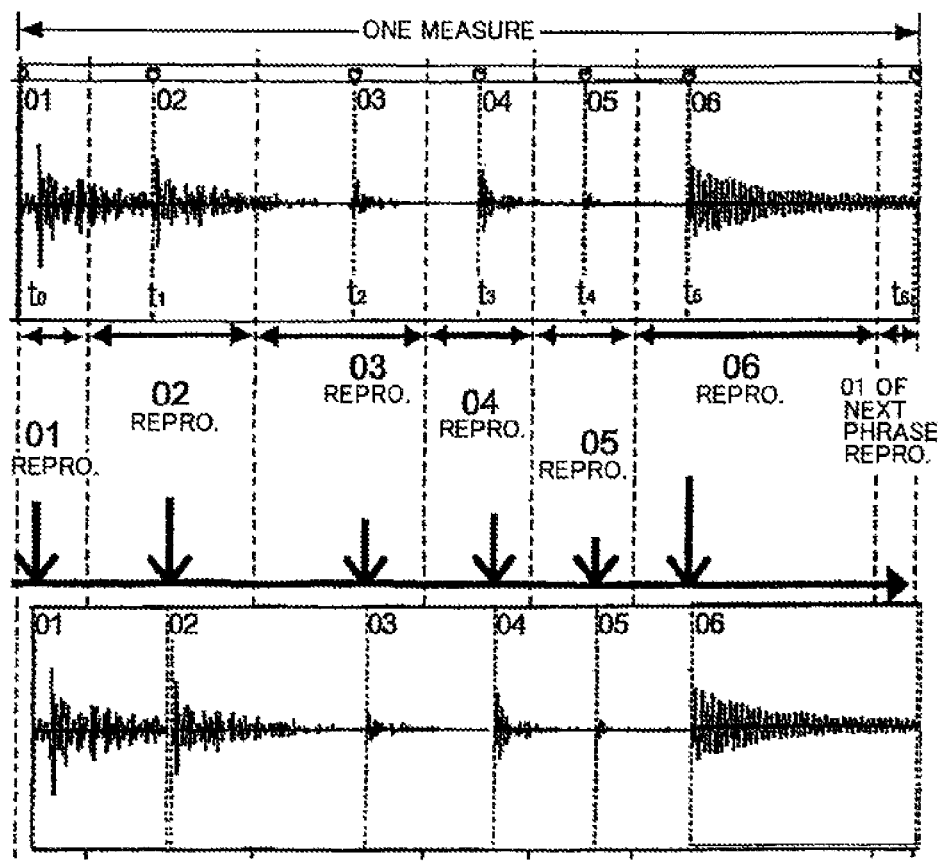
FIG. 15 is a schematic diagram explanatory of processing performed in a performance reproduction mode in the first embodiment of the present invention.

FIG. 15 is a diagram explanatory of the processing performed by the control section 21 in the performance reproduction mode. The performance reproduction mode is a mode in which, once the user executes performance operation via the rhythm input device 10, a component sound or note of a searched-out phrase corresponding to the time point at which the performance operation has been executed is set as an object of reproduction by the control section 21. In the performance reproduction mode, one component sound or note is set as an object of reproduction only at the time point at which the performance operation has been executed. Namely, in the performance reproduction mode, unlike in the loop reproduction mode, no sound is output at all at a time point when the user does not execute performance operation. Namely, in the performance reproduction mode, when the user executes performance operation in a rhythm pattern that is exactly identical to the searched-out rhythm pattern, only sounds based solely on the searched-out rhythm pattern are audibly output. In other words, the performance reproduction mode is a mode that is designated when the user wants to continually execute a performance by itself (i.e., himself or herself) using component notes of the searched-out rhythm pattern.

In FIG. 15, it is shown that the user has executed performance operation via the rhythm input device 10 at time points indicated by arrows in a section ("01"-"06") indicated by a double head arrow. More specifically, in the performance reproduction mode, four types of parameters, i.e. velocity data, trigger data, sound generation start times of individual component notes of a searched-out rhythm pattern and waveforms of the individual component notes, are input to the control section 21. Of those parameters, the velocity data and the trigger data are based on a rhythm pattern input by the user via the rhythm input device 10. Further, the sound generation start times and waveforms of the individual component notes of the searched-out rhythm pattern are included in the searched-out rhythm pattern record. In the performance reproduction mode, each time the user executes performance operation via the rhythm input device 10, velocity data and trigger data are input to the control section 21, so that the control section 21 performs the following processing. Namely, the control section 21 outputs, to the sound output section 26, a waveform of any one of the component notes of the searched-out rhythm pattern of which the sound generation time is least different from the ON-set time of the trigger data, designating a sound volume corresponding to the velocity data.

Further, each time the user executes performance operation, the control section 21 stores tone data, reproduced at a sound generation time point corresponding to the performance operation, into the storage section 22 as temporary tone data having been changed in response to the performance operation. Then, in response to each operation by the user, such temporary tone data is rewritten into tone data of a waveform corresponding to the user's operation. When such temporary tone data has been stored into the storage section 22 during reproduction of automatic accompaniment data, sound reproduction is performed on the basis of the newest temporary tone data. More specifically, when temporary tone data has been stored into the storage section 22, a file of automatic accompaniment data and tone data are recorded, at step Sa11, on the basis of the temporary tone data and tone data of other selected performance parts. Namely, according to the instant embodiment, by the user operating any one of the performance operators during reproduction of automatic accompaniment data, tone data of the performance part corresponding to the operated performance operator can be edited to create new automatic accompaniment data.

The following arrangement can be made by adding attach intensity of each component note of the searched-out rhythm pattern as an input parameter to the control section 21. In this case, the control section 21 may output, to the sound output section 26, a waveform of any one of the component notes of the searched-out rhythm pattern of which the sound generation time is least different from the ON-set time of the trigger data, designating a sound volume corresponding to intensity of velocity data that corresponds to attack intensity of the component note. Note that a waveform of a component note corresponding to a section where no trigger data has been input is not output to the sound output section 26.

Next, the performance loop reproduction mode is a mode that is a combination of the loop reproduction mode and the performance reproduction mode. In the performance loop reproduction mode, the control section 21 determines, per measure, whether or not any performance operation has been executed by the user using the rhythm input device 10. In the performance loop reproduction mode, the control section 21 continues to set, as objects of reproduction, sounds based on the searched-out phrase until the user executes performance operation using the rhythm input device 10. Namely, until the user executes performance operation using the rhythm input device 10, the control section 21 behaves in the same manner as in the loop reproduction mode. Then, once the user executes performance operation within a given measure using the rhythm input device 10, the control section 21 behaves in the same manner as in the performance reproduction mode as long as the given measure lasts. Namely, one of the component notes of the searched-out phrase which corresponds to the time point when the user has executed the performance operation is set as an object of reproduction by the control section 21. In the performance loop reproduction mode, if the user executes at least one performance operation in a measure and does not execute any performance operation in a subsequent measure, each component note of the searched-out phrase which corresponds to a time point at which the user made input in the immediately-preceding measure is set as an object of reproduction and audibly generated by the control section 21. The control section 21 stores tone data of a performance part manipulated by the user into the storage section 22 as temporary tone data having been changed in accordance with respective performance operation. Then, each time user's performance operation is executed, such temporary tone data is rewritten by the control section to tone data of a waveform corresponding to the user's performance operation. When temporary tone data has been stored into the storage section 22 during reproduction of automatic accompaniment data, sound reproduction is performed on the basis of the newest temporary tone data A file of automatic accompaniment data and tone data are recorded, at step Sa11, on the basis of the temporary tone data and tone data of other selected performance parts. Namely, according to the instant embodiment, by the user operating any one of the performance operators during reproduction of automatic accompaniment data, tone data of the performance part corresponding to the operated performance operator can be edited to create new automatic accompaniment data. The performance loop reproduction mode is a mode designated when the user wants to execute a performance using component notes of the searched-out rhythm pattern but also wants the component notes of the searched-out rhythm pattern to be loop-reproduced in a user-input rhythm pattern.

According to the first embodiment of the invention, as set forth above, it is possible to identify, from among automatic-accompaniment-related tone data sets searched out on the basis of a user-intended tone pattern, a particular tone data set at least closest to the user-intended tone pattern. At that time, the user inputs a rhythm pattern after selecting a desired one of different performance parts associated with the plurality of performance controls or operators, and thus, if the user hits upon a rhythm pattern for a particular performance part, then the user can perform a search by selecting the particular performance part and inputting the hit-upon rhythm pattern. Further, because the user only has to select a performance part, input a rhythm pattern and register any one of searched-out results as a performance of the performance part, the first embodiment allows the user to search for an automatic accompaniment data set intuitively and efficiently. Furthermore, because, of searched-out automatic accompaniment data sets, automatic accompaniment data selected by the user are reproduced in a synchronized fashion, the user can obtain sounds of ensembled automatic accompaniment sounds of the performance parts intuitively and efficiently.

2. Second Embodiment

Next, a description will be given about a second embodiment of the present invention.
<Style Data Search System>
2-1. Construction The second embodiment of the present invention is a system for searching for a style data set as an example of the music data processing system of the present invention. The second embodiment is similar in construction to the above-described first embodiment, except that the automatic accompaniment database 221 stores therein style data sets and includes a style table for searching therethrough for a style data set.

Style data in the instant embodiment are read into an electronic musical instrument, sequencer or the like as in the first embodiment to function similarly to so-called automatic accompaniment data. First, the following outline style data and related data employed in the instant embodiment.

Each style data set comprises a set of accompaniment sound data pieces collected for each of different styles, such as "Bebop01", "HardRock01" and "Salsa01" and combined, as section data, for individual ones of sections (of one to several measures) that are each a minimum unit of an accompaniment pattern, and such style data sets are stored in the storage section 22. In the instant embodiment, there are provided a plurality of types of sections, such as structural types like "intro", "main", "fill-in" and "ending", and pattern types like "normal", "variation 1" and "variation 2" in each of the sections. Further, style data of each of the sections include identifiers (rhythm pattern IDs) of performance data described in the MIDI format for individual ones of the bass drum, snare drum, high-hat, cymbal, phrase (melodic phrase), chord and bass performance parts. For each of the sections of the style data sets, the control section 21 analyzes, for each of the performance parts, a rhythm pattern of the performance data, so that content corresponding to the analyzed results is registered into the style table. For example, for the data of the bass part, the control section 21 analyzes a time series of tone pitches in the performance data by use of a predetermined basic pitch, and then it registers content corresponding to the analyzed results into the style table. Further, for the performance data of the chord part, the control section 21 analyzes chords employed in the performance data by use of a predetermined basic chord, and it registers, into a later-described chord progression information table, chord information, such as "Cmaj7", as content corresponding to the analyzed results.

Further, the instant embodiment includes section progression information and chord progression information in corresponding relation to the individual style data sets. The section progression information is information for sequentially designating, in a time-serial manner, sections from the style data set in accordance with a progression of a music piece performance. The chord progression information is information for sequentially designating, in a time-serial manner, chords to be performed in accordance with a progression of a music piece performance. Once a certain style data set is selected, data are registered into a section progression information table and chord progression information table on the basis of the section progression information and chord progression information corresponding to the selected style data set. Alternatively, individual sections may be selected in response to user's designation, without the section progression information being used. As another alternative, chord information may be identified from notes input via the keyboard 11, without the chord progression information being used, so that an accompaniment can be reproduced on the basis of the identified chord information. The chord information includes information indicative of a root note of a chord and information indicative of a type of the chord.

The following describe a construction of the style data. FIGS. 16A and 16B are examples of tables related to the style data. First, the following briefly describe the style table, section progression information, chord progression information, etc.

FIG. 16A is a diagram showing an example of the style table, in which a plurality of style data sets whose "genre" is "Swing & Jazz" are shown. Each of the style data sets comprises a plurality of items, such as "style D3", "style name", "section", "key", "genre", "BPM", "musical time", "bass rhythm pattern ID", "chord rhythm pattern ID", "phrase rhythm pattern ID", "bass drum rhythm pattern ID", "snare drum rhythm pattern ID", "high-hat rhythm pattern ID" and "cymbal rhythm pattern ID". The "style ID" is an identifier uniquely identifying a style data set, and the "style name" is also an identifier uniquely identifying a style data set.

In the style data table, a style data set having a certain style name comprises a plurality of sections that are divided into a plurality of segments, such as intro (intro-I (normal), into-II (variation 1) and intro-III (variation 2)), main (main-A (normal), main-B (variation 1), main-C (variation 2) and main-D (variation 3)), and ending (end01 (normal), end02 (variation 1) and end03 (variation 2)). Each of the segments has normal and variation patterns. Namely, the "section" represents a section which a style having a certain name belongs to. For example, once the user selects a style of style name "Bebop01" and instructs reproduction of the selected style, the control section 21 reproduces tones based on style data whose section is intro-normal pattern "I" among the style data sets having the style name "Bebop01", then repetitively reproduces tones based on style data whose section is main-normal pattern "A" a predetermined number of times, and then reproduces tones based on a style data set whose section is ending-normal pattern "1". In the aforementioned manner, the control section 21 reproduces tones, based on style data sets of the selected style, in accordance with the order of the sections. The "key" represents a tone pitch that becomes a basis for pitch-converting the style data. Although the "key" is indicated by a note name in the illustrated example, it practically represents a tone pitch because it indicates a note name in a particular octave. The "genre" represents a musical genre which the style data set belongs to. The "BPM" represents a tempo at which sounds based on the style data set are reproduced. The "musical time" represents a type of musical time of the style data set, such as triple time or quadruple time. Once a variation change instruction is given during a performance, the performance is switched to a variation pattern of the corresponding section and then returns to a normal pattern after the variation pattern is performed to its end.

In each of the style data sets, part-specific rhythm pattern IDs are stored in one-to-one association with the individual performance parts. In the style data set whose style ID is "0001" in the illustrated example of FIG. 16A, the "bass rhythm pattern ID" is "010010101". This means that, in the rhythm pattern table of FIG. 16A, (1) a rhythm pattern record where the part ID is "01" (bass), the rhythm pattern ID is "010010101", the rhythm pattern data is "BebopBass01Rhythm.txt" and the tone data is "BebopBass01Rhythm.Wav" and (2) the style data set whose style ID is "0001" are associated with each other. For the rhythm pattern IDs of the other performance parts than the bass part too, association similar to the above is described in the respective style data sets. Once the user selects a style data set of a certain style name and instructs reproduction of the selected style data set, the control section 21 reproduces tone data, associated with the rhythm pattern IDs of the individual performance parts included in the selected style data set, in a mutually-synchronized fashion. For each of the style data sets, a combination of the rhythm pattern IDs of individual performance parts constituting the style data set is predetermined such that the combination designates rhythm pattern records that are well compatible with or well suited to one another The "rhythm pattern records that are "well suited to one another" may be predetermined, for example, on the basis of factors that the rhythm pattern records of the different performance parts have similar or close BPMs, have a same musical key, belong to a same genre, and/or have a same musical time.

(a) of FIG. 16B shows an example of the section progression information table. The section progression information table is a table comprising a combination of section progression information for sequentially designating, in a time-serial manner, sections from among style data in accordance with a progression of a music piece performance. As shown in the example of (a) of FIG. 16B, the section progression information may comprise a style ID, style designating data St for designating a style, section information Sni for designating a section, section start/end timing data Tssi and Tsei (i=1, 2, 3, . . . ) indicative of positions of start and end times (normally, on a per-measure basis) of each section, and section progression end data Se indicative of a final end position of the section progression information, and such section progression information is stored, for example, in the storage section 22. Namely, each of the section information Sni designates a stored region of data related to the corresponding section, and the timing data Tssi and Tsei located preceding and following the information indicate a start and end of an accompaniment based on the designated section. Thus, using the section progression information, it is possible to sequentially designate, from among accompaniment style data designated by the accompaniment style designating data St, sections by repeated combinations of the timing data Tssi and Tsei and section information Sni.

(b) of FIG. 16B shows an example of the chord progression information table. The chord progression information table is a table comprising a plurality of chord progression information for sequentially designating, in a time-serial manner, chords to be performed in accordance with a progression of a music piece performance. As shown in the example of (b) of FIG. 16B, each of the chord progression information may comprise a style ID, key information Key, chord name Cnj, chord's root note information Crj for defining the chord name Cnj, chord type information Ctj, chord start and end timing data Tcsj and Tcej (j=1, 2, 3, . . . ) indicative of start and end time positions of the chord (normally, represented in beats), and chord progression end data Ce indicative of a final end position of the chord progression information, and these chord progression information is stored, for example, in the storage section 22. Here, the chord information Cnj defined by the two pieces of information Crj and Ctj indicates a type of a chord to be performed with respect to chord performance data in the section designated by the section information Sni, and the timing data Tcsi and Tcei located preceding and following the information indicate a start and end of the performance of the chord. Thus, with such chord progression information, chords to be performed can be sequentially designated by repeated combinations of the timing data Tcsj and Tcej and chord information Cnj after a musical key is designated by the key information Key.

Note that, although timing of the section progression information and the chord progression information is set in measures or in beats, any other desired timing may be used as necessary; for example, the timing of the section progression information and the chord progression information may be set in accordance with clock timing, and the number of the clock timing from the head of a measure of a music piece may be used as various timing data etc. Further, in a case where a next section Sni+i or chord Cnj+1 is to be started immediately following a given section Sni or chord Cnj, either the end timing Tsei or Tcei or the start timing Tss+1 or Tcei+1 can be omitted.

The following briefly explain a way of obtaining desired performance sounds from the section information and chord progression information. The control section 21 reads out, from the "section progression information", accompaniment style designating data St and accompaniment sound data pieces of sections (e.g., "Main-A" of "Bebop01") designated by sequentially read-out section information Sni and then stores the read-out accompaniment style designating data St and accompaniment sound data pieces into the RAM. Here, the data related to the individual sections are stored on the basis of the basic chord (e.g., "Cmaj"). The storage section 22 contains a conversion table having described therein conversion rules for converting the accompaniment sound data pieces, based on the basic chord, into sounds based on a designated desired chord. As desired chord information Cnj (e.g., "Dmaj") sequentially read out from the chord progression table is supplied to the control section 21, the accompaniment sound data pieces, based on the basic chord, are converted, in accordance with the conversion table, into sounds based on the read-out desired chord information Cnj. The sound output section 26 outputs the thus-converted sounds. Each time the section information read out from the section progression information changes to another, the accompaniment sound data pieces supplied to the control section 21 change, so that the audibly-generated sounds also change. Also, each time chord information read out from the chord progression information changes to another, the conversion rules change, so that the audibly-generated sounds change.

2-2. Behavior

Figure 17:
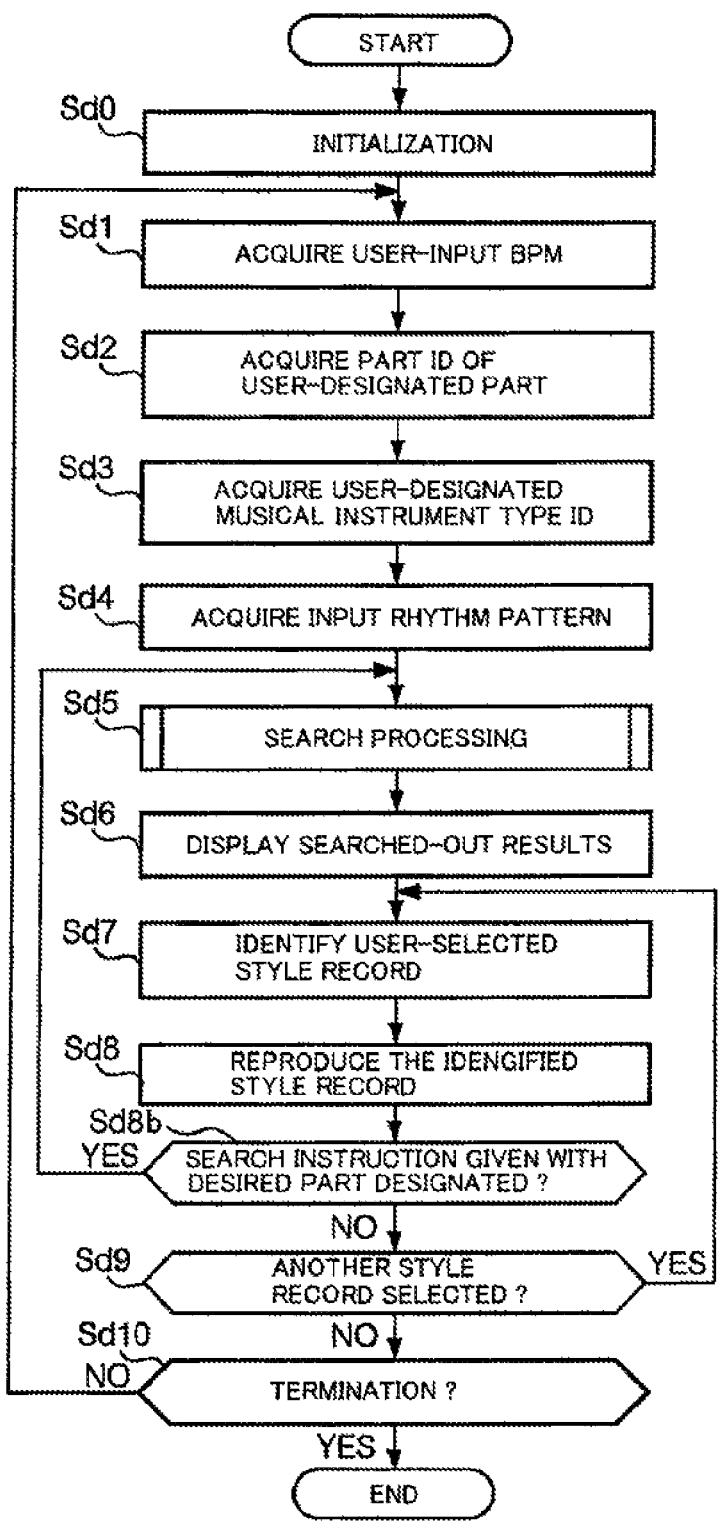
FIG. 17 is a flow chart of processing performed by an information processing device in a second embodiment of the present invention.

FIG. 17 is a flow chart of processing performed by the information processing device 20 in the second embodiment. In FIG. 17, operations of steps Sd0 to Sd5 are similar to the above-described operations of steps Sa0 to Sa5 of FIG. 7 performed in the first embodiment. At step Sd6 in the second embodiment, the control section 21 displays, as searched-out results, style data sets in which same pattern IDs as rhythm pattern records searched out at step Sd5 are set as rhythm pattern IDs of any of the performance parts.

FIGS. 18A and 18B are diagrams showing examples of searched-out results of style data sets or searched-out style data sets. FIG. 18A shows style data sets displayed on the display section 24 after being output by the control section 21 as searched-out results on the basis of a rhythm pattern input by the user via the chord inputting range keyboard 11b. In FIGS. 18A to 18C, item "similarity" represents a similarity distance between the input rhythm pattern and a rhythm pattern of each of the searched-out style data sets. Namely, a smaller value of the "similarity" indicates that the rhythm pattern of the searched-out style data set has a higher degree of similarity to the input rhythm pattern. As shown in FIG. 18A, various style data sets are displayed in ascending order the "similarity" to the input rhythm pattern (i.e., distance between the rhythm patterns calculated at step Sb7), i.e. in descending order of the degree of similarity to the input rhythm pattern. Here, the user can display the searched-out results after filtering the results using at least one of the items "key", "genre" and "BPM". Further, the BPM with which the user input the rhythm pattern, i.e. the input BPM, is displayed on an input BPM display section 301 provided above the searched-out results. Above the searched-out results, there are also displayed a tempo filter 302 for filtering the searched-out style data sets with the input BPM, and a musical time filter 303 for filtering the searched-out style data sets with a designated musical time. In addition, items "chord", "scale" and "tone color" may be displayed so that filtering can be performed with a chord currently used in the chord part if the user has designated the "chord" item, with a key with which the style data were created if the user has designated the "scale" item, and/or with tone colors of individual performance parts if the user has designated the "tone color" item.

The control section 21 has a filtering function for outputting, as searched-out results, only style data sets having a BMP close to the user-input BPM, and the user can set, as desired via the operation section 25, ON or OFF of the filtering function into the tempo filter 302 displayed above the searched-out results. More specifically, each of the style data sets has its BPM as noted above, and thus, when the filtering function is ON, the control section 21 can display, as searched-out results, information related to style data sets each having a BPM, for example, in the range of $(\frac{1}{2}^{1/2})$ to $(2^{1/2})$ times of the input BPM. Note that the above-mentioned coefficients $(\frac{1}{2}^{1/2})$ to $(2^{1/2})$ applied to the input BPM are merely illustrative and may be of the other values.

FIG. 18B shows a state in which the user has turned ON the filtering function from the state shown in FIG. 18B. In FIG. 18B, the control section 21 is performing the filtering by use of the coefficients $(\frac{1}{2}^{1/2})$ to $(2^{1/2})$. Namely, in FIG. 18B, style data sets having a BPM in the range of 71 to 141 are displayed as filtered results because the input BPM is "100". In this way, the user can obtain, as searched-out results, style data sets having a BPM close to the input BPM, so that the user can have a more feeling of satisfaction with the searched-out results.

Further, by inputting information indicative of a desired musical time, such as four-four (4/4) time, to the musical time filter 303 via the operation section 25, the user can perform filtering such that information indicative of style data sets associated with the input musical time information is displayed as searched-out results. Note that style data sets may be extracted not only by narrowing-down to style data sets of the designated musical time but also by narrowing down to style data sets of previously-grouped musical times related to the designated musical time. For example, an arrangement may be made such that, when quadruple time is designated, not only style data sets of quadruple time but also style data sets of double time and six-eight time that can be easily input via a quadruple-time metronome can be extracted.

Further, the user can obtain second searched-out results narrowed down from first searched-out style data sets, by first designating a performance part and inputting a rhythm pattern to search for style data sets having a rhythm pattern close to the input rhythm pattern (i.e., first search processing) and then designating another performance part and inputting a rhythm pattern to again search for style data sets (i.e., second search processing). In this case, the similarity distance of the searched-out results is a sum between values of similarity in the performance part designated in the first search and similarity in the performance part designated in the second search in each of the style data sets. For example, FIG. 18C shows content displayed as a result of the user designating the high-hat part as the performance part and inputting a rhythm pattern while the searched-out results of FIG. 18A are being displayed. Further, in FIG. 18C, style data sets having musical time information of "4/4" input to the time filter 303 are displayed as searched-out results. The "similarity" in FIG. 18C is a value obtained by adding together a similarity calculated in a case where the target performance part is "chord" and a similarity calculated in a case where the target performance part is "high-hat", in each of the style data sets. Although FIG. 18C shows that the search processing can be performed using two performance parts as indicated by two items "first search part" and "second search part", the number of performance parts capable of being designated for the search purpose is not so limited and may be any desired number. Further, if the user inputs, following a first search designating a performance part (first search part), a rhythm pattern designating a performance part (second search part) different from the first designated performance part (first search part), the control section 21 may output only searched-out results using (designating) the second search part irrespective of searched-out results using (designating) the first search part; this type of search will be referred to as "overwriting search". Switching may be made between the narrowing-down search and the overwriting search by the user via the operation section 25 of the information processing device 20.

The search in which a plurality of different performance parts are designated may be performed in any other suitable manner than the aforementioned. For example, when the user has executed performance operation simultaneously designating a plurality of performance parts, the following processing may be performed. Namely, the control section 21 calculates, for each of the designated parts, a similarity between a rhythm pattern record having the part ID of the performance part designated by the user and an input rhythm pattern of the performance part. Then, the control section 21 adds together the similarity, calculated for the rhythm pattern records of the individual designated performance parts, for each of style data sets associated with the rhythm pattern records. Then, the display section 24 displays the style data sets in ascending order of the added similarity, i.e. from the style data set of the smallest added similarity (namely from the style data set most similar to the input rhythm pattern). For example, when the user has input rhythm patterns by executing performance operation simultaneously for the bass drum and snare drum parts, the control section 21 calculates respective similarities for the bass drum and the snare drum and adds together the similarities. In the aforementioned manner, the user can simultaneously designate a plurality of parts to search for style data sets having phrases each constructed of a rhythm pattern whose similarity to a user-intended rhythm pattern satisfies a predetermined condition.

Once the user selects any desired style data set (style record) via the operation section 25 in the illustrated example of any one of FIGS. 18A to 18C, the control section 21 identifies the style data set selected by the user (step Sd7) and displays a configuration display screen of the identified style data set on the display section 24.

Figures 19, 20:
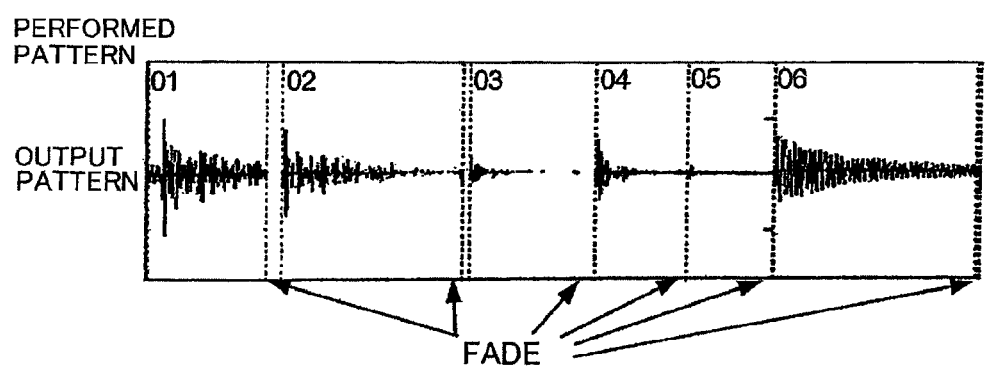
FIG. 19 is a diagram showing an example of a configuration display screen of the style data in the second embodiment of the present invention.
FIG. 20 is a schematic diagram showing an example where fading-out is applied to individual component notes of a tone data set.

FIG. 19 is a diagram showing an example of the style data configuration display screen. For convenience of description, let it be assumed here that the user has selected a style data set of style name "Bebop01" from among the searched-out results. The style name, key, BPM and musical time of the selected style data set are displayed in an upper region of the configuration display screen, tabs indicative of sections (section tabs) 401 are displayed in a middle region of the configuration display screen, and information of individual performance parts of the section indicated by any one of the tabs is unrolled and displayed in respective tracks. In the information of each of the performance parts, a BPM, rhythm category and key in a respective rhythm pattern record are displayed. In FIG. 19, the horizontal axis is a time axis indicating that the time progresses in a left-to-right direction in the figure. Further, on the basis of rhythm patterns of individual performance parts indicated by individual tracks of the section indicated by the tab, predetermined images 402 are displayed at positions corresponding to sound generation times of individual component notes with the left ends of the images 402 corresponding to positions representing sound generation start times of individual component notes. Here, each of the images 402 is displayed in a bar shape having a predetermined dimension in a vertical direction of the configuration display screen. Once the user selects a desired one of the section tabs 401 via the operation section 25, the control section 21 reproduces tones based on the style data of the section of the selected tab (step Sd8). Note that, on the configuration display screen, it is possible to register, edit, confirm and check user-created original style data and performance data included in existing and original style data through operation of not-shown operators.

The information processing device 20 can reproduce a style data set in response to a reproduction start instruction given by the user operating a not-shown operator on the style data configuration display screen. In the illustrated example, there are provided three types of operation modes for the reproduction: automatic accompaniment mode; replacing search mode; and follow-up search mode. The user can switch among the three modes via the operation section 25. In the automatic accompaniment mode, performance data based on the selected style data set are reproduced, but also the user can execute performance operation using the rhythm input device 10 and operation section 25 so that sounds based on the user's performance operation are output together with the tones based on the selected style data set.

The control section 21 also has a mute function, so that the user can cause, via the operation section 25, the mute function to act on a desired performance part so that performance data of the desired performance part are prevented from being audibly reproduced. In this case, the user can itself execute performance operation for the muted performance part while listening to non-muted performance parts like accompaniment sound sources.

Further, in the replacing search mode, the control section 21 performs the following processing in response to the user inputting a rhythm pattern to the rhythm input device 10, designating a desired performance part via the operation section 25. In this case, the control section 21 replaces performance data of the designated performance part, included in previously-combined performance data of the currently reproduced style data set, with performance data selected from among searched-out results based on the user-input rhythm pattern. More specifically, at that time, once the user inputs a rhythm pattern via the rhythm input device 10 designating a desired performance part, the control section 21 performs the aforementioned search processing for the designated performance part and then displays searched-out results like those of FIG. 11 on the display section 24. Then, once the user selects a particular one of the searched-out results, the control section 21 replaces performance data of the designated performance part, included in the style data being currently reproduced, with the selected performance data, so that a performance is executed on the basis of the selected performance data In this way, the user can replace performance data of a desired performance part of a style data set, selected from among the searched-out results, with performance data based on its input rhythm pattern. Thus, the user can obtain not only a pre-combined style data set but also a style data set reflecting therein its intended rhythm pattern per section and per performance part, and consequently, the user can perform not only a search but also music composition using the information processing device 20.

Further, in the follow-up search mode, in response to the user itself executing performance operation for a performance part, muted by use of the mute function, while listening to non-muted performance parts like accompaniment sound sources, the control section 21 searches, for each performance part for which no performance operation has been executed, for performance data well suited to an input rhythm pattern of the part for which the performance operation has been executed. The "performance data well suited to an input rhythm pattern" may be predetermined, for example, on the basis of any of factors that the performance data have a same key, belong to a same genre and have a same musical time as the input rhythm pattern, and have a BPM within a predetermined range relative to the input BPM. Once the control section 21 identifies performance data of the smallest similarity (i.e., greatest degree of similarity) from among the performance data well suited to the input rhythm pattern of the performance part for which the user7s performance operation has been executed, it reproduces these data in a mutually-synchronized fashion. Thus, even where the user has a low feeling of satisfaction with the searched-out results, the user can cause style data well suited to its input rhythm pattern to be reproduced, by merely inputting the input rhythm pattern, designating a performance part.

At step Sd8b following step Sd8, a determination is made as to whether the predetermined search key (not shown) has been operated by the user after designating one user-desired performance part within the identified style record (a set of performance data). If a search instruction has been given by the user with the one user-desired performance part designated (i.e., YES determination at step Sd8b), the control section 21 reverts to step Sd5. Thus, the search processing of step Sd5 is performed again with a sound generation pattern of the tone data set of the designated one performance part (part performance data) used as a new query pattern. In this manner, a new search (re-search) is performed, on the basis of the searched-out results responsive to the query pattern input by the user via the rhythm input device 10, using, as a new query pattern, a sound generation pattern of an existing tone data set (part performance data) included in the searched-out results. Thus, in a case like where a query pattern has not been input accurately by the user, an accurate sound generation pattern can be used as a query pattern for a re-search. As a result, the search input operation can be made easier to the user.

Once the user selects another style data set via the operation section 25 (YES determination at step Sd9 of FIG. 17) in the case of a NO determination of step Sd8b, the control section 21 reverts to step Sd7. In this case, the control section 21 identifies the newly selected style data set (step Sd7) and displays a reproduction screen of the identified style data set on the display section 24. Then, once the user instructs termination of the search processing (YES determination at step Sd10) without selecting another style data set via the operation section 25 (NO determination at step Sd9) after step Sd8, the control section 21 brings the processing to an end.

According to the second embodiment, as described above, the user can search for, by executing performance operation to input a rhythm pattern for a selected performance part, not only a tone data set of the performance part similar to the input rhythm pattern but also a style data set comprising a combination of the tone data set of the rhythm pattern similar to the input rhythm pattern and tone data sets well suited to the input rhythm pattern. Further, the user can replace a tone data set of a desired performance part, included in searched-out style data sets, with a tone data set similar to another input pattern different from the first input rhythm pattern, or create a new style data set by modifying the searched-out style data set. In this way, the user can use the information processing device 20 to perform not only a search but also music composition.

3. Third Embodiment

The music data creation system 100 according to a third embodiment of the present invention has a tone data editing function in addition to (or in place of) the search function described above in relation to the first embodiment. When performance sounds indicated by a tone data set found through a search do not completely match a user's desire, the user may want to revise the tone data set. The third embodiment is designed to satisfy such a demand. Hereinafter, description about some of features of the third embodiment which are identical or similar to those of the first or second embodiment will be omitted to avoid unnecessary duplication.

Figure 27:
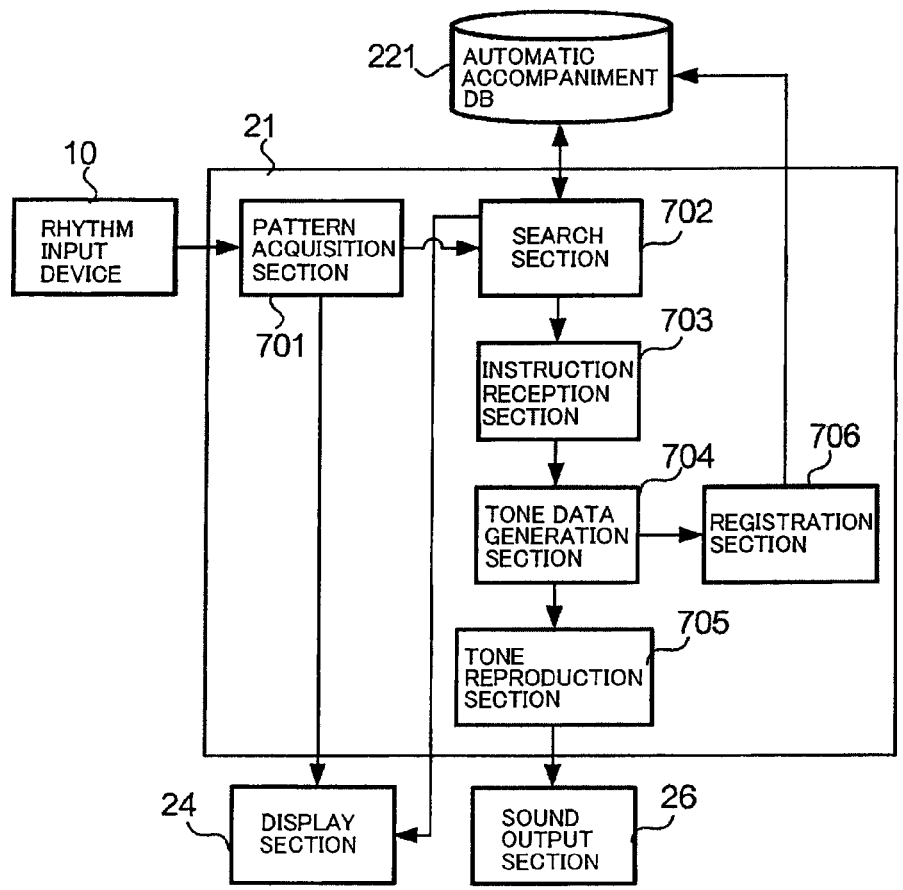
FIG. 27 is a block diagram showing functional arrangements of a third embodiment.

FIG. 27 is a block diagram showing functional arrangements of a third embodiment of the music data creation system 100 of the present invention. The control section 21 includes a pattern acquisition section 701, a search section 702, an instruction reception section 703, a tone data generation section 704, a tone reproduction section 705, and a registration section 706. The pattern acquisition section 701 acquires an input rhythm pattern (searching query pattern), input via the rhythm input device 10, in combination with a particular performance part selected from among a plurality of performance parts. From the automatic accompaniment database 221, the search section 702 acquires, as searched-out results, one or more tone data sets (sound waveform data sets) and rhythm pattern data corresponding to the one or more tone data sets on the basis of results of comparison between the input rhythm pattern and rhythm pattern data (reference data or search target data) of a particular performance part. As already explained above, the automatic accompaniment database 221 is a database which has registered therein, for each of the plurality of performance parts, one or more tone data sets and rhythm pattern data indicative of respective rhythm patterns in the tone data sets. The instruction reception section 703 receives an edit instruction for editing rhythm pattern data included in the searched-out results. The tone data generation section 704 generates tone data corresponding to the rhythm pattern data edited in accordance with the edit instruction. The registration section 706 registers, into the automatic accompaniment database 221, a set of the rhythm pattern data edited in accordance with the edit instruction and tone data generated by the tone data generation section 704 in correspondence with the edited rhythm pattern data.

FIG. 28 is a diagram showing an example of a UI screen employed in the third embodiment. In the illustrated example, the rhythm input device 10 includes a display device having a touch screen. FIG. 28 shows images displayed on the display device provided in the rhythm input device 10. The UI screen includes a search area 81 and a sequencer area 82. The search area 81 is an area for inputting search conditions, and the search area 81 includes a part designation region 811, a genre designation region 812, a template designation region 813, a searched-out result display region 814 and a search button 815. Hereinbelow, behavior of the third embodiment will be described using the UI screen.

Figure 29:
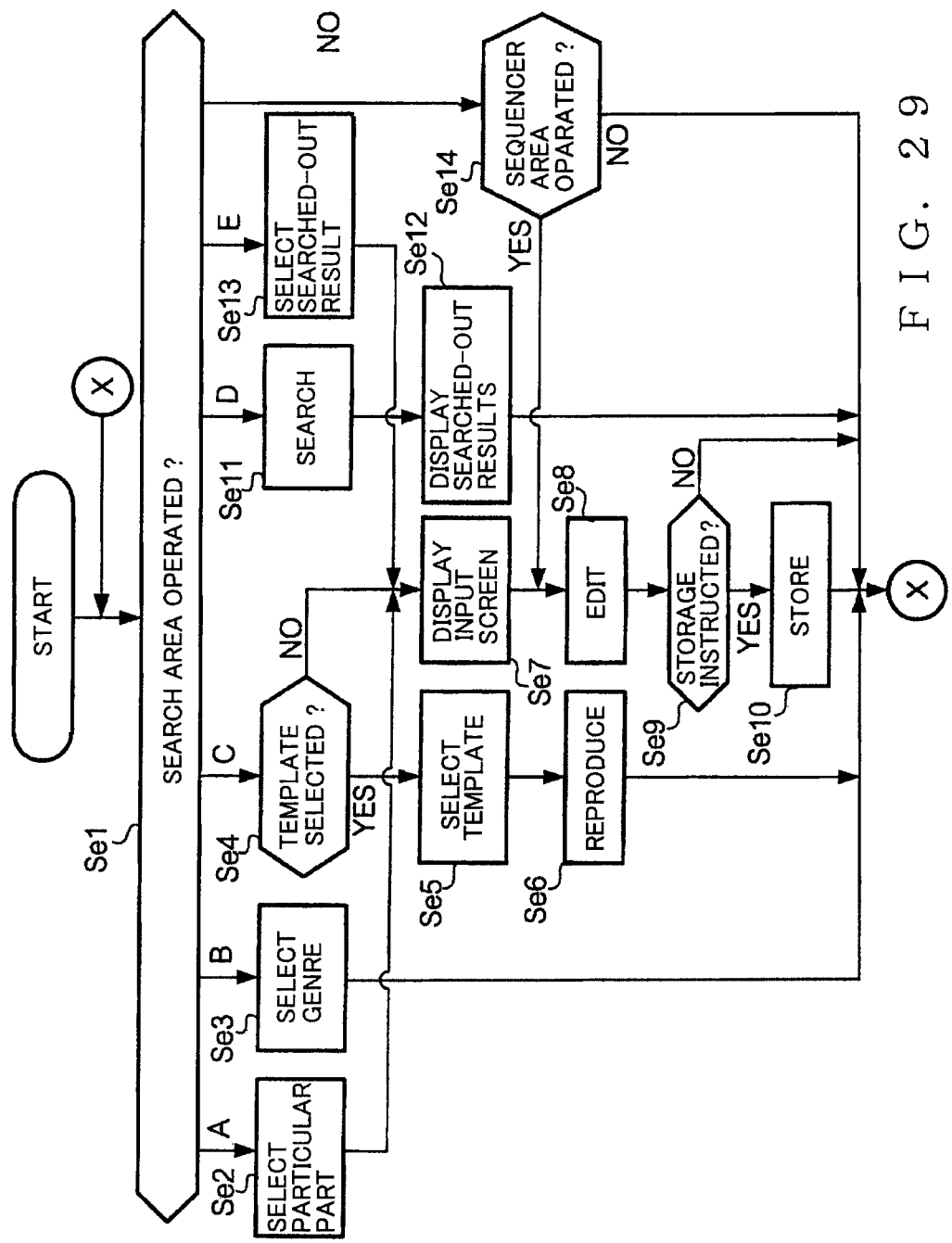
FIG. 29 is a flow chart showing processing performed in the third embodiment.

FIG. 29 is a flow chart showing processing performed in the third embodiment of the tone data creation system 100. At step Se1, the control section 21 determines whether any operation has been performed on the search area 81. If an operation has been performed on the part designation region 811 as determined at step Se1 ("A" determination at step Se1), the processing goes to step Se2. If an operation has been performed on the genre designation region 812 as determined at step Se1 ("B" determination at step Se1), the processing goes to step Se3. If an operation has been performed on the template designation region 813 as determined at step Se1 ("C" determination at step Se1), the processing goes to step Se4. If an operation has been performed on the search button 815 as determined at step Se1 ("D" determination at step Se1), the processing goes to step Se11. If an operation has been performed on the result display region 814 as determined at step Se1 ("E" determination at step Se1), the processing goes to step Se13. Further, if no operation has been performed on the search area 81 ("NO" determination at step Se1), the processing goes to step Se14.

At step Se2, the control section 21 selects a particular performance part in accordance with a user's operation performed via the part designation region 811 that is a region for designating (selecting) a desired performance part. Different performance parts are assigned to individual cells of the part designation region 811. In the illustrated example of FIG. 28, "drums", "bass", "chords" and "phrase" are assigned, from top to down, to the cells of the part designation region 811. The control section 21 selects a particular performance part assigned to any one of the cells of the region 811 that has been touched by the user on a touch panel of the display device. Upon selection of the particular performance part, the control section 21 moves to step Se7 and subsequent steps in order to make editable the selected performance part. Note that an arrangement may be made for allowing a performance part to be selected while a performance pattern of a particular performance part is being displayed on a sequencer screen. Thus, if the user designates a particular track, to which for example the bass part is assigned, while a performance pattern of the chord part is being displayed on the sequencer screen, a performance pattern of the bass part assigned to the track will be displayed on the sequencer screen.

At step Se3, the control section 21 selects a particular genre in accordance with a user's operation performed via the genre designation region 812 that is a region for designating a desired genre. Different genres are assigned to individual cells of the genre designation region 812. In the illustrated example of FIG. 28, "all genre", "techno", "house", "R & B", "chill" and "funk" are assigned, from top to down, to the cells of the genre designation region 812. The control section 21 selects a particular genre assigned to any one of the cells of the region 812 that has been touched by the user on the touch panel of the display device. Upon selection of the particular genre, the control section 21 moves to step Se1.

At step Se4, the control section 21 determines whether any template has been selected via the template designation region 813. The template designation region 813 is a region for designating any one of various templates. The templates each represent a part of a tone data set, i.e. typical tone data that are assumed to have a high use frequency, tone data registered in advance by the user or a combination of such tone data.

In the template designation region 813 are displayed templates corresponding to performance parts designated in the part designation region 811 and genres designated in the genre designation region 812. Once a position of the touch panel that corresponds to a particular one of the cells of the template designation region 813 is touched, the template (tone data) assigned to the particular cell is selected. In the template designation region 813 of FIG. 28, "input rhythm" is assigned to the uppermost cell, and templates are assigned to the other cells. If any one of the cells having the templates assigned thereto has been selected by the user in the template designation region 813 (YES determination at step Se4), the control section 21 proceeds to step Se5. If any other cell than the cells having the templates assigned thereto has been selected by the user in the template designation region 813 (NO determination at step Se4), the control section 21 branches to step Se7.

At step Se5, the control section 21 selects one of the templates in accordance with the user's operation. At next step Se6, the control section 21 reproduces tones using the selected template (in a looped fashion in the illustrated example). The control section 21 reverts to step Se1 while still continuing with the tone reproduction.

At step Se7, the control section 21 displays, in the sequencer area 82, an input screen corresponding to a particular performance part. At next step Se8, the control section 21 edits a rhythm pattern of the particular performance part in accordance with a user's operation. The instruction reception section 703 and the operation of step Se8 together implement a function of an editing section.

FIG. 30 is a diagram showing an example of the input screen displayed in the sequencer area 82. The example of the input screen shown in FIG. 30 is one displayed when "drums" has been selected as the performance part, and it has a plurality of cells arranged in a two-dimensional configuration of which the horizontal direction represents the passage of time. In the illustrated example of FIG. 30, each of the cells represents a time period corresponding to 1/16 of a measure (i.e., time period corresponding to a sixteenth note). Further, in the illustrated example of FIG. 30, 16 (sixteen) cells are displayed in the horizontal direction (i.e., in each horizontal row), and a rhythm pattern of one measure is represented by these 16 cells. Each of the horizontal rows comprising 16 cells represents a rhythm pattern of one performance part. In the illustrated example, three horizontal rows represent, from top to down, rhythm patterns of "high-hat", "snare drum" and "bass drum".

Further, in the illustrated example of FIG. 30, each white-color cell indicates that there is no sound generated in the corresponding time period (i.e., indicates no-sound-generated state), while each hatched cell indicates that there is a generated sound (note event) (i.e., indicates a sound-generated state). Although only presence/absence of a generated sound is indicated in the illustrated example, any of parameters, such as the pitch (note number), attack intensity (velocity) and duration of generation of a sound, may be visually displayed in a color, length of successive cells, or the like. Once the user touches any one of the cells, the touched cell changes to another state. For example, if the cell has so far been indicating the "no-sound-generated state", the cell changes to indicate the sound-generated state in response to the user's touching operation, while, if the cell has so far been indicating the "sound-generated state", the cell changes to indicate the no-sound-generated state in response to the user's touching operation.

FIG. 31 is a diagram showing another example of the input screen displayed in the sequencer area 82 when "bass" or "phrase" has been selected as the performance part. The input screen has a plurality of cells arranged in a two-dimensional direction of which the horizontal direction represents the passage of time and the vertical direction represents pitches (note numbers). In the illustrated example of FIG. 31, each of the cells represents a time period corresponding to 1/8 of a measure (i.e., time period corresponding to an eighth note). Further, in the illustrated example of FIG. 31, 8 (eight) cells are displayed in the horizontal direction (i.e., in each horizontal row), and a rhythm pattern of one measure is represented by these 8 cells. Further, in the illustrated example, each white-color cell indicates that there is no sound generated in the time period (i.e., no-sound-generated state), while each hatched cell indicates that there is a generated sound (note event) (i.e., sound-generated state). Once the user touches any one of the cells, the touched cell changes to another state. For example, if the cell has so far been indicating the "no-sound-generated state", the cell changes to the sound-generated state in response to the user's touching operation, while, if the cell has so far been indicating the "sound-generated state", the cell changes to the no-sound-generated state in response to the user's touching operation.

The control section 21 edits a rhythm pattern of a particular performance part in accordance with a user's operation on the input screen of FIG. 30 or 31, and the control section 21 stores the edited rhythm pattern into the RAM. In parallel with the editing, the control section 21 reproduces tones in accordance with the rhythm pattern being edited.

Referring back to FIG. 29, the control section 21 determines, at step Se9, whether storage of the edited rhythm pattern has been instructed or not. Storage of the rhythm pattern is instructed, for example, by the user touching a storage button (not shown) on the input screen. If storage of the rhythm pattern has been instructed as determined at step Se9 (YES determination at step Se9), the control section 21 proceeds to step Se10. If storage of the rhythm pattern has not been instructed as determined at step Se9 (NO determination at step Se9), the control section 21 reverts to step Se1.

At step Se10, the control section 21 registers, into the automatic accompaniment database 221, a tone data set corresponding to the edited rhythm pattern for which the storage instruction has been made as described above. In this way, on the basis of the edited rhythm pattern stored in the automatic accompaniment database 221, the control section 21 can generate a corresponding tone data set (waveform data). For example, the well-known technique for generating waveform data on the basis of MIDI data may be used for generating such tone data on the basis of the input rhythm pattern. Further, the control section 21 generates information, such as a rhythm pattern ID, to be used in the automatic accompaniment database 221. Thus, in and after the next execution of the processing, the newly-registered rhythm pattern too can become a search target. Upon completion of the registration, into the accompaniment database 221, of the data, the control section 21 reverts to step Se1.

At steps Se11 and Se12, a search for a rhythm pattern is executed in a similar way to the aforementioned first and second embodiments. At step Se11, the control section 21 searches, on the basis of calculated similarities, for tone data sets having rhythm patterns identical or similar to the input rhythm pattern (query pattern). Such a search for tone data set can be started in response to selection of a cell if the cell has a template assigned thereto, or in response to user's touching (depressing) operation on the search button 815 if the "input rhythm" cell has been selected. Details of the search are the same as described above in relation to the first and second embodiments. It should be noted that the process as shown in FIG. 29 may be configured so that if a search instruction by a user is issued during the process at step Se8, then the process jumps to step Se11 so as to perform a search for a rhythm pattern in response to the edited or in-editing rhythm pattern as a query pattern. Namely, a search using, as a new query pattern, the edited or in-editing rhythm pattern can be performed in the third embodiment as shown in FIG. 29.

At step Se12, the control section 21 displays searched-out results in the result display region 814 that is a region for displaying searched-out results. File names of tone data sets included in the searched-out results are displayed in the result display region 814 in predetermined order (basically, in descending order of similarities obtained at step Se11). In a case where there are a plurality of rhythm patterns of a same similarity, the file names are displayed in order based on a predetermined priority order, e.g. in descending order of use frequency, in order of registration, in alphabetical order or the like. After displaying the searched-out results, the control section 21 reverts to step Se1.

At step Se13, the control section 21 selects one tone data set from among the searched-out results in response to a user's operation. More specifically, the control section 21 selects one tone data set assigned to one cell touched by the user in the result display region 814. After selecting the tone data set, the control section 21 moves to step Se7. In this case, at step Se7, the rhythm pattern corresponding to the selected tone data set is displayed on the input screen. As the rhythm pattern is displayed in response to the selection of the tone data set as above, the tone data set may be reproduced simultaneously with the display of the rhythm pattern.

At step Se14, the control section 21 determines whether the sequencer area 82 has been operated by the user. If the sequencer area 82 has been operated (YES determination at step Se14), the control section 21 moves to step Se8. Note that, if no template or tone data set has been selected prior to step Se8, the control section 21 having moved to step Se8 reverts to step Se1 because there is no rhythm pattern to be edited. If, on the other hand, the sequencer area 82 has not been operated as determined at step Se14 (NO determination at step Se14), the control section 21 reverts to step Se1.

According to the instant embodiment, as set forth above, the user can edit a searched-out tone data set, during which time the user can edit the rhythm pattern while listening to tones reproduced in a looped fashion. Further, the user can register the tone data set, corresponding to the edited rhythm pattern, into the automatic accompaniment database 221 and subsequently reuse the thus-registered tone data set. Note that content to be displayed in the part designation region 811, genre designation region 812, template designation region 813 and result display region 814 is acquired from the automatic accompaniment database 221. Further, the UI screens (including the input screens of the sequencer area 82) may also be employed in the above-described first and second embodiments.

4. Modifications

The above-described embodiments of the present invention may be modified as follows. The following modifications may also be combined as necessary.

4-1. Modification 1

Whereas the above-described embodiments are constructed in such a manner that one rhythm pattern record is output as a searched-out result in the loop reproduction mode or in the performance loop reproduction mode, the present invention is not so limited. For example, the rhythm pattern search section 213 may output, as searched-out results, a plurality of rhythm pattern records having similarities more than a predetermined similarity to an input rhythm pattern after having rearranged the plurality of rhythm pattern records in descending order of the similarity. In such a case, the number of the rhythm pattern records to be output as the searched-out results may be prestored as a constant in the ROM, or may be prestored as a variable in the storage section 22 so that it is changeable by the user. For example, if the number of the rhythm pattern records to be output as the searched-out results is five, five names of respective tone data sets of the rhythm pattern records are displayed in a list format on the display section 24. Then, sounds based on a user-selected one of the rhythm pattern records are audibly output from the sound output section 26.

4-2. Modification 2

In the case of a musical instrument type capable of playing a greater range of tone pitches, it is sometimes possible that keys (tone pitches) of individual component sounds or notes of a tone data set and keys (tone pitches) of an accompaniment including an external sound source do not agree with each other. To deal with such disagreement, the control section 21 may be constructed to be capable of changing the key of any of the component notes of the tone data set in response to the user performing a necessary operation via the operation section 25. Further such a key change may be effected via either the operation section 25 or a control (operator), such as a fader, knob or wheel, provided on the rhythm input device 10. As another alternative, data indicative of the keys (tone pitches) of the component notes may be prestored in the rhythm DB 221 and the automatic accompaniment DB 221 so that, once the user changes a key, the control section 21 may inform the user what the changed key is.

4-3. Modification 3

In some tone data sets, an amplitude (power) of a waveform dose not necessarily end in, or converge to, the neighborhood of a value "0" near the end of a component note, in which case clip noise tends to be generated following audible output of a sound based on the component note. In order to avoid such unwanted clip noise, the control section 21 may have a function for automatically fading in or fading out predetermined portions in the neighborhood of the start or end of a component note. In such a case, the user is allowed to select, via some operator provided on the operation section 25 or rhythm input device 10, whether or not to apply the fading-in or fading-out.

FIG. 20 is a schematic diagram showing an example where the fading-out is applied to individual component notes of a tone data set. As shown in FIG. 20, the fading-out is applied to portions of the tone data set depicted by arrows labeled "Fade", so that a waveform in each of the arrowed portions gradually decreases in amplitude to take a substantially zero amplitude at the end time of the corresponding component note. For each of the component notes, a time period over which the fading-out is applied is in a range of several msec to dozens of msec and adjustable as desired by the user. An operation for applying the fading-out may be performed as pre-processing or preparation for user's performance operation, as real-time processing or post-processing.

4-4. Modification 4

A phrase obtained as a result of the user executing performance operation may be recorded by the control section 21 so that the recorded content can be output in a file format conventionally used in a sound source loop material. In music piece production, for example, if the control section 21 has the function for recording a user's performance in a case where a rhythm pattern desired by the user is not stored in the automatic accompaniment DB 221, the user can acquire a phrase tone data set very close in image to a user's desired phrase tone data set.

4-5. Modification 5

The control section 21 may set, as objects or targets of reproduction, a plurality of tone data sets rather than just one tone data set so that a plurality of phrases can be output as overlapped sounds. In this case, for example, a plurality of tracks may be displayed on the display section 24 so that the user can allocate different tone data sets and reproduction modes to the displayed tracks. In this way, the user can, for example, allocate tone data of a conga to track A in the loop reproduction mode so that the conga tone data are audibly reproduced as an accompaniment in the loop reproduction mode, and allocate tone data of a djembe to track B in the performance reproduction mode so that the djembe tone data are audibly reproduced in the performance reproduction mode.

4-6. Modification 6

As still another modification, the following process may be performed in the event that attack intensity of a component note (hereinafter referred to as "component note A") having the same sound generation time as trigger data, included in a searched-out tone data set and associated with velocity data input through performance operation by the user, extremely differs from the velocity data (e.g., exceeds a predetermined threshold value in this case). In such a case, the control section 21 replaces component note A with a component note randomly selected from among a plurality of component notes having attack intensity substantially corresponding to the user-input velocity data. In this case, the user can select, via some operator provided on the operation section 25 or rhythm input device 10, whether such a replacement process should be performed or not. In this way, the user can obtain an output result much closer to the performance operation executed by the user itself.

4-7. Modification 7

Whereas the first embodiment has been described above in relation to the case where tone data sets are in a file format, such as the WAVE or mp3, the present invention is not so limited, and tone data sets may be sequence data sets, for example, in the MIDI format. In such a case, files are stored in the storage section 22 in the MIDI format, and a construction corresponding to the sound output section 26 functions as a MIDI tone generator (sound waveform generator device). Particularly, if tone data sets are in the MIDI format in the first and second embodiments, processes like the time-stretch process are unnecessary at the time of key shift and pitch conversion. Thus, in this case, once the user designates a key via the key designating keyboard 202, the control section 21 changes key-indicating information, included in MIDI information represented by tone data, into the designated key. Further, in this case, each rhythm pattern record in the rhythm pattern table need not contain tone data corresponding to a plurality of chords. Once the user designates a chord via the chord designating keyboard 203, the control section 21 changes chord-indicating information, included in MIDI information represented by tone data, into the designated chord. Thus, even in the case where tone data sets are files in the MIDI format, the same advantageous benefits as the above-described embodiments can be achieved. Further, in the second embodiment, style data sets using audio data may be used. In this case, such style data sets are similar in fundamental construction to the style data sets used in the second embodiment, but different from the style data sets used in the second embodiment in that performance data of individual performance parts are stored as audio data. Alternatively, style data sets each comprising a combination of MIDI data and audio data may be used. In each of the above-described embodiments, the data format is not limited to the ones described above, and sound data may be used in any desired form, e.g. separately or in combinations comprising a plurality of sound data.

4-8. Modification 8

Whereas the control section 21 in the above-described embodiments has been described as detecting a particular rhythm pattern record through comparison between trigger data input through user's performance operation and rhythm pattern data stored in the automatic accompaniment DB 221, the present invention is not so limited. For example, the control section 21 may search through the automatic accompaniment DB 221 using both trigger data and velocity data input through user's performance operation. In this case, if two tone data sets having a same rhythm pattern exist, one of the two tone data sets, in which attack intensity of each component note is closer to the velocity data input through the user's performance operation than the other, is detected as a searched-out result. In this manner, for the attack intensity as well, a tone data set very close to a user-imaged tone data set can be output as a searched-out result.

4-9. Manner of Calculation of a Difference Between Rhythm Patterns

The manner in which a difference between rhythm patterns is calculated in the above-described embodiments is merely illustrative, and such a difference may be calculated in a different manner, or using a different method, from the above-described embodiments.

4-9-1. Modification 9

For example, as a modification, the rhythm pattern difference calculation at step Sb6 and the rhythm pattern distance calculation at step Sb7 may be performed after a rhythm category which the input rhythm pattern falls in is identified and using, as objects of calculation, only phrase records or rhythm pattern records that belong to the identified rhythm category, so that a phrase record matching the rhythm category of the input rhythm pattern can be reliably output as a searched-out result. Because such a modified arrangement can reduce the quantities of necessary calculations, this modification can achieve not only a lowered load on the information processing device 20 but also a reduced time for response to the user.

4-9-2. Modification 10

Each difference smaller than a predetermined reference value may be treated as zero. Namely, in the calculation of a difference between rhythm patterns at step Sb6 above, the following operations may be performed. Namely, in modification 10, for each ON-set time of a to-be-compared rhythm pattern (i.e., rhythm pattern to be compared against the input rhythm pattern) of which an absolute value of a time difference from an ON-set time of the input rhythm pattern is smaller than a threshold value, the control section 21 regards the absolute value of the time difference as one not intended by user's manual input and corrects the difference value to "0" or corrected to a value smaller than the original value. The threshold value is, for example, a value "1" and prestored in the storage section 22. For convenience of description, let it be assumed that ON-set times of the input rhythm pattern are "1, 13, 23, 37" and ON-set times of the to-be-compared rhythm pattern are "0, 12, 24, 36". In this case, absolute values of differences in the individual ON-set times are calculated as "1, 1, 1, 1". If the threshold value is "1", the control section 21 performs correction by multiplying the absolute value of the difference of each of the ON-set times by a coefficient $\alpha$. The coefficient $\alpha$ takes a value in the range of from "0" to "1" ("0" in this case). Thus, in this case, the absolute values of differences in the individual ON-set times are corrected to "0, 0, 0, 0", so that the control section 21 calculates a difference between the two rhythm patterns as "0". Although the coefficient $\alpha$ may be predetermined and prestored in the storage section 22, a correction curve having values of the coefficient $\alpha$ associated with difference levels between two rhythm patterns may be prestored, for each rhythm category, in the storage section 22 so that the coefficient $\alpha$ can be determined in accordance with the correction curve.

4-9-3. Modification 11

In modification 11, each difference greater than a predetermined reference may not be used in the calculation. Namely, in the calculation of a difference between rhythm patterns at step Sb6 above, the following operations may be performed. Namely, the control section 21 does not use each ON-set time of a to-be-compared rhythm pattern (i.e., rhythm pattern to be compared against the input rhythm pattern) of which an absolute value of a time difference from an ON-set time of the input rhythm pattern is greater than a threshold value, or the control section 21 corrects the time difference to be smaller than the original value. Thus, even when the user has input a rhythm pattern only for a former half portion or latter half portion of a measure, a search is performed with the rhythm-pattern-input former or latter half portion of the measure used as an object or target of the search. Thus, even where no rhythm pattern record having the same rhythm pattern as the input rhythm pattern throughout one measure is contained in the automatic accompaniment DB 221, the user can obtain, as searched-out results, rhythm pattern records similar to the input rhythm pattern to some extent.

4-9-4. Modification 12

A velocity pattern difference may be considered. Namely, in the calculation of a difference between rhythm patterns at step Sb6 above, a calculation scheme or method taking into account a velocity pattern difference may be employed. Assuming that the input rhythm pattern is "rhythm pattern A" while a rhythm pattern described in a rhythm pattern record is "rhythm pattern B", a difference between rhythm pattern A and rhythm pattern B is calculated in the following operational step sequence.

(a-1) The control section 21 calculates, using the ON-set times of rhythm pattern A as calculation bases, an absolute value of a time difference between each ON-set time in rhythm pattern A and an ON-set time in rhythm pattern B that is closest to the ON-set time in rhythm pattern A.

(a-2) The control section 21 calculates a sum of all of the absolute values of the time differences calculated at step (a-1) above.

(a-3) The control section 21 calculates an absolute value of a difference between velocity data at each ON-set time in rhythm pattern A and attack intensity at a corresponding ON-set time in rhythm pattern B and then calculates a sum of all of such absolute values.

(a-4) The control section 21 calculates, using the ON-set times of rhythm pattern B as calculation bases, an absolute value of a time difference between each ON-set time in rhythm pattern B and an ON-set time in rhythm pattern A that is closest to the ON-set time in rhythm pattern B.

(a-5) The control section 21 calculates a sum of all of the absolute values of the time differences calculated at step (a-4) above.

(a-6) The control section 21 calculates an absolute value of a difference between velocity data at each ON-set time in rhythm pattern B and attack intensity at a corresponding ON-set time in rhythm pattern A and then calculates a sum of all of such absolute values.

(a-7) The control section 21 calculates a difference between rhythm pattern A and rhythm pattern B in accordance with the following mathematical expression (1):

$$\text{difference between rhythm pattern } A \text{ and rhythm pattern } B = \alpha*(\text{the sum of all of the absolute values of the time differences calculated at step}(a\text{-}2) + \text{the sum of all of the absolute values of the time differences calculated at step}(a\text{-}5))/2 + (1-\alpha)*(\text{the sum of all of the absolute values of the velocity differences calculated at step}(a\text{-}3) + \text{the sum of all of the absolute values of the velocity differences calculated at step}(a\text{-}6))/2 \quad \text{mathematical expression (1)}$$

where * denotes a multiplication sign and/denotes a division sign.

In mathematical expression (1) above, $\alpha$ is a predetermined coefficient that satisfies $0<\alpha<1$ and is prestored in the storage section 22. The user can change the value of the coefficient $\alpha$ via the operation section 25. For example, in searching for a rhythm pattern, the user may set a value of the coefficient $\alpha$ depending on whether priority should be given to a degree of ON-set time coincidence or to a degree of velocity coincidence. In this way, the user can acquire a searched-out result with the velocity taken into consideration.

4-9-5. Modification 13

A duration pattern difference may be considered. In the calculation of a difference between rhythm patterns at step Sb6 above, a calculation scheme or method taking into account a duration pattern difference may be employed. Assuming that the input rhythm pattern is "rhythm pattern A" while a rhythm pattern described in a rhythm pattern record is "rhythm pattern B", a level of a difference between rhythm pattern A and rhythm pattern B is calculated in the following operational step sequence.

(b-1) The control section 21 calculates, using the ON-set times of rhythm pattern A as calculation bases, an absolute value of a time difference between each ON-set time in rhythm pattern A and an ON-set time in rhythm pattern B that is closest to the ON-set time in rhythm pattern A.

(b-2) The control section 21 calculates a sum of all of the absolute values of the time differences calculated at step (b-1) above.

(b-3) The control section 21 calculates an absolute value of a difference between a duration pattern at each ON-set time in rhythm pattern A and a duration pattern at a corresponding ON-set time in rhythm pattern B and calculates a sum of all of such absolute values.

(b-4) The control section 21 calculates, using the ON-set times of rhythm pattern B as calculation bases, an absolute value of a time difference between each ON-set time in rhythm pattern B and an ON-set time in rhythm pattern A that is closest to the ON-set time in rhythm pattern B.

(b-5) The control section 21 calculates a sum of all of the absolute values of the time differences calculated at step (b-4) above.

(b-6) The control section 21 calculates an absolute value of a difference between a duration pattern at each ON-set time in rhythm pattern B and a duration pattern at a corresponding ON-set time in rhythm pattern A and calculates a sum of all of such absolute values.

(b-7) The control section 21 calculates a difference between rhythm pattern A and rhythm pattern B in accordance with the following mathematical expression (2):

$$\text{difference between rhythm pattern } A \text{ and rhythm pattern } B = \beta*(\text{the sum of all of the absolute values of the time differences calculated at step}(b\text{-}2) + \text{the sum of all of the absolute values of the time differences calculated at step}(b\text{-}5))/2 + (1-\beta)*(\text{the sum of all of the absolute values of the duration differences calculated at step}(b\text{-}3) + \text{the sum of all of the absolute values of the duration differences calculated at step}(b\text{-}6))/2 \quad \text{mathematical expression (2)}$$

where * denotes a multiplication sign and/denotes a division sign.

In mathematical expression (2) above, $\beta$ is a predetermined coefficient that satisfies $0<\beta<1$ and is prestored in the storage section 22. The user can change the value of the coefficient $\beta$ via the operation section 25. For example, in searching for a rhythm pattern, the user may set a value of the coefficient $\beta$ depending on whether priority should be given to a degree of ON-set time coincidence or to a degree of duration pattern coincidence. In this way, the user can acquire a searched-out result with the duration taken into consideration.

The foregoing has been an explanation about variations of the manner or method for calculating of a difference between rhythm patterns.

4-10. Method for calculating a distance between rhythm patterns

The method for calculating a distance between rhythm patterns in the first and second embodiments is merely illustrative, and such a distance between rhythm patterns may be calculated using a different method from the aforementioned. The following describe variations of the method for calculating a distance between rhythm patterns.

4-10-1. Modification 14

Coefficients may be applied to respective sums of two rhythm patterns. At step Sb7 performed in the above-described embodiments, the control section 21 calculates a distance between rhythm patterns by multiplying together a similarity distance, calculated for a rhythm category at step Sb4, and a difference between the rhythm patterns calculated at step Sb6. However, if one of the similarity distance and the difference is of a value "0", then the distance between rhythm patterns would be calculated as "0" that does not reflect therein a value of the other of the similarity distance and the difference. Thus, as a modification, the control section 21 may calculate a distance between rhythm patterns in accordance with the following mathematical expression (3):

distance between rhythm patterns=(similarity distance calculated for the rhythm category at step $Sb4+\gamma$)*(difference between the rhythm patterns calculated at step $Sb6+\delta$)      mathematical expression (3)

where * denotes a multiplication sign.

In mathematical expression (3), $\gamma$ and $\delta$ are predetermined constants that are prestored in the storage section 22. Here, $\gamma$ and $\delta$ only need be appropriately small values. In this way, even when one of the similarity distance calculated for the rhythm category at step Sb4 and the difference between the rhythm patterns calculated at step Sb6 is of a value "0", it is possible to calculate a distance between the rhythm patterns that reflects therein a value of the other of the similarity distance and the difference between the rhythm patterns.

4-10-2. Modification 15

A sum of values of rhythm patterns multiplied by a predetermined constant may be used. The calculation of a distance between rhythm patterns at step Sb7 may be performed in the following manner rather than being limited to the above-described. Namely, in modification 15, the control section 21 calculates, at step Sb7, a distance between rhythm patterns in accordance with the following mathematical expression (4):

distance between rhythm patterns=$\epsilon$*similarity distance calculated for a rhythm category at step $Sb4+(1-\epsilon)$*difference between the rhythm patterns calculated at step $Sb6$      mathematical expression (4), where * denotes a multiplication sign.

In mathematical expression (4) above, $\epsilon$ is a predetermined coefficient that satisfies "$0 \leq \epsilon \leq 1$". The coefficient $\epsilon$ is prestored in the storage section 22, and the user can change the value of the coefficient $\epsilon$ via the operation section 25. For example, in searching for a rhythm pattern, the user may set a value of the coefficient $\epsilon$ depending on whether priority should be given to the similarity distance calculated for the rhythm category or to the difference between the rhythm patterns. In this way, the user can obtain more desired searched-out results.

4-10-3. Modification 16

A distance of a rhythm pattern having a tempo close to that of an input rhythm pattern may be calculated as a small value. Namely, the calculation of a distance between rhythm patterns at step Sb7 may be performed in the following manner rather than being limited to the above-described. Namely, in modification 16, the control section 21 calculates, at step Sb7, a distance between rhythm patterns in accordance with the following mathematical expression (5-1):

distance between rhythm patterns=(similarity distance calculated for a rhythm category at step $Sb4$+difference between the rhythm patterns calculated at step $Sb6$)*$\epsilon$*|input BPM−BMP of a rhythm pattern record|      mathematical expression (5-1), where * denotes a multiplication sign.

In mathematical expression (5-1) above, 3 is a predetermined constant that satisfies "$0 < \epsilon < 1$". The constant 3 is prestored in the storage section 22, and the user can change the value of the coefficient 3 via the operation section 25. For example, in searching for a rhythm pattern, the user may set a value of the constant $\epsilon$ depending on how much priority should be given to the difference in BPM. At that time, each rhythm pattern record whose difference in BPM from the input BPM is over a predetermined threshold value may be excluded by the control section 21 from the searched-out results. In this way, the user can obtain more desired searched-out results, taking the BPM into account.

Further, as another example of mathematical expression (5-1) above, the following may be used:

distance between rhythm patterns=(similarity distance calculated for a rhythm category at step $Sb4$+difference between the rhythm patterns calculated at step $Sb6$)+$\epsilon$*|input BPM−BMP of the rhythm pattern record|      mathematical expression (5-2), where * denotes a multiplication sign.

Like in mathematical expression (5-1) above, 3 in mathematical expression (5-2) is a predetermined constant that satisfies "$0 < \epsilon < 1$". The coefficient $\epsilon$ is prestored in the storage section 22, and the user can change the value of the coefficient $\epsilon$ via the operation section 25. In the case where mathematical expression (5-2) is used, and if, for example, the constant $\epsilon$ is set to a considerably small value, searched-out results are output in such a manner that, fundamentally, rhythm patterns closer to the input rhythm pattern are output as higher-rank rhythm patterns than rhythm patterns less close to the input rhythm pattern, and also in such a manner that rhythm patterns coinciding with the input rhythm pattern are displayed in descending order of closeness to a tempo of the input rhythm pattern.

4-10-4. Modification 17

Correction may be made in such a manner that a distance of a rhythm pattern having a tone color close to that of an input pattern is calculated as a small value. The calculation of a distance between rhythm patterns at step Sb7 may be performed in the following manner rather than being limited to the above-described. Namely, in modification 17, the control section 21 multiplies the right side of any one of the aforementioned mathematical expressions, applicable to step Sb7, by a degree of coincidence between a tone color designated at the time of input of the rhythm pattern and a tone color of a rhythm pattern to be compared against the input rhythm pattern. Note that the degree of coincidence may be calculated in any well-known manner. For convenience of description, let it be assumed here that a smaller value of the degree of coincidence indicates that the two rhythm patterns are closer to each other in tone pitch while a greater value of the degree of coincidence indicates that the two rhythm patterns are less close to each other in tone pitch. In this way, the user can readily obtain, as searched-out results, rhythm pattern records of tone colors close to a tone color which the user feels when inputting the rhythm pattern, and thus, the user can have a more feeling of satisfaction with the searched-out results.

As an example specific scheme for searching with a tone color taken into consideration, the following is conceivable. First, tone color data (specifically, respective program numbers and MSBs (Most Significant Bits) and LSBs (Least Significant Bits) of tone colors) used in individual performance parts are described in advance in the style table in association with their respective tone color IDs. The user inputs a rhythm pattern, designating tone color data via the operation section 25. Then, the control section 21 performs control such that style data sets corresponding to tone color data matching the designated tone color data can be readily output as searched-out results. Alternatively, a data table where degrees of similarity of individual tone data are described on a tone-color-ID-by-tone-color-ID basis may be prestored in the storage section 22, and the control section 21 may perform control such that style data sets having tone color IDs of tone color data having high degrees of similarity to the designated tone color data can be searched out with higher priority.

4-10-5. Modification 18

Correction may be made in such a manner that a distance of a rhythm pattern of a genre closer to that of an input rhythm pattern is calculated as a small value. The calculation of a distance between rhythm patterns at step Sb7 may be performed in the following manner rather than being limited to the above-described. Namely, in modification 18, the user can designate, at the time of input of a rhythm pattern, a genre via the operation section 25. In modification 18, the control section 21 multiplies the right side of any one of the aforementioned mathematical expressions, applicable to step Sb7, by a degree of coincidence between the genre designated at the time of input of the rhythm pattern and a genre of a rhythm pattern to be compared against the input rhythm pattern. Here, genres may be classified stepwise or hierarchically into a major genre, middle genre and minor genre. The control section 21 may calculate a degree of coincidence of genre in such a manner that a distance between a rhythm pattern record of a genre coinciding with or including the designated genre and the input pattern becomes small, or in such a manner that a distance between a rhythm pattern record of a genre not coinciding with or not including the designated genre and the input pattern becomes great, and then, the control section 21 may perform correction on the mathematical expression to be used at step Sb7. In this manner, the user can more easily obtain, as searched-out results, rhythm pattern records coinciding with or including the genre designated by the user at the time of input of a rhythm pattern.

The foregoing has been a description about variations of the manner or method for calculating a distance between rhythm patterns.

4-11. Manner of Calculation of a Distance Between an Input Rhythm Pattern and a Rhythm Category The aforementioned manners or methods for calculating a distance between an input rhythm pattern and a rhythm category are merely illustrative, and such a distance may be calculated using any other different methods, as explained below.

4-11-1. Modification 19

A distance between an input rhythm pattern and a rhythm category may be calculated in accordance with the number of input intervals specific to or unique to a category. Namely, in modification 19, the control section 21 calculates a distance between an input rhythm pattern and each of rhythm categories on the basis of the number of ON-set time intervals symbolic of, or unique to, the rhythm category, which is to be compared against the input rhythm pattern, included in the input rhythm pattern. FIG. 21 is a diagram showing an example of an ON-set time interval table that is prestored in the storage section 22. The ON-set time interval table comprises combinations of names indicative of classifications of the rhythm categories and target ON-set time intervals in the individual rhythm categories. Note that content of the ON-set time interval table is predetermined with the ON-set time intervals normalized with one measure divided into 48 equal time segments.

For convenience of description, let it be assumed here that the control section 21 has calculated ON-set time intervals from ON-set times of the input rhythm pattern and then calculated a group of values indicated in (d) below as a result of performing a quantization process on the calculated ON-set time intervals.

(d) 12, 6, 6, 6, 6, 6

In accordance with the calculated group of values and the ON-set time interval table shown in FIG. 21, the control section 21 identifies that there are one fourth(-note) ON-set time interval and five eighth(-note) ON-set time intervals in the input rhythm pattern. Then, the control section 21 calculates a distance between the input rhythm pattern and each of the rhythm categories as follows:

distance between the input rhythm pattern and a rhythm category $N$=1−(the number of relevant ON-set time intervals, in the input rhythm pattern, of the rhythm category $N$/the total number of ON-set time intervals in the input rhythm pattern)     mathematical expression (6)

Note that the above mathematical expression is merely illustrative, and that any other mathematical expression may be employed as long as it causes the distance of the rhythm category from the input rhythm pattern to be calculated to be a smaller value as the rhythm category contains more relevant or target ON-set time intervals. Also, using mathematical expression (6) above, the control section 21 calculates, for example, a distance between the input rhythm pattern and eighth(-note) rhythm pattern as "0.166", or a distance between the input rhythm pattern and quadruple(-note) rhythm pattern as "0.833". In the aforementioned manner, the control section 21 calculates a distance between the input rhythm pattern and each of the rhythm categories, and determines that the input rhythm pattern belongs to a particular rhythm category for which the calculated distance is the smallest among the rhythm categories.

4-11-2. Modification 20

A distance between an input rhythm pattern and a rhythm category may be calculated in accordance with a matrix between DB-stored (database-stored) rhythm categories and input rhythm categories. The method for calculating a distance between the input rhythm pattern and a rhythm category is not limited to the aforementioned and may be modified as follows. Namely, in modification 20, a distance reference table is prestored in the storage section 22. FIG. 22 is a diagram showing an example of the distance reference table where distances between rhythm categories which input rhythm patterns can belong to and categories which individual rhythm pattern records stored in the automatic accompaniment database 221 can belong to are indicated in a matrix configuration. For convenience of description, let it be assumed here that the control section 21 has determined that a rhythm category which an input pattern belongs to is the eighth (i.e., eighth-note) rhythm category. In this case, the control section 21 identifies, on the basis of the rhythm category which the input rhythm pattern has been determined to belong to and the distance reference table, distances between the input rhythm pattern and the individual rhythm categories. For example, in this case, the control section 21 identifies a distance between the input rhythm pattern and the fourth (fourth-note) rhythm category as "0.8" and identifies a distance between the input rhythm pattern and the eighth rhythm category as "0". Thus, the control section 21 determines that the eighth rhythm category is smallest in distance from the input rhythm pattern.

4-11-3. Modification 21

A distance between an input rhythm pattern and a rhythm category may be calculated in accordance with an input time unique to a category and a score. The method for calculating a distance between an input rhythm pattern and a rhythm category is not limited to the above-described and may be modified as follows. Namely, in modification 21, the control section 21 calculates a distance between an input rhythm pattern and each of the rhythm categories on the basis of the number of ON-set times, in the input rhythm pattern, symbolic of, or unique to, a rhythm category to be compared against the input rhythm pattern. FIG. 23 is a diagram showing an example of an ON-set time table that is prestored in the storage section 22. The ON-set time table comprises combinations of names indicative of classifications of rhythm categories, target ON-set times in the individual rhythm categories, and scores to be added in a case where the input rhythm pattern includes the target ON-set times. Note that the content of the ON-set time table is predetermined as normalized with one measure segmented into 48 equal segments.

For convenience of description, let it be assumed here that the control section 21 has obtained ON-set times from the input rhythm pattern as indicated at (e) below.

(e) 0, 12, 18, 24, 30, 36, 42

In this case, the control section 21 calculates a score of the input rhythm pattern relative to each of the rhythm categories. Here, the control section 21 calculates "8" as a score of the input rhythm pattern relative to the fourth rhythm category, "10" as a score of the input rhythm pattern relative to the eighth(-note) rhythm category, "4" as a score of the input rhythm pattern relative to the eighth triplet rhythm category, and "7" as a score of the input rhythm pattern relative to the sixteenth rhythm category. Then, the control section 21 determines, as a rhythm category having the smallest distance from the input rhythm pattern, the rhythm category for which the calculated score is the greatest. In this case, the control section 21 determines that the input rhythm pattern has the smallest distance to the eighth rhythm category.

The foregoing has been a description about variations of the method for calculating a distance between an input rhythm pattern and each of the rhythm categories.

4-12. Modification 22

The search may be performed on the basis of a tone pitch pattern input by the user designating a performance part. In the following description of modification 22, the item name "rhythm pattern ID" in the rhythm pattern table shown in FIG. 5A is referred to as "pattern ID". Further, in modification 22, an item "tone pitch pattern data" is added to each of the rhythm pattern records in the rhythm pattern table of FIG. 5A. The tone pitch pattern data is a data file having recorded therein variation along a time series of pitches of individual component notes in a phrase constituting a measure. For example, the tone pitch pattern data is a text data file having recorded therein variation along a time series of pitches of individual component notes in a phrase constituting a measure. Further, as noted above, ON-set information includes note numbers of the keyboard in addition to trigger data. A series of ON-set times in the trigger data corresponds to an input rhythm pattern, and a series of note numbers of the keyboard corresponds to an input tone pitch pattern. Here, the information processing device 20 may search for a tone pitch pattern, using any one of the conventionally-known methods. For example, when the user has input a tone pitch sequence of "C-D-E" designating "chord" as the performance part, the control section 21 of the information processing device 20 outputs, as a searched-out result, a rhythm pattern record having tone pitch pattern data representing the tone pitch progression of the sequence represented by relative numerical values "0-2-4".

Further, when, for example, the user has input a tone pitch pattern of "D-D-E-G" designating "phrase" as the performance part, the control section 21 generates MIDI information indicative of the input tone pitch pattern. The control section 21 outputs, as searched-out results, tone pitch pattern records having tone pitch pattern data identical to or similar to the MIDI information from among tone pitch pattern records contained in the rhythm pattern table. Switching may be made, by the user via the operation section 25 of the information processing device 20, between such a search using a tone pitch pattern and a search using a rhythm pattern.

4-13. Modification 23

Of results of a search performed based on a rhythm pattern input by the user designating a performance part, a rhythm pattern more similar in tone pitch pattern to the input rhythm pattern may be output as a searched-out result. In modification 23, each of the rhythm pattern records in the rhythm pattern table includes not only "pattern IDs" but also "tone pitch pattern data" of individual performance parts.

FIGS. 24A and 24B are schematic diagrams explanatory of a search using a tone pitch pattern, in which the horizontal axis represents the passage of time while the vertical axis represents various tone pitches. In modification 23, the following processes are added to the above-described search processing flow of FIG. 8. For convenience of description, let it be assumed here that the user has operated the bass inputting range keyboard 11a to input a tone pitch pattern "C-E-G-E" in a fourth(-note) rhythm. The input tone pitch pattern is represented, for example, by a series of note numbers "60, 64, 67, 64". FIG. 24A represents such a tone pitch pattern. Because the performance part here is "bass", the control section 21 identifies, as object of comparisons, tone pitch pattern records whose part ID is "01 (bass)" and calculates a difference, from the input tone pitch pattern, tone pitch pattern data included in each of the tone pitch pattern records identified as the objects of comparison.

The control section 21 calculates a tone pitch interval variance between the input tone pitch pattern and a tone pitch pattern represented by tone pitch pattern data included in each of the rhythm pattern records whose part ID is "01 (bass)"; the latter tone pitch pattern will hereinafter be referred to as "sound-source tone pitch pattern". This is based on the thought that the less variation there is in tone pitch interval difference, the more similar two tone pitch patterns can be regarded. Assume here that the input tone pitch pattern is represented by "60, 64, 67, 64" as note above and a given sound-source tone pitch pattern is represented by "57, 60, 64, 60". In 24B, the input tone pitch pattern and the sound-source tone pitch pattern are shown together. In this case, a tone pitch interval variance between the input tone pitch pattern and the sound-source tone pitch pattern can be calculated in accordance with mathematical expression (8) by calculating an average value of tone pitch intervals in accordance mathematical expression (7) below.

$$((|60-57|)+(|64-60|)+(|67-64|)+ \\ (|64-60|))/4=3.5 \qquad \text{mathematical expression (7)}$$

$$((|3.5-3|)^2+(|15-4|)^2+(|3.5-3|)^2+ \\ (|3.5-4|)^2)/4=0.25 \qquad \text{mathematical expression (8)}$$

As shown in the mathematical expressions above, a tone pitch difference variance between the input tone pitch pattern represented by "60, 64, 67, 64" and the sound-source tone pitch pattern represented by "57, 60, 64, 60" is calculated as "0.25". The control section 21 calculates such a tone pitch interval variance for all of the sound-source tone pitch patterns.

Next, at step Sb7, the control section 21 obtains a degree of similarity between the input rhythm pattern and each of the searched-out rhythm patterns with their respective tone pitch patterns taken into account. If a degree of similarity between the input rhythm pattern and each of the searched-out rhythm patterns without their respective tone pitch patterns taken into account is defined as "S" and the tone pitch difference variance is defined as "V", then a degree of similarity Sp between the input rhythm pattern and each of the searched-out rhythm patterns with their respective tone pitch patterns taken into account can be expressed by the following mathematical expression (9) using a variable x and a constant y, where 0<x<1, and y>0:

$$Sp=(1-x)S+xyV \qquad \text{mathematical expression (9)}$$

If the variable x is "0", the above mathematical expression becomes "Sp=S", and thus, the calculated degree of similarity will not reflect the tone pitch patterns. As the variable x approaches a value "1", the degree of similarity obtained by the above mathematical expression reflects more of the tone pitch patterns. The variable x may be made changeable in value by the user via the operation section 25. Further, in mathematical expression (9) above, an average error of tone pitch differences may be used in place of the tone pitch difference variance. Then, the control section 21 rearranges the searched-out rhythm patterns in the descending order of the degrees of similarity (i.e., ascending order of the distances) between the searched-out rhythm patterns and the input rhythm pattern calculated with the tone pitch patterns taken into account, and then stores the rearranged searched-out rhythm patterns into the RAM.

Further, the ON-set times and the number of ON-sets in the input tone pitch pattern and the ON-set times and the number of ON-sets of individual notes constituting a sound-source tone pitch pattern do not necessarily coincide with each other. In such a case, the control section 21 determines, for each of the ON-sets of the input tone pitch pattern, which of the notes of the sound-source tone pitch pattern corresponds to that ON-set of the input tone pitch pattern, in accordance with the following operational step sequence.

(C-1) The control section 21 calculates, using the ON-set times of individual notes of the input tone pitch pattern as calculation bases, a tone pitch difference between each of the notes of the input tone pitch pattern and a note of an ON-set time of the sound-source tone pitch pattern closest to the ON-set of the note of the input tone pitch pattern.

(C-2) The control section 21 calculates, using the ON-set times of the individual notes of the sound-source tone pitch pattern as calculation bases, a tone pitch difference between each of the notes of the sound-source tone pitch pattern and a note of an ON-set time of the input tone pitch pattern closest to the ON-set of the note of the sound-source tone pitch pattern.

(C-3) Then, the control section 21 calculates, as a tone pitch difference between the input tone pitch pattern and the sound-source tone pitch pattern, an average value between the difference calculated at step (C-1) and the difference calculated at step (C-2).

Note that, in order to reduce the quantity of necessary calculations, the tone pitch difference between the input tone pitch pattern and the sound-source tone pitch pattern may be calculated using only any one of steps (C-1) and (C-2) above. Also note that the method for calculating a degree of similarity between the input rhythm pattern and each of the searched-out rhythm patterns with their tone pitch patterns taken into account is not limited to the aforementioned and any other suitable method may be used for that purpose.

Further, if an absolute value of a difference between corresponding tone pitches is divided by "12", it is possible to search out an accompaniment similar in 12-tone pitch pattern to the input tone pitch pattern, rather than an accompaniment similar to the input tone pitch pattern itself. The following describe a case where tone pitches are represented by note numbers and where a comparison is made between tone pitch pattern A of "36, 43, 36" and tone pitch pattern B of "36, 31, 36". Although the two tone pitch patterns differ from each other, the two patterns represent same component notes "C, G, C" of which the note number of "G" is only different by one octave between the two patterns. Thus, tone pitch pattern A and tone pitch pattern B can be regarded as similar tone pitch patterns. The control section 21 calculates a difference in 12-tone pitch pattern between tone pitch patterns A and B, in accordance with mathematical expressions (10) and (11) below.

$$(|36-36|/12)+(|43-31|/12)+ \\ (|36-36|/12)=0 \qquad \text{mathematical expression (10)}$$

$$(|0-0|^2)(|0-0|^2)(|0-0|^2)=0 \qquad \text{mathematical expression (11)}$$

Because tone pitch patterns A and B coincide with each other in 12-tone pitch variation pattern, similarity in 12-tone pitch pattern between tone pitch patterns A and B is calculated as "0". Namely, in this case, tone pitch pattern B is output as a tone pitch pattern most similar to tone pitch pattern A. If not only a degree of similarity to the input tone pitch pattern itself but also a 12-tone pitch variation pattern is considered as set forth above, the user can have an even more feeling of satisfaction.

Further, a searched-out result may be output on the basis of a similarity determined with both the input tone pitch pattern itself and the 12-tone pitch variation pattern taken into account. A mathematical expression to be used in this case can be expressed like the following mathematical expression (12):

similarity in rhythm pattern with both the input tone pitch pattern itself and the 12-tone pitch variation pattern taken into account=$(1-X)$*(similarity in rhythm pattern)+$XY${$(1-\kappa)$(similarity in tone pitch pattern)+$\kappa$(similarity in 12-tone pitch variation pattern)} mathematical expression (12)

where X, Y and κ are predetermined constants that satisfy 0<X<1, Y>0 and 0<κ<1. Note that the above mathematical expressions are merely illustrative and should not be construed as so limited.

In the aforementioned manner, rhythm pattern records close to not only a user-intended rhythm pattern but also a user-intended tone pitch pattern can be output as searched-out results. Thus, the user can obtain, as a searched-out result, a rhythm pattern record that is identical in rhythm pattern to an input rhythm pattern but different in tone pitch pattern from the input rhythm pattern.

4-14. Modification 24

The control section 21 may search through the automatic accompaniment DB 221 using both trigger data and velocity data generated in response to performance operation by the user. In this case, if there exist two rhythm pattern data having extremely similar rhythm patterns, the control section 21 outputs, as a searched-out result, rhythm pattern data where attack intensity of individual component notes described in attack intensity pattern data is closer to the velocity data generated in response to the user's performance operation. In this way, for the attack intensity too, automatic accompaniment data sets close to a user's image can be output as searched-out results.

4-15. Modification 25

Further, when searching through the automatic accompaniment DB 221, the control section 21 may use, in addition to trigger data and velocity data, duration data indicative of a time length for which audible generation of a same sound continues or lasts. The duration data of each component note is represented by a time length calculated by subtracting, from an OFF-set time, an ON-set time immediately preceding the OFF-set time of the component note. Particularly, in a case where the input means of the rhythm input device 10 is a keyboard, the duration data can be used very effectively because the information processing device 20 can clearly acquire the OFF-set time of each component note. In this case, an item "Duration Pattern Data" is added to the phrase table and the rhythm pattern table. The duration pattern data is a data file, such as a text file, having recorded therein duration (audible generation time lengths) of individual component notes of a phrase constituting one measure. In this case, the information processing device 20 may be constructed to search through the phrase table or the rhythm pattern table by use of a user-input duration pattern of one measure and output, as a searched-out result from the phrase table or the rhythm pattern table, a phrase record or a rhythm pattern record having duration pattern data most similar (or closest) to the user-input duration pattern. Thus, even where a plurality of phrase records or rhythm pattern records having similar rhythm patterns exist, the information processing device 20 can identify and output a particular rhythm pattern, having a slur, staccato (bounce feeling) or the like, from among the similar rhythm patterns.

4-16. Modification 26

The information processing device 20 may search for automatic accompaniment data sets each having a phrase of a tone color identical to, or having a high degree of similarity to, a tone color of an input rhythm pattern. For example, for that purpose, identification information identifying tone colors to be used may be associated in advance with individual rhythm pattern data; in this case, when the user is about to input a rhythm pattern, the user designates a tone color so that the rhythm patterns can be narrowed down to rhythm patterns that are to be audibly generated with a corresponding tone color and then particular rhythm patterns having a high similarity to the input rhythm pattern can be searched out from among the narrowed-down rhythm patterns. In this case, an item "tone color ID" is added in the rhythm pattern table. In inputting a rhythm pattern via any of the performance operators, the user designates a tone color, for example, via the operation section 25; the designation of a tone color may be performed via any of the operators provided in the rhythm input device 10. Once the user executes performance operation, the ID of a tone color designated by the user in executing the performance operation is input to the information processing device 20 as a part of MIDI information. Then, the information processing device 20 compares a tone color of a sound based on the input tone color ID and a tone color based on a tone color ID in each of rhythm pattern records of a designated performance part contained in the rhythm pattern table, and, if the compared tone colors have been determined in predetermined correspondence relationship on the basis of a result of the comparison, then the information processing device 20 identifies that rhythm pattern record to be similar to the input rhythm pattern, The correspondence relationship is predetermined such that the compared two tone colors can be identified to be of a same musical instrument type on the basis of the result of the comparison, and the predetermined correspondence relationship is prestored in the storage section 22a. The aforementioned tone color comparison may be made in any conventionally-known method, e.g. by comparing spectra in respective sound waveforms. In the aforementioned manner, the user can acquire automatic accompaniment data sets not only similar in rhythm pattern to the input rhythm pattern, but also similar in tone color to the input rhythm pattern for the designated performance part. An example specific method for such a search may be generally the same as the one described above in relation to Modification 17.

4-17. Modification 27

Whereas the above embodiments have been described as determining that a sound generation time interval histogram has a high similarity to an input time interval histogram when an absolute value of a difference between the input time interval histogram and the sound generation time interval histogram is the smallest, the condition for determining a high degree of similarity between the two histograms is not limited to the absolute value of the difference between the two histograms and may be any other suitable condition, such as a condition that a degree of correlation between the two histograms, like a product of individual time interval components of the two histograms, is the greatest or greater than a predetermined threshold value, or a condition that the square of the difference between the two histograms is the smallest or smaller than a predetermined threshold value, as long as the condition defines that the individual time interval components be similar in value between the two histograms, or the like.

4-18. Modification 28

Whereas the above embodiments have been described in relation to the case where the information processing device 20 searches for a tone data set having a rhythm pattern similar to a rhythm pattern input via the rhythm input device 10 and converts the searched-out tone data set into sounds for audible output, the following modified arrangement may be employed. For example, in a case where the processing performed by the above embodiments is performed by a Web service, the functions possessed by the information processing device 20 in the above embodiments are possessed by a server apparatus providing the Web service, and a user's terminal, such as a PC, that is a client apparatus, transmits an input rhythm pattern to the server apparatus via the Internet, dedicated line, etc. in response to a user's operation. On the basis of the input rhythm pattern received from the client apparatus, the server apparatus searches through a storage section for a tone data set having a rhythm pattern similar to the input rhythm pattern and then transmits a searched-out result or searched-out tone data set to the user's terminal. Then, the terminal audibly outputs sounds based on the tone data set received from the server apparatus. Note that, in this case, the bar line clock signals may be presented to the user in the Web site or application provided by the server apparatus.

4-19. Modification 29

The performance operator in the rhythm input device 10 may be of other than a drum pad type or a keyboard type, such as a string instrument type, wind instrument type or button type, as long as it outputs at least trigger data in response to performance operation by the user. Alternatively, the performance control or operator may be a tablet PC, smart phone, portable or mobile phone having a touch panel, or the like. As another alternative, the rhythm input device 10 is not necessarily limited to an operator of a music instrument, and it may be constructed to function as an operator by comprising an impact sensor provided in a dashboard or steering wheel desk of a vehicle and capable of outputting trigger data (and velocity data) in response to being hit. As still another alternative, the rhythm input device 10 may be an operator provided in OA (Office Automation Equipment) or household electrical equipment, such as a keyboard, mouse or touch panel of a personal computer. In such a case, a signal output in response to an operation of the operator may be input to the information processing device 20 so that a sound can be audibly output via a speaker provided in the equipment on the basis of a tone signal output from the information processing device 20.

Let's now consider a case where the performance control or operator is a touch panel. In some cases, a plurality of icons are displayed on a screen of the touch panel. If images of musical instruments and operators (e.g., keyboard) of musical instruments are displayed in the icons, the user can know which of the icons should be touched to audibly generate a tone based on a particular musical instrument or particular operator of a musical instrument. In this case, regions of the touch panel where the icons are displayed correspond to the individual performance operators provided in the above-described embodiments.

4-20. Modification 30

Because each of the rhythm pattern records includes information indicative of an original BPM in the above-described embodiments, the control section 21 may be arranged to reproduce tones, represented by a tone data set included in the rhythm pattern record, with the original BPM in response to an operation performed by the user via the operation section 25. Further, once a particular rhythm pattern record is selected by the user from among searched-out results and the control section 21 identifies the thus-selected rhythm pattern record, the control section 21 may perform control in such a manner that tones, represented by the tone data set included in the rhythm pattern record, are reproduced with a user-input or user-designated BPM or at a rate based on the user-designated BPM at a stage immediately following the identification of the selected rhythm pattern record and then the BPM gradually approaches the original BPM of the rhythm pattern record as the time passes.

4-21. Modification 31

The method for allowing the user to have a feeling of satisfaction with searched-out results should not be construed as limited to the above-described filtering function.

—Weighting Similarity with a BPM Difference—

For example, weighting based on a difference between an input BPM and an original BPM of a rhythm pattern record contained in the rhythm pattern table may be applied to the mathematical expression for calculating a distance between the input rhythm pattern and the rhythm pattern record contained in the rhythm pattern table. Assuming that "a" represents a predetermined constant and "L" represents a distance between the input rhythm pattern and the rhythm pattern record contained in the rhythm pattern table, a mathematical expression for calculating a similarity with the weighing applied can be expressed as follows:

$$\text{similarity} = L + |\text{input BPM} - \text{BPM of the rhythm pattern record}|/a \quad \text{mathematical expression (13)}$$

Note, however, that the mathematical expression for calculating such a similarity is not limited to mathematical expression (13) above and any other mathematical expression may be employed as long as the similarity decreases (i.e., the degree of similarity increases) as the input BPM and the BPM of the rhythm pattern record are closer to each other.

4-22. Modification 32

Although the filtering may be used such that displayed results are narrowed down by the user designating a particular object or target of display via a pull-down list as in the above-described embodiments, the displayed results may alternatively be automatically narrowed down through automatic analysis of performance information obtained at the time of input of a rhythm pattern. Further, a chord type or scale may be identified on the basis of pitch performance information indicative of pitches of a rhythm input via a keyboard or the like so that accompaniments registered with the identified chord type or scale can be automatically displayed as searched-out results. For example, if a rhythm has been input with a rock-like chord, it becomes possible for a rock style to be searched out with ease. Further, if a rhythm has been input with a Middle-East-like scale, then it becomes possible for a Middle-East-like phrase to be searched out with ease. Alternatively, searching may be performed on the basis of tone color information indicative of a tone color designated at the time of input via a keyboard in such a manner that accompaniments having the same tone color information as the input tone color information and the same rhythm pattern as the input rhythm are searched out. For example, if a rhythm has been input with a rimshot on a snare drum, accompaniments of a rimshot tone color can be displayed with priority from among candidates having the same rhythm pattern as the input rhythm.

4-23. Modification 33

If the rhythm input device 10 includes no input pad 12, the rhythm input device 10 may be constructed as follows. Here, by default, the bass inputting range keyboard 11*a*, chord inputting range keyboard 11*b* and phrase inputting range keyboard 11*c* are allocated to respective predetermined key ranges of the keyboard 11. Once the user indicates that the user is about to input a rhythm pattern for drums parts, the control section 21 allocates the drums parts to predetermined key ranges of the keyboard 11; for example, the control section 21 allocates the bass drum part to "C3", the snare drum part to "D3", the high-hat part to "E3", and the cymbal part to "F3". Note that, in this case, the control section 21 can allocate different musical instrument tones to individual operators (i.e., individual keys) located in the entire key range of the keyboard 11. Further, the control section 21 may display images of allocated musical instruments (e.g., image of the snare drum and the like) above and/or below the individual operators (keys) of the keyboard 11.

4-24. Modification 34

A modification may be made as follows in order to allow the user to readily visually identify which of the operators should be operated to cause the control section 21 to perform a search for a particular performance part. For example, the control section 21 displays, above or below each predetermined one of the operators (keys), an image of an allocated performance part (e.g., an image of a guitar being depressed for a chord performance, an image of a piano being played for a single-note performance (like an image of a single key being depressed by a finger), or an image of the snare drum). The above-mentioned images may be displayed on the display section 24 rather than above or below the predetermined operators. In such a case, for example, not only a keyboard image simulating the keyboard 11 is displayed on the display section 24, but also images of performance parts allocated to respective key ranges of the keyboard image in generally the same allocated state as on the actual keyboard 11 are displayed on the display section 24. Alternative arrangement may be made as follows for allowing the user to readily auditorily identify which of the operators should be operated to cause the control section 21 to perform a search for a particular performance part. For example, once the user makes input to the bass inputting range keyboard 11*a*, the control section 21 causes the sound output section 26 to output a bass sound. In the aforementioned manner, the user can visually or auditorily identify which of the operators should be operated to cause the control section 21 to perform a search for a particular performance part, and thus, user's input operation can be facilitated; as a result, the user can obtain any desired accompaniment sound sources with an increased ease.

4-25. Modification 35

Whereas the processing flow of FIG. 8 has been described above in relation to the case where a distribution of ON-set time intervals in an input rhythm pattern is calculated (step Sb3) after a distribution of ON-set time intervals is calculated for each of the rhythm categories (step Sb1), the processing order of steps Sb1 and Sb3 may be reversed. Further, despite the reversal of the processing order of steps Sb1 and Sb3, the control section 21 may store the distribution of ON-set time intervals, calculated for each of the rhythm categories, into the storage section 22 after the calculation. In this way, there is no need for the control section 21 to re-calculate the once-calculated results, which can achieve an increased processing speed.

4-26. Modification 36

For example, when the user inputs a rhythm pattern by operating a plurality of operators within a predetermined time period, e.g. when the user depresses the bass inputting range keyboard 11*a* to input a chord, there would arise the following problem. Let it be assumed here that the user has input a rhythm at a time point of "0.25" within a measure. In this case, even when the user attempts to operate a plurality of operators at a same time point, the user may, in effect, operate only some of the operators at an ON-set time of "0.25" and others of the operators at an ON-set time of "0.26", in which case the control section 21 would store the input rhythm pattern exactly at these ON-set times. Consequently, searched-out results different from the user's intention may be undesirably output; thus, good operability cannot be provided to the user. To address this problem, the following arrangements may be employed. Namely, in this modification 36, the control section 21 determines, on the basis of ON-set information input from the rhythm input device 10 and the part table contained in the automatic accompaniment DB 211, whether or not user's operation has been performed on a plurality of operators at a same time point for a same performance part. For example, if a difference between an ON-set time of one of the operators included in the bass inputting range keyboard 11*a* and an ON-set time of another of the operators included in the bass inputting range keyboard 11*a* falls within a predetermined time period, then the control section 21 determines that these operators have been operated at the same time point. Here, the predetermined time period is, for example, 50 msec (millisecond). Then, the control section 21 outputs a result of the determination, i.e. information indicating that the plurality of operators can be regarded as having been operated at the same time point, to the control section 21 in association with trigger data having the above-mentioned ON-set times. Then, the control section 21 performs a rhythm pattern search using the input rhythm pattern after excluding, from the input rhythm pattern, one of the trigger data (with which has been associated the information indicating that the plurality of operators can be regarded as having been operated at the same time point) that has the ON-set time indicative of a later sound generation start time than the ON-set time of the other trigger data. Namely, in this case, of the ON-set times based on the user's operation within the predetermined time period, the ON-set time indicative of an earlier sound generation start time will be used in the rhythm pattern search. Alternatively, however, of the ON-set times based on the user's operation within the predetermined time period, the ON-set time indicative of a later sound generation start time may be used in the rhythm pattern search. Namely, the control section 21 may perform the rhythm pattern search using any one of the ON-set times based on the user's operation within the predetermined time period. As another alternative, the control section 21 may calculate an average value of the ON-set times based on the user's operation within the predetermined time period and then perform the rhythm pattern search using the thus-calculated average value as an ON-set time in the user's operation within the predetermined time period. In the aforementioned manner, even when the user has input a rhythm using a plurality of operators within a predetermined time period, searched-out results close to a user's intention can be output.

4-27. Modification 37

The following problem can arise if the control section 21 sets the timing for storing an input rhythm pattern on a per-measure basis to coincide with measure switching timing based on the bar line clock. For example, when a rhythm pattern is input through a user's operation, an error in the range of several msec to dozens of msec may occur between a rhythm pattern intended by the user and actual ON-set times due to differences between time intervals being felt by the user and the bar line clock signals. Therefore, even when the user thinks it is inputting a beat at the head of a measure, that beat may be erroneously treated as a rhythm input of a preceding (i.e., last) measure due to the above-mentioned error. In such a case, the rhythm input may not be stored as an input rhythm pattern. Consequently, searched-out results different from user's intention would be undesirably output; thus, good operability cannot be provided to the user. To address such a problem, the control section 21 only has to set, as a target processing range, a range from a time point dozens of msec earlier than the head of the current measure (namely, last dozens of msec in the preceding measure) to a time point dozens of msec earlier than the end of the current measure, when storing the input rhythm pattern into the RAM. Namely, the control section 21 shifts a target range of the input rhythm pattern, which is to be stored into the RAM, forward by dozens of msec. In this way, this modification can minimize a possibility of searched-out results different from user's intention being output.

4-28. Modification 38

The following problem can arise if the control section 21 sets the timing for performing a rhythm pattern search to coincide with the measure switching timing based on the bar line clock. For example, the search method of the present invention is also applicable to a sound data processing device provided with a playback function that allows a searched-out tone data set to be played back or reproduced in synchronism with the bar line clock in a measure immediately following user's rhythm input. In this case, in order for the searched-out tone data set (searched-out result) to be reproduced from the head of a measure immediately following the rhythm input, the searched-out result has to be output before the time point of the head of the measure, i.e. within the same measure where the rhythm input has been made. Further, in a case where a tone data set to be reproduced cannot be read out and stored into the RAM in advance due to a storage capacity problem or the like of the RAM, there is a need to read out the searched-out tone data set and store the read-out tone data set into the RAM within the same measure where the rhythm input has been made. To address such a problem, the control section 21 only has to shift the timing for performing a rhythm pattern search to be, for example, dozens of msec earlier than the measure switching timing. In this way, the search is performed and a searched-out tone data set is stored into the RAM before the measure switching is effected, so that the searched-out tone data set can be reproduced from the head of the measure immediately following the rhythm input 4-29. Modification 39

The following arrangements may be made for allowing a search for a rhythm pattern of a plurality of measures (hereinafter referred to as "N" measures) rather than a rhythm pattern of one measure. For convenience of description, the following arrangements will be described in relation to the above-described second embodiment and third embodiment. For example, in this case, a method may be employed in which the control section 21 searches through the rhythm pattern table by use of an input rhythm pattern having a group of the N measures. However, with this method, the user has to designate where the first measure is located, at the time of inputting a rhythm pattern in accordance with the bar line clock. Also, because searched-out results are output following the N measures, it would take a long time before the searched-out results are output. To address such an inconvenience, the following arrangements may be made.

FIG. 25 is a schematic diagram explanatory of processing for searching for a rhythm pattern of a plurality of measures. In modification 39, the rhythm pattern table of the automatic accompaniment DB 221 contains rhythm pattern records each having rhythm pattern data of N measures. The user designates, via the operation section 25, the number of measures in a rhythm pattern to be searched for. Content of such user's designation is displayed, for example, on the display section 24. Let's assume here that the user has designated "two" as the number of measures. Once the user inputs a rhythm by use of any of the operators, the control section 21 first stores an input rhythm pattern of the first measure and then searches for a rhythm pattern on the basis of the input rhythm pattern of the first measure. The search is performed in accordance with the following operational sequence. First, regarding rhythm pattern records each having rhythm pattern data of two measures, the control section 21 calculates a distance between the input rhythm pattern of the first measure and rhythm patterns of the first measure and second measure of each of the rhythm pattern data. Then, for each of the rhythm pattern data, the control section 21 stores the smaller of the calculated distance between the input rhythm pattern of the first measure and the rhythm pattern of the first measure and the calculated distance between the input rhythm pattern of the first measure and the rhythm pattern of the second measure into the RAM. Then, the control section 21 performs similar operations for the input rhythm pattern of the second measure. After that, the control section 21 adds together the distances, thus stored in the RAM, for each of the rhythm pattern data, and then sets the sum (added result) as a score indicative of a distance of the rhythm pattern data from the input rhythm pattern. Then, the control section 21 rearranges, in ascending order of the above-mentioned scores, individual rhythm pattern data of which the above-mentioned score is less than a predetermined threshold value, and then outputs such rhythm pattern data as searched-out results. In the aforementioned manner, it is possible to search for rhythm pattern data each having a plurality of measures. Because a distance between the input rhythm pattern and the rhythm pattern data is calculated for each of the measures, there is no need for the user to designate where the first measure is located, and no long time is taken before the searched-out results are output.

4-30. Modification 40

The control section 21 may store an input rhythm pattern into the RAM in the following manner, rather than in accordance with the aforementioned method. Mathematical expression (14) below is intended to acquire an nth input ON-set time in the input rhythm pattern. In mathematical expression (14) below, "L" represents the end of a measure with the head of the measure set at a value "0" and is a real number equal to or greater than "0". Further, in mathematical expression (14) below, "N" represents resolution that is specifically in the form of the number of clock signals within one measure.

$$|(nth\ \text{ON-set time}-\text{start time of the measure})/(\text{end time of the measure}-\text{start time of the measure}) *N+0.5|*L/N \qquad \text{mathematical expression (14)}$$

In mathematical expression (14), the value "0.5" provides a rounding effect to a fraction in calculation of an ON-set time, and it may be replaced with another value equal to or greater than "0" but smaller than "1". For example, if the value is set at "2", it provides a discarding-seven/retaining-eight effect to a fraction. This value is prestored in the storage section 22 and changeable by the user via the operation section 25.

As set forth above, rhythm pattern data may be created in advance by a human operator extracting generation start times of individual component notes from a commercially available audio loop material. With such an audio loop material, backing guitar sounds are sometimes intentionally shifted from their predetermined original timing in order to increase auditory thicknesses of the sounds. In such a case, rhythm pattern data having fractions rounded up and rounded down can be obtained by adjusting the values of the above-mentioned parameters. Thus, the created rhythm pattern data have the above-mentioned shifts eliminated therefrom, so that the user can input a rhythm pattern at desired timing for the search purpose without caring about the shifts from the predetermined original timing.

4-31. Modification 41

The present invention may be implemented by an apparatus where the rhythm input device 10 and the information processing device 20 are constructed as an integral unit. Such a modification will be described in relation to the above-described first embodiment and second embodiment. Note that the apparatus where the rhythm input device 10 and the information processing device 20 are constructed as an integral unit may be constructed, for example, as a portable telephone, mobile communication terminal provided with a touch screen, or the like. This modification 41 will be described below in relation to a case where the apparatus is a mobile communication terminal provided with a touch screen.

Figure 26:
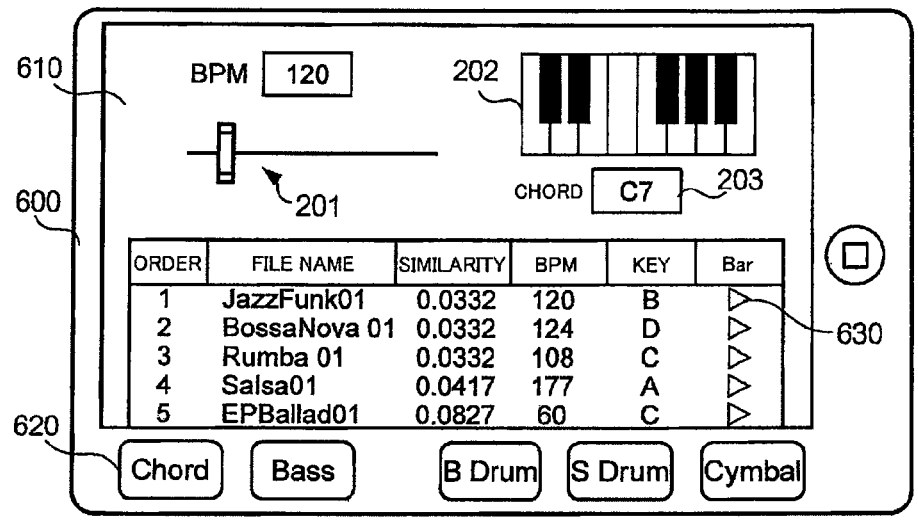
FIG. 26 is a diagram showing a mobile communication terminal.

FIG. 26 is a diagram showing the mobile communication terminal 600 constructed as modification 41. The mobile communication terminal 600 includes a touch screen 610 provided on its front surface. The user can operate the mobile communication terminal 600 by touching a desired position of the touch screen 610, and content corresponding to the user's operation is displayed on the touch screen 610. Note that a hardware construction of the mobile communication terminal 600 is similar to the one shown in FIG. 3, except that the functions of both of the display section 24 and the operation section 25 are realized by the touch screen 610 and that the rhythm input device 10 and the information processing device 20 are constructed as an integral unit. The following describe the control section, the storage section and the automatic accompaniment DB using the same reference numerals and characters as in FIG. 3.

The BPM designating slider 201, key designating keyboard 202 and chord designating box 203 are displayed on an upper region of the touch screen 610. These BPM designating slider 201, key designating keyboard 202 and chord designating box 203 are similar in construction and function to those described above in relation to FIG. 11. Further, a list of rhythm pattern records output as searched-out results is displayed on a lower region of the touch screen 610. Once the user designates any one of part selecting images 620 indicative of different performance parts, the control section 21 displays a list of rhythm pattern records output as searched-out results for the user-designated performance part.

Items "rank order", "file name", "similarity", "BPM" and "key" are similar to those described above in relation to FIG. 11. In addition, other related information, such as "genre" and "musical instrument type", may be displayed. Once the user designates any desired one of reproduction instructing images 630 from the list, a tone data set of the rhythm pattern record corresponding to the user-designated reproduction instructing image 630 is reproduced. Such a mobile communication terminal 600 too can achieve generally the same advantageous benefits as the above-described first embodiment and third embodiment.

4-32. Modification 42

The present invention may be practiced as other than the sound data processing device, such as a method for realizing such tone data processing, or a program for causing a computer to implement the functions shown in FIG. 6. Such a program may be provided to a user stored in a storage medium, such as an optical disk, or downloaded and installed into a user's computer via the Internet or the like.

4-33. Modification 43

In addition to the three types of search modes, i.e. automatic accompaniment mode, replacing search mode and follow-up search mode, employed in the above-described embodiments, switching to the following other modes may be effected. The first one is a mode in which the search processing is constantly running on a per-measure basis and in which one searched-out result most similar to the input rhythm pattern or a predetermined number of searched-out results similar to the input rhythm pattern are reproduced automatically. This mode is applied primarily to an automatic accompaniment etc. The second one is a mode in which only metronome sounds are reproduced in response to the user instructing a start of a search and in which searched-out results are displayed automatically or in response to an instruction upon completion of rhythm input by the user.

4-34. Modification 44

Figure 32:
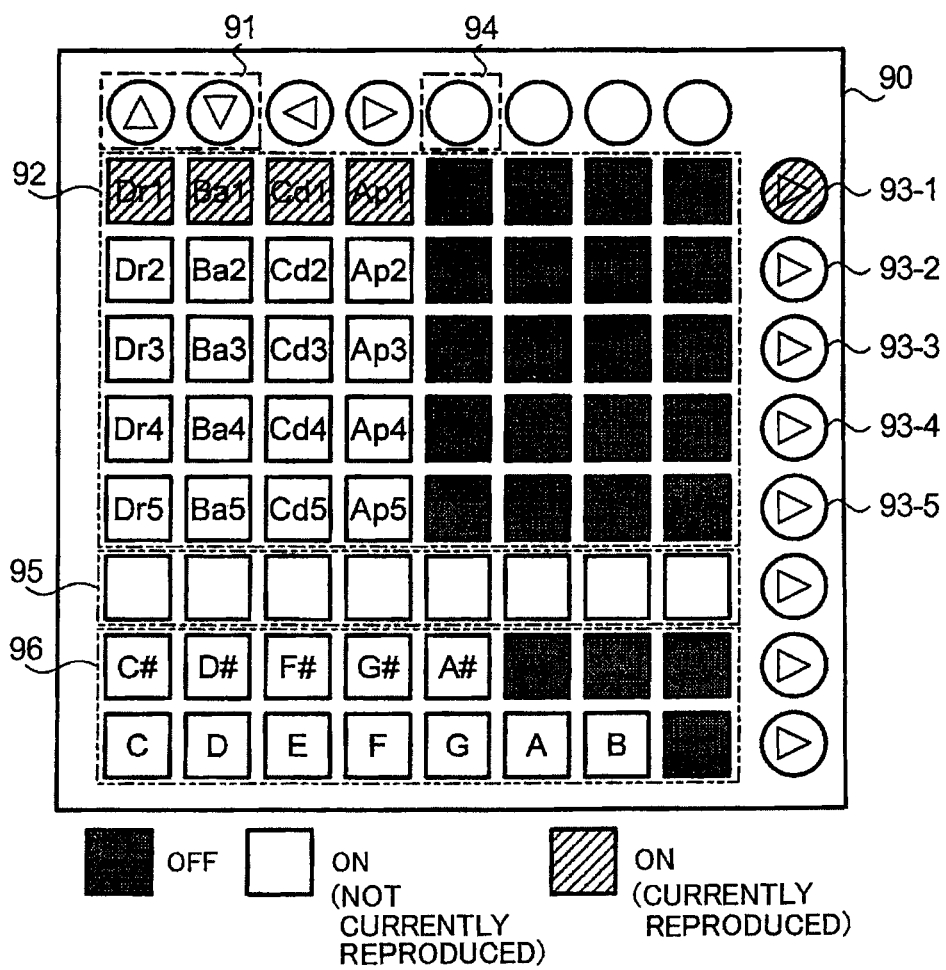
FIG. 32 is a diagram showing an example of a UI in a modification of the present invention.

FIG. 32 is a diagram showing an example of a UI (User Interface) in modification 44. In modification 44, a matrix pad 90 provided with LEDs are connected to the information processing device 20 as an UI. The matrix pad is a device where a plurality of pads functioning as operators are arranged in a matrix configuration (i.e., two dimensionally). Note that the operators in this modification may be buttons rather than being limited to the pads. In the illustrated example of FIG. 32, each of the pads is provided with one or more one LEDs, and any one of various states is indicated by illumination (ON), deillumination (OFF) or color of the LED. The following describe an example of reproduction control using this matrix pad 90.

First, the user designates a performance to be used by the user. The "performance" is a combination of a plurality of tone data sets. Tone data sets combined in each performance are well musically compatible with one another and selected in advance by the user. Each performance includes tone data sets of a plurality of performance parts, at least one tone data set per performance part. At least one performance is preset in the tone data creation system 100. The user can designate or select a desired performance by operating a performance switching button 91.

Once such a performance is selected by the user, tone data sets included in the selected performance are assigned to the pads in a region 92, namely, tones represented by the tone data sets are assigned to the pads. The LEDs of the pads to which the tone data sets have been assigned are illuminated. In the illustrated example of FIG. 32, five tone data sets are assigned to the pads for four performance parts, i.e. drums (Dr), bass (Ba), chord (Cd) and arpeggio (Ap). In FIG. 32, of the illuminated pads, each pad to which the tone data set representative of a currently-reproduced tone (i.e., currently-reproduced tone data set) is assigned is indicated by hatching; actually, the LED is illuminated in a different color from the LEDs of the other pads corresponding to the tone data sets not being currently reproduced in the pad corresponding to the currently-reproduced tone data set. In the illustrated example of FIG. 32, tones assigned to the pads of drums (Dr), bass (Ba), chord (Cd) and arpeggio (Ap) are being reproduced. Note that tones based on the tone data sets are reproduced (loop-reproduced) while being synchronized in tempo, measure, key, etc. as described above in relation to the embodiments.

Once the user depresses any one of the pads during reproduction of the corresponding tone data set, switching can be made between the start and stop of the tone reproduction. For example, once the user depresses the "Ba1" pad during reproduction of the tones assigned to the "Ba1" pad, the reproduction of the tones assigned to the "Ba1" pad is stopped. Then, if the user depresses the "Ba2" pad in that state, the tones assigned to the "Ba2" pad will be reproduced. At that time, the LED in the "Ba1" pad is illuminated in a color indicating that the tone reproduction is currently stopped, and the LED in the "Ba2" pad is illuminated in a color indicating that the tone reproduction is currently under way. At that time, a sequencer screen may be displayed, in addition to the above, so that performance information (rhythm pattern etc.) of the phrase assigned to the pad is displayed on the sequencer screen.

In this modification, only one tone data set can be reproduced at a time for each of the performance parts. For example, once the user depresses the "Ba2" pad during reproduction of a tone assigned to the "Ba1" pad, the reproduction of the tone assigned to the "Ba1" pad is stopped, and a tone assigned to the "Ba2" pad starts to be reproduced. At that time, the LED in the "Ba1" pad is illuminated in the color indicating that the tone reproduction is currently stopped, while the LED in the "Ba2" pad is illuminated in the color indicating that the tone reproduction is currently under way. However, an alternative arrangement may be made such that a plurality of tone data sets can be reproduced at a time for each of the performance parts.

Further, collective selection buttons 93-1 to 93-5 are provided to the right of the region 92. Once any one of the collective selection buttons 93 is selected, tones of all of performance parts in the same horizontal pad row corresponding to the selected collective selection button 93 are collectively selected. For example, once the collective selection button 93-2 is selected in the state of FIG. 32, reproduction of tones assigned to the "Dr1", "Ba1", "Cd1" and "Ap1" is stopped, and reproduction of tones assigned to the "Dr2", "Ba2", "Cd2" and "Ap2" start to be reproduced.

Further, once any one of the pads having tones assigned thereto is depressed with a search button 94 depressed, the control section 21 proceeds to a search mode for performing a search. In this modification, a rhythm pattern (or tone pitch pattern) that becomes a search key is input via the matrix pad 90; such a rhythm pattern (or tone pitch pattern) input scheme via the matrix pad 90 may be used together with the input scheme via the input device 10 or information processing device 20. More specifically, a rhythm pattern is input using an input region 95. In the illustrated example of FIG. 32, different tone pitches that progressively get higher in a left-to-right direction are allocated to a plurality of pads in the input region 95, and a search is made for rhythm patterns (or tone pitch patterns) corresponding to a time point at which the user has depressed any one of the pads in the input region 95.

A key switching region 96 is provided for switching between keys of tones to be reproduced. Different keys are assigned to a plurality of pads in the key switching region 96. Once the user depresses any one of the pads in the key switching region 96, a tone to be reproduced is changed to the key corresponding to the depressed pad. Alternatively, a chord sequence may be set in the information processing device 20 so that a key or chord of a tone to be reproduced is automatically switched in accordance with the chord sequence.

4-35. Other Modifications

Whereas the above embodiments have been described in relation to the case where the rhythm pattern difference calculation at step Sb6 uses two time differences, i.e. time difference of rhythm pattern B based on rhythm pattern A and time difference of rhythm pattern A based on rhythm pattern B, (so-called "symmetric distance scheme or method"), the present invention is not so limited, and only either one of the two time differences may be used in the rhythm pattern difference calculation.

Further, in a case where the above-described search or audible reproduction is performed using MIDI data and if performance data of a plurality of performance parts are reproduced in a multi-track fashion, the search may be performed only on a particular track.

Furthermore, the rhythm category determination or identification operations (steps Sb2 to Sb5) may be dispensed with, in which case the rhythm pattern distance calculation operation of step Sb7 may be performed using only the result of the rhythm pattern difference calculation of step Sb6.

Furthermore, in the rhythm pattern difference calculation (step Sb6), the value of the calculated difference may be multiplied by the value of attack intensity of each corresponding component note so that each rhythm pattern record having greater attack intensity can be easily excluded from searched-out result candidates.

Furthermore, whereas the above embodiments have been described as using automatic accompaniment data sets each having a one-measure length, the sound length need not be so limited.

Further, the user may designate a performance part by use of the operation section 25 rather than the performance controls or operator. In this case, input is made for the designated performance part as the user operates the performance operator after designating the performance part. For example, in this case, even when the user operates the chord inputting range keyboard 11b after designating the "bass" part via the operation section 25, the control section 21 regards this user's operation as input of the "bass" part.

Furthermore, whereas the above embodiments have been described in relation to the case where different pads, such as the bass drum input pad 12a, snare drum input pad 12b, high-hat input pad 12c and cymbal input pad 12d, are allocated to individual rhythm parts of different tone colors in one-to-one relationship, the present invention is not so limited, and may be arranged in such a manner that input operation for rhythm parts of different tone colors can be performed via a single pad. In such a case, the user can designate a tone color of a desired rhythm part via the operation section 25.

Furthermore, whereas each of the embodiments has been described above in relation to the case where rhythm pattern data are represented in fractional values in the range from "0" to "1", rhythm pattern data may be represented in a plurality of integral values, for example, in the range of "0" to "96".

Furthermore, whereas the embodiments have been described above in relation to the case where a predetermined number of searched-out results having a high similarity are detected, such a predetermined number of searched-out results may be detected on the basis of another condition than the aforementioned. For example, searched-out results having a similarity falling within a predetermined range may be detected, and such a predetermined range may be set by the user.

Furthermore, the present invention may be equipped with a function for editing tone data, automatic accompaniment data, style data, etc. In this case, desired tone data, automatic accompaniment data and style data can be selected from a screen displaying searched-out results, and that the selected data are unrolled and displayed, on a part-by-part basis, on a screen displaying the selected data in such a manner that editing of various data, such as the desired tone data, automatic accompaniment data and style data can be done for each of the performance parts.

Furthermore, in the present invention, sound sources usable as tone data, automatic accompaniment data and style data are not necessarily limited to tones or sounds of musical instruments and may be various other sounds, such as voices of humans and animals, as long as minimum necessary parameters (such as sound generation timing, intensity of sounds, pitches of sounds, etc.) can be obtained from the sound sources. Namely, in this specification, the term "sound data" refers to data of sounds of not only musical instruments but also humans, animals, etc.

Furthermore, an input pattern may be obtained by any other desired scheme rather than being limited to the input scheme through performance operation, such as one in which sounds or the like having a volume greater than a given threshold value are collected to obtain an input pattern.

This application is based on, and claims priorities to, JP PA 2011-270633 filed on 9 Dec. 2011 and JP PA 2012-169821 filed on 31 Jul. 2012. The disclosure of the priority application, in its entirety, including the drawings, claims, and the specification thereof, are incorporated herein by reference.

What is claimed is:

1. A sound data processing device for searching through a database, storing therein part performance data of a plurality of performance parts, each of the plurality of performance parts being associated with one performance part of a plurality of different performance parts of an ensemble, for particular part performance data, the part performance data for each of the performance parts including a sound generation pattern indicative of sound generation start timing of individual tones to be generated by the part performance data, said sound data processing device comprising:

a processor configured to:

acquire a first query pattern indicative of a first sound generation pattern to be made an object of search;

search through the database for first part performance data including a second sound generation pattern matching the first query pattern;

in response to a user's operation performed after searching through the database for the first part performance data including the second sound generation pattern matching the first query pattern:

identify one of the first part performance data, whose second sound generation pattern is to be used as a second query pattern, from among searched-out part performance data from the database; and perform a second search for second part performance data matching a performance part associated with the identified one of the first part performance data from among the searched-out part performance data from the database and including a third sound generation pattern matching the second query pattern, using, as the second query pattern, the second sound generation pattern of the identified one of the first part performance data from among the searched-out part performance data from the database.

2. The sound data processing device as claimed in claim 1, wherein said processor is further configured to generate of a list of one or more part performance data as searched-out results corresponding to the first query pattern, and wherein the one of the first part performance data is identified from the one or more listed part performance data.

3. The sound data processing device as claimed in claim 2, wherein said processor is further configured to identify a range of part performance data to be listed.

4. The sound data processing device as claimed in claim 1, the processor further configured to edit the identified one of the first part performance data in accordance with a second user's operation.

5. The sound data processing device as claimed in claim 4, wherein said processor is further configured to perform a third search using, as a third query pattern, a fourth sound generation pattern of the edited part performance data.

6. The sound data processing device as claimed in claim 1, which further comprises a memory configured to store therein data related to one set of performance data being currently processed, said one set of performance data comprising part performance data of the plurality of performance parts, and wherein the one of the first part performance data identified from among the searched-out results in response to the user's operation is stored into said memory as part performance data of one performance part in said one set of performance data.

7. The sound data processing device as claimed in claim 6, wherein the part performance data of all of the performance parts in said one set of performance data stored in said memory are adjusted to synchronize with each other in tempo or time length of one measure.

8. The sound data processing device as claimed in claim 1, which further comprises a speaker configured to generate performance sounds corresponding to the first or second part performance data.

9. The sound data processing device as claimed in claim 1, wherein said database further stores therein information identifying each of a plurality of sets of performance data, each of the sets of performance data comprising part performance data of the plurality of performance parts, and said processor is further configured to:

search through the database for the first part performance data including the second sound generation pattern matching the first query pattern and generate a list of one or more sets of performance data including the searched-out part performance data, and in response to the user's operation, the one of the first part performance data is identified in any one set of performance data of the one or more listed sets of performance data.

10. The sound data processing device as claimed in claim 9, which further comprises a memory configured to store therein data related to one set of performance data being currently processed, and wherein any one set of performance data of the one or more listed sets of performance data is stored into said memory.

11. The sound data processing device as claimed in claim 10, the processor further configured to edit said one set of performance data stored in said memory and selected part performance data in said one set of performance data in accordance with a second user's operation, and stored content of said memory is updated in accordance with said editing by said editing.

12. The sound data processing device as claimed in claim 11, wherein the part performance data of all of the performance parts in said one set of performance data stored in said memory are adjusted to synchronize with each other in tempo or time length of one measure.

13. The sound data processing device as claimed in claim 9, which further comprises a speaker configured to generate performance sounds corresponding to the part performance data or performance sounds corresponding to said one set of performance data.

14. The sound data processing device as claimed in claim 1, the processor further configured to select, as an object of the search, at least one of the plurality of performance parts, wherein said search searches through the database for first part performance data including the second sound generation pattern matching the first query pattern and the first part performance data matching the selected performance part.

15. The sound data processing device as claimed in claim 1, wherein part performance data of a performance part corresponding to a chord performance further includes chord identification information identifying a chord; and wherein the processor is further configured to:

receive user's input for designating a chord, and search through the database for first part performance data including not only chord identification information matching the designated chord but also the second sound generation pattern matching the first query pattern.

16. The sound data processing device as claimed in claim 1, the processor further configured to receive user's input of tone pitch information, and
wherein part performance data of a performance part corresponding to a melodic phrase performance further includes pitch identification information of one or more notes constituting a melodic phrase, and
wherein, when the part performance data searched out by said processor is of the performance part corresponding to a melodic phrase performance, tone pitches of one or more notes constituting the melodic phrase of the part performance data are shifted in accordance with the received pitch identification information.

17. The sound data processing device as claimed in claim 1, wherein said processor is further configured to acquire the first query pattern for the search in response to a user's operation for inputting a desired sound generation pattern.

18. A computer-implemented method for searching through a database, storing therein part performance data of a plurality of performance parts, each of the plurality of performance parts being associated with one performance part of a plurality of different performance parts of an ensemble, for particular part performance data, the part performance data for each of the performance parts including a sound generation pattern indicative of sound generation start timing of individual tones to be generated by the part performance data, said method comprising:
    acquiring a first query pattern indicative of a first sound generation pattern to be made an object of search;
    searching through the database for first part performance data including a second sound generation pattern matching the first query pattern;
    in response to a user's operation performed after searching through the database for the first part performance data including the second sound generation pattern matching the first query pattern: identifying one of the first part performance data, whose second sound generation pattern is to be used as a second query pattern, from among searched-out part performance data from the database;
    selecting, as the second query pattern, the second sound generation pattern of the identified one of the first part performance data from among the searched-out part performance data from the database; and
    searching through the database for second part performance data matching a performance part associated with the identified one of the first part performance data from among the searched-out part performance data from the database and including a third sound generation pattern matching the selected second query pattern.

19. A non-transitory computer-readable storage medium containing a group of instructions for causing a computer to perform a method for searching through a database, storing therein part performance data of a plurality of performance parts, each of the plurality of performance parts being associated with one performance part of a plurality of different performance parts of an ensemble, for particular part performance data, the part performance data for each of the performance parts including a sound generation pattern indicative of sound generation start timing of individual tones to be generated by the part performance data, said method comprising:
    acquiring a first query pattern indicative of a first sound generation pattern to be made an object of search;
    searching through the database for first part performance data including a second sound generation pattern matching the first query pattern;
    in response to a user's operation performed after searching through the database for the first part performance data including the second sound generation pattern matching the first query pattern: identifying one of the first part performance data, whose second sound generation pattern is to be used as a second query pattern, from among searched-out part performance data from the database;
    selecting, as the second query pattern, the second sound generation pattern of the identified one of the first part performance data from among the searched-out part performance data from the database; and
    searching through the database for second part performance data matching a performance part associated with the identified one of the first part performance data from among the searched-out part performance data from the database and including a third sound generation pattern matching the selected second query pattern.

20. A sound data processing device for searching through a database, storing therein part performance data of a plurality of performance parts, for particular part performance data and editing the particular part performance data, the part performance data for each of the performance parts including a sound generation pattern indicative of sound generation start timing of individual tones to be generated by the part performance data, said sound data processing device comprising:
    a processor configured to:
        acquire a query pattern indicative of a first sound generation pattern to be made an object of search;
        search through the database for first part performance data including a second sound generation pattern matching the query pattern; and
        in accordance with a user's operation performed after searching through the database for the first part performance data, identify one of the first part performance data from among searched-out part performance data from the database and edit the identified one of the first part performance data to create new part performance data based on the edited one of the first part performance data.

21. The sound data processing device as claimed in claim 20, wherein said database further stores therein information identifying each of a plurality of sets of performance data, each of the sets of performance data comprising part performance data of a plurality of performance parts,
said processor is further configured to:
    search through the database for the first part performance data including the second sound generation pattern matching the query pattern;
    generate a list of one or more sets of performance data including the searched-out part performance data;
    in accordance with the user's operation, select and edit any one set of performance data of the one or more listed sets of performance data; and
    edit the part performance data in the selected one set of performance data.

22. The sound data processing device as claimed in claim 20, which further comprises a speaker configured to generate performance sounds corresponding to the edited data.

23. The sound data processing device as claimed in claim 20, the processor further configured to register edited results into the database.

24. A computer-implemented method for, searching through a database, storing therein part performance data of a plurality of performance parts, for particular part performance data and editing the particular part performance data, the part performance data for each of the performance parts including a sound generation pattern indicative of sound generation start timing of individual tones to be generated by the part performance data, said method comprising:

acquiring a query pattern indicative of a first sound generation pattern to be made an object of search;

searching through the database for first part performance data including a second sound generation pattern matching the query pattern; and in accordance with a user's operation performed after searching through the database for the first part performance data, identifying one of the first part performance data from among searched-out part performance data from the database and editing the identified one of the first part performance data to create new part performance data based on the edited one of the first part performance data.

25. A non-transitory computer-readable storage medium containing a group of instructions for causing a computer to perform a method for, searching through a database, storing therein part performance data of a plurality of performance parts, for particular part performance data and editing the particular part performance data, the part performance data for each of the performance parts including a sound generation pattern indicative of sound generation start timing of individual tones to be generated by the part performance data, said method comprising:

acquiring a query pattern indicative of a first sound generation pattern to be made an object of search;

searching through the database for first part performance data including a second sound generation pattern matching the query pattern; and in accordance with a user's operation performed after searching through the database for the first part performance data, identifying one of the first part performance data from among searched-out part performance data from the database and editing the identified one of the first part performance data to create new part performance data based on the edited one of the first part performance data.

* * * * *